(12) United States Patent
Lu et al.

(10) Patent No.: US 10,346,649 B2
(45) Date of Patent: Jul. 9, 2019

(54) ASSET TRACKING USING ACTIVE WIRELESS TAGS THAT REPORT VIA A LOCAL NETWORK OF CONNECTED BEACONS

(71) Applicant: ABL IP HOLDING LLC, Conyers, GA (US)

(72) Inventors: Yenpao Lu, Cumming, GA (US); Kelby Edward Green, Boston, MA (US); Emanuel Paul Malandrakis, Boston, MA (US); Sajin George, Somerville, GA (US); Mitri J. Abou-Rizk, Newton, MA (US); Xiangrong Li, Brookline, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/865,801

(22) Filed: Jan. 9, 2018

(65) Prior Publication Data
US 2018/0196972 A1 Jul. 12, 2018

Related U.S. Application Data

(60) Provisional application No. 62/523,457, filed on Jun. 22, 2017, provisional application No. 62/445,031, filed on Jan. 11, 2017.

(51) Int. Cl.
*G06K 7/10* (2006.01)
*H04W 84/18* (2009.01)
(Continued)

(52) U.S. Cl.
CPC ....... *G06K 7/10207* (2013.01); *G06K 7/1091* (2013.01); *G06K 7/10158* (2013.01);
(Continued)

(58) Field of Classification Search
USPC ........................................................ 340/10.1
See application file for complete search history.

(56) References Cited

U.S. PATENT DOCUMENTS 5,917,425 A   6/1999 Crimmins et al.
6,657,549 B1  12/2003 Avery
(Continued)

FOREIGN PATENT DOCUMENTS

| CA | 2944228 A1 | 11/2015 |
| WO | 2008006077 A2 | 1/2008 |
| WO | 2012175957 A1 | 12/2012 |

OTHER PUBLICATIONS

Partial European Search Report for European Application No. 18150746.8, dated Jun. 7, 2018, 17 pages.
(Continued)

*Primary Examiner* — Santiago Garcia
(74) *Attorney, Agent, or Firm* — RatnerPrestia

(57) ABSTRACT

A tag is configured to provide information that enables a processor or other computing device to locate the tag and any asset associated with the tag in an area. The tag incorporates a motion sensor responsive to movements of the tag above a predetermined rate and a predetermined magnitude. In response to the movements above the predetermined rate and magnitude, the motion sensor generates a voltage exceeding a predetermined threshold. An energy-saving process exploits the tag's microcontroller's transitions between a "sleep" state and an "awake" state. While asleep, the microcontroller maintains a clock and data in memory, and monitors an input from the motion sensor. In response to voltages at the input over the predetermine threshold, the microcontroller receives signals from one or more nearby beacon nodes in a network operating in the
(Continued)

area, process the signals and transmit information based on the processed signals, for a position determination.

19 Claims, 41 Drawing Sheets

(51) Int. Cl.
| | |
|---|---|
| *H04W 52/02* | (2009.01) |
| *G06K 19/07* | (2006.01) |
| *G06Q 10/08* | (2012.01) |
| *G06K 7/00* | (2006.01) |
| *G06K 17/00* | (2006.01) |

(52) U.S. Cl.
CPC ..... *G06K 19/0716* (2013.01); *G06K 19/0723* (2013.01); *H04W 52/0274* (2013.01); *H04W 84/18* (2013.01); *G06K 7/0008* (2013.01); *G06K 7/10198* (2013.01); *G06K 2017/0045* (2013.01); *G06Q 10/087* (2013.01); *Y02D 70/00* (2018.01); *Y02D 70/1222* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/22* (2018.01)

(56) References Cited

U.S. PATENT DOCUMENTS

| | | | |
|---|---|---|---|
| 7,312,752 B2 | 12/2007 | Smith et al. | |
| 7,324,824 B2 | 1/2008 | Smith et al. | |
| 7,372,365 B2 | 5/2008 | Jackson | |
| 7,528,716 B2 | 5/2009 | Jackson | |
| 7,545,326 B2 | 6/2009 | Caliri et al. | |
| 7,577,444 B2 | 8/2009 | Bird et al. | |
| 7,602,338 B2 | 10/2009 | Smith et al. | |
| 7,719,418 B2 | 5/2010 | Grossman | |
| 7,791,470 B2 | 9/2010 | Karr | |
| 7,872,581 B2 | 1/2011 | Darianian et al. | |
| 7,941,096 B2 | 5/2011 | Perkins et al. | |
| 7,965,174 B2 | 6/2011 | Wong et al. | |
| 8,019,354 B2 | 9/2011 | Rae et al. | |
| 8,026,814 B1 | 9/2011 | Heinze et al. | |
| 8,031,120 B2 | 10/2011 | Smith et al. | |
| 8,089,344 B1 | 1/2012 | Zand | |
| 8,149,090 B2 | 4/2012 | Hall et al. | |
| 8,155,664 B2 | 4/2012 | MacFarland | |
| 8,294,568 B2 | 10/2012 | Barrett | |
| 8,305,190 B2 | 11/2012 | Moshfeghi | |
| 8,373,562 B1 | 2/2013 | Heinze et al. | |
| 8,400,268 B1* | 3/2013 | Malik .................. | G06Q 10/06 340/539.12 |
| 8,531,273 B2 | 9/2013 | Overhultz et al. | |
| 8,558,672 B2 | 10/2013 | Zand | |
| 8,598,988 B2 | 12/2013 | Overhultz et al. | |
| 8,674,806 B1 | 3/2014 | Malik et al. | |
| 8,674,829 B2 | 3/2014 | Karam et al. | |
| 8,787,961 B2 | 7/2014 | Skalicky | |
| 8,854,205 B2 | 10/2014 | Daniel | |
| 8,867,993 B1 | 10/2014 | Perkins et al. | |
| 9,100,788 B2 | 8/2015 | Karam et al. | |
| 9,138,825 B2 | 9/2015 | Albrecht et al. | |
| 9,324,202 B2 | 4/2016 | Lindig et al. | |
| 9,436,858 B2 | 9/2016 | Liao | |
| 9,509,402 B2* | 11/2016 | Ryan .................... | H04B 10/116 |
| 9,525,969 B2 | 12/2016 | Evans et al. | |
| 9,711,047 B1 | 7/2017 | Knas et al. | |
| 9,711,048 B1 | 7/2017 | Knas et al. | |
| 9,721,451 B1 | 8/2017 | Knas et al. | |
| 9,741,237 B1 | 8/2017 | Knas et al. | |
| 9,877,266 B1 | 1/2018 | Knas et al. | |
| 9,877,298 B1 | 1/2018 | Knas et al. | |
| 9,881,484 B1 | 1/2018 | Knas et al. | |
| 9,949,091 B1 | 4/2018 | Knas et al. | |
| 9,984,556 B1 | 5/2018 | Knas et al. | |
| 2002/0081020 A1* | 6/2002 | Shimazu ................ | G06Q 30/02 382/154 |
| 2006/0097046 A1 | 5/2006 | Fassio et al. | |
| 2006/0163349 A1* | 7/2006 | Neugebauer ......... | G06Q 20/387 235/383 |
| 2007/0247366 A1 | 10/2007 | Smith et al. | |
| 2008/0030330 A1* | 2/2008 | Vock ........................ | A43B 3/00 340/568.1 |
| 2008/0231449 A1 | 9/2008 | Moshfeghi | |
| 2010/0110948 A1 | 5/2010 | Batta | |
| 2010/0214116 A1 | 8/2010 | Huang et al. | |
| 2011/0012782 A1 | 1/2011 | Lee et al. | |
| 2012/0001728 A1 | 1/2012 | Janiszewski | |
| 2012/0050101 A1* | 3/2012 | Whiteman ............ | G01S 5/0027 342/357.31 |
| 2012/0119883 A1* | 5/2012 | Bekritsky ............ | G06K 7/0008 340/10.4 |
| 2012/0242481 A1* | 9/2012 | Gernandt ........... | G06K 19/0705 340/539.13 |
| 2014/0240088 A1* | 8/2014 | Robinette .......... | G08B 13/1427 340/5.61 |
| 2014/0327521 A1* | 11/2014 | Chen .................... | G06Q 10/087 340/8.1 |
| 2015/0134383 A1* | 5/2015 | Lee ........................ | G01S 5/0294 705/7.12 |
| 2015/0319572 A1* | 11/2015 | Jalali .................. | G06K 7/10009 455/456.1 |
| 2015/0369618 A1* | 12/2015 | Barnard ............. | H05B 37/0272 701/491 |
| 2016/0033635 A1* | 2/2016 | Hansen .................... | G01S 13/75 342/451 |
| 2016/0248506 A1 | 8/2016 | Ryan et al. | |
| 2017/0139032 A1* | 5/2017 | Ro 1 ......................... | G01S 5/02 |
| 2018/0213360 A1* | 7/2018 | Schmitt ............. | H04M 1/72577 |

OTHER PUBLICATIONS

Canadian Office Action for Canadian Application No. 2,991,337, dated Sep. 10, 2018, 5 pages.
Extended European Search Report for European Application No. 18 150 746.8, dated Sep. 26, 2018, 15 pages.
Canadian Office Action for Canadian Application No. 2,991,337, dated Jan. 30, 2019, 6 pp.

* cited by examiner

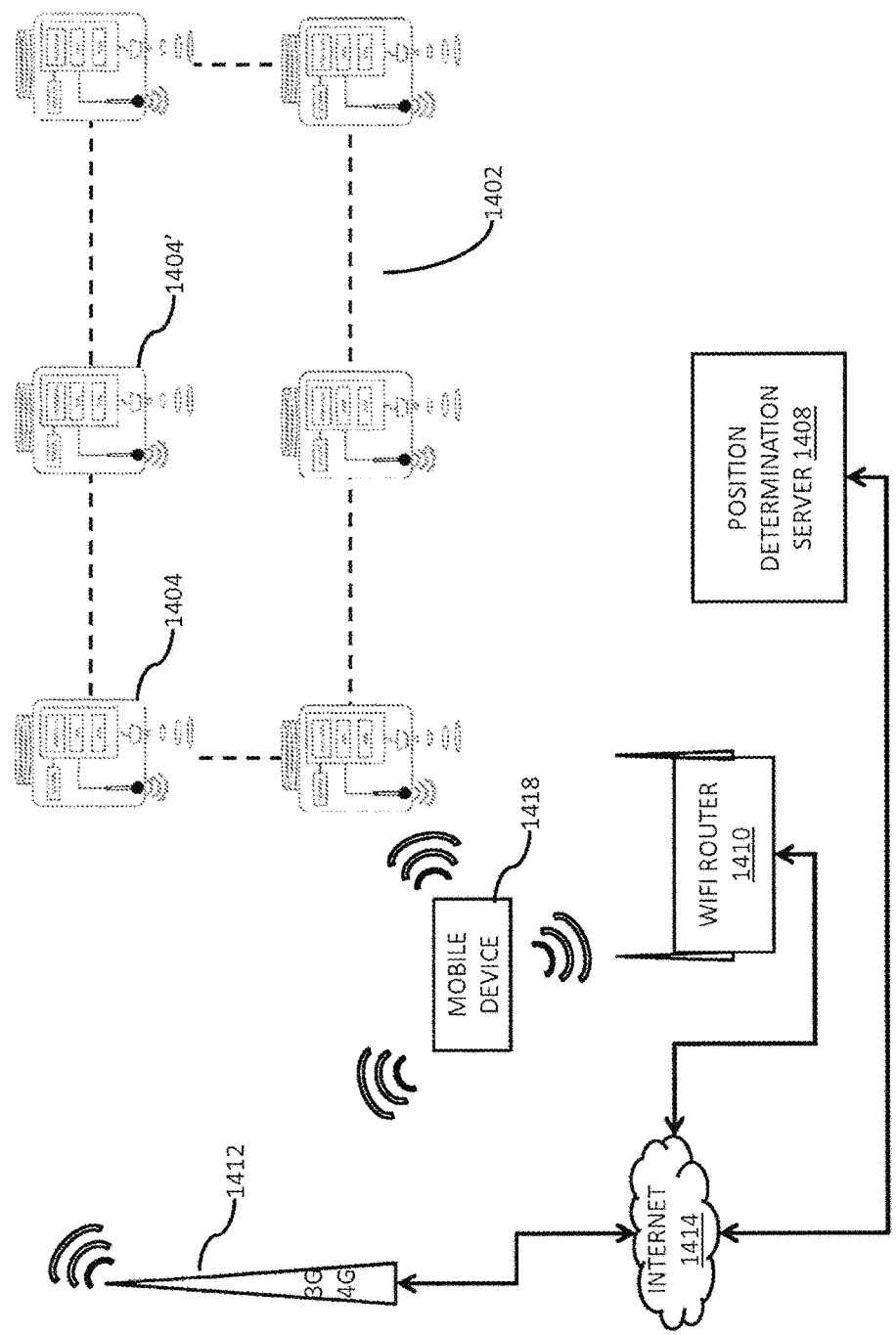

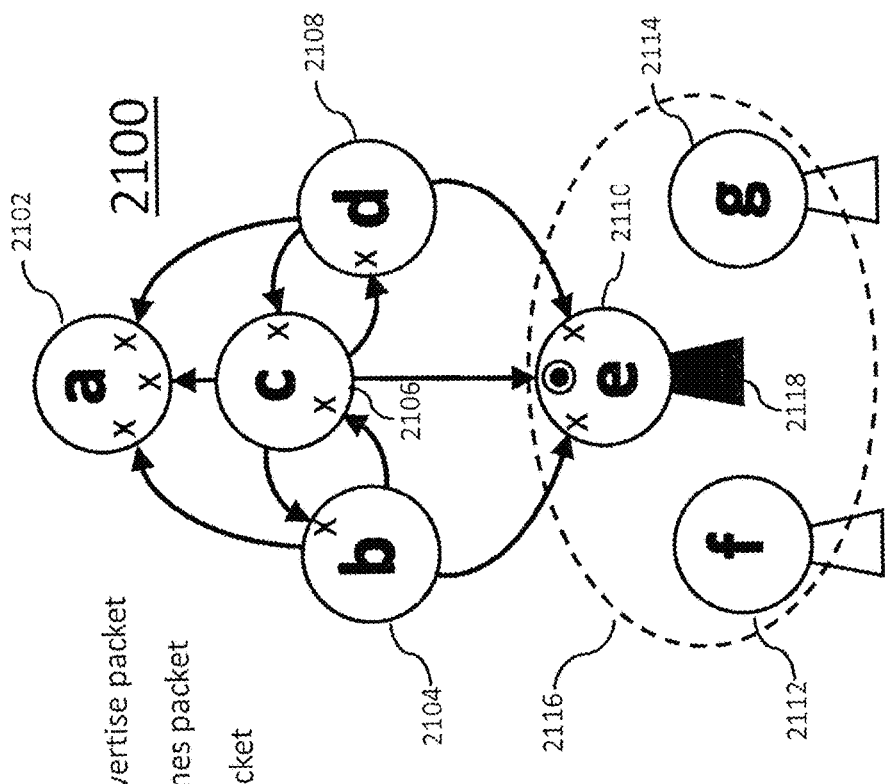
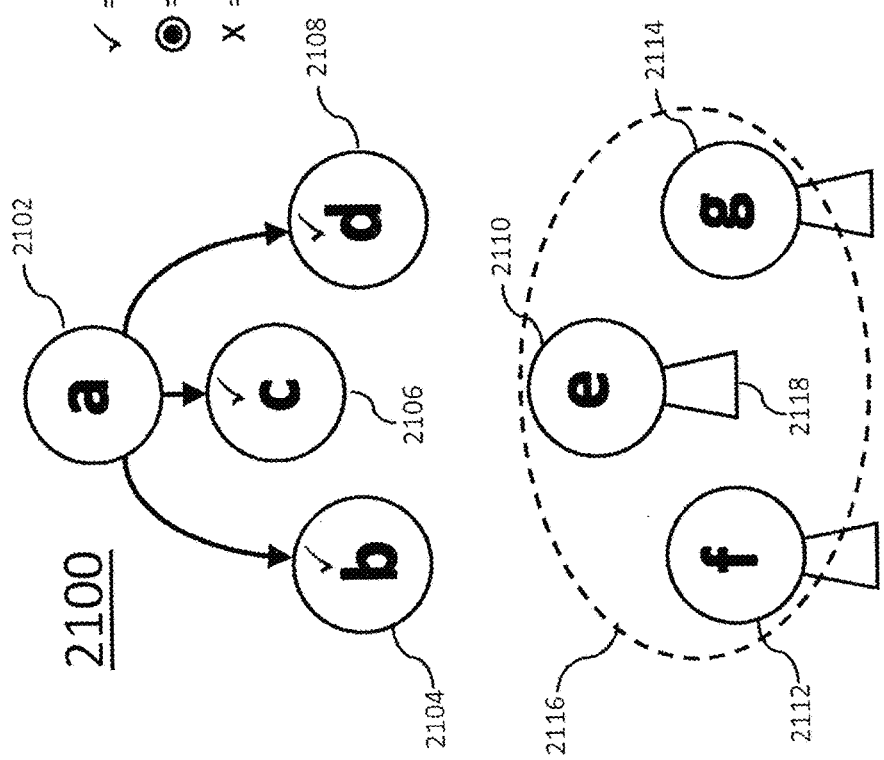

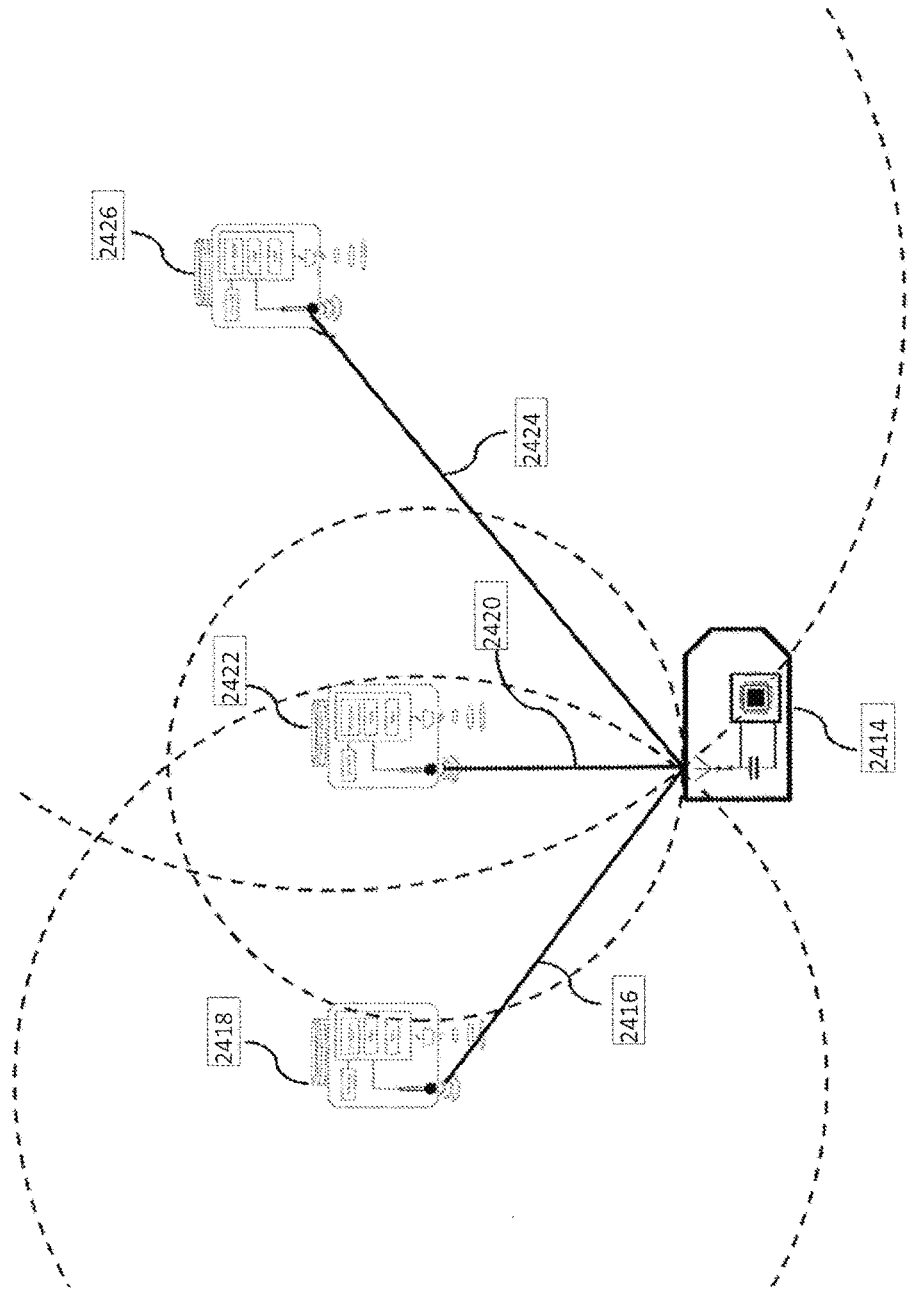

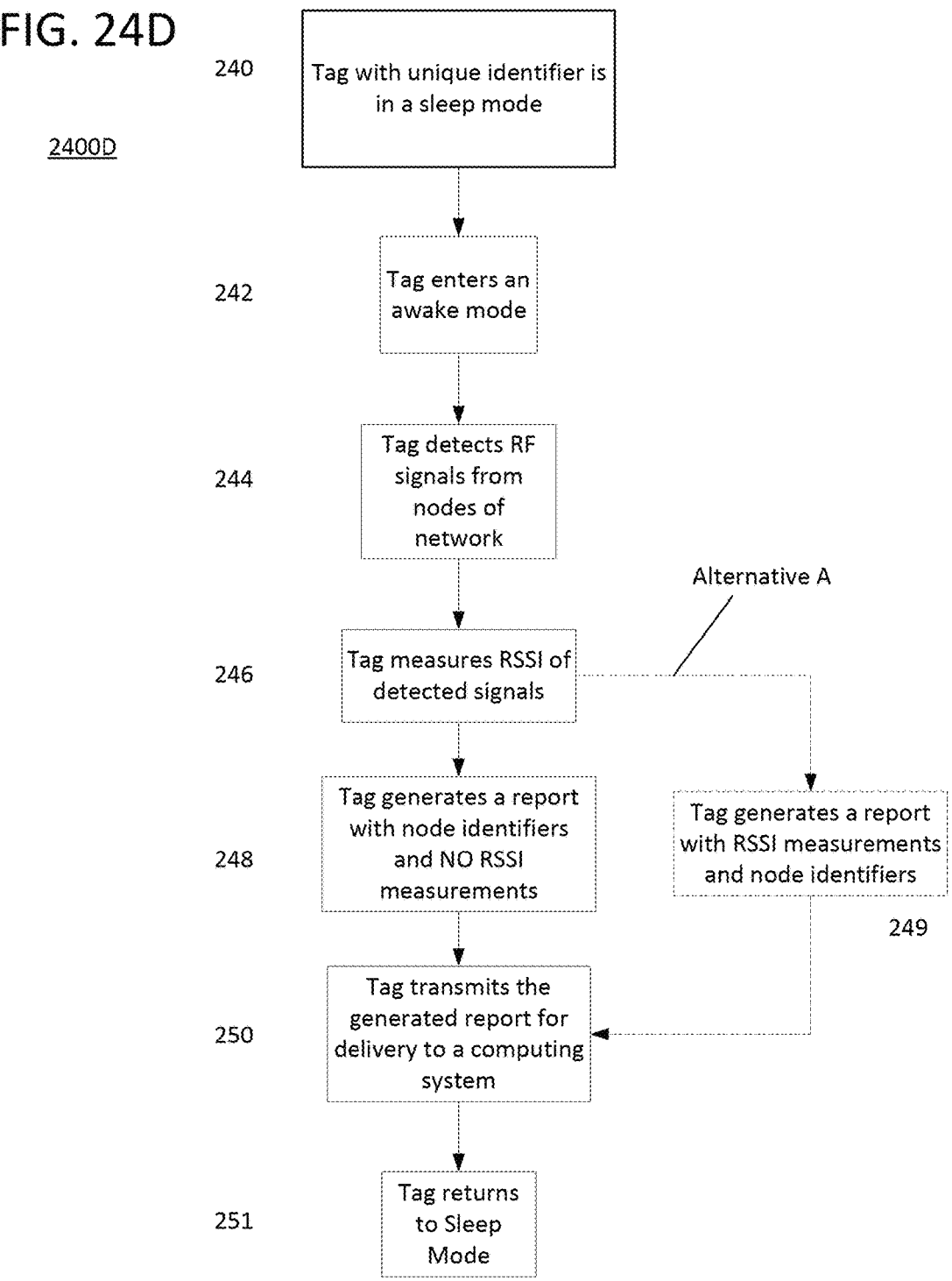

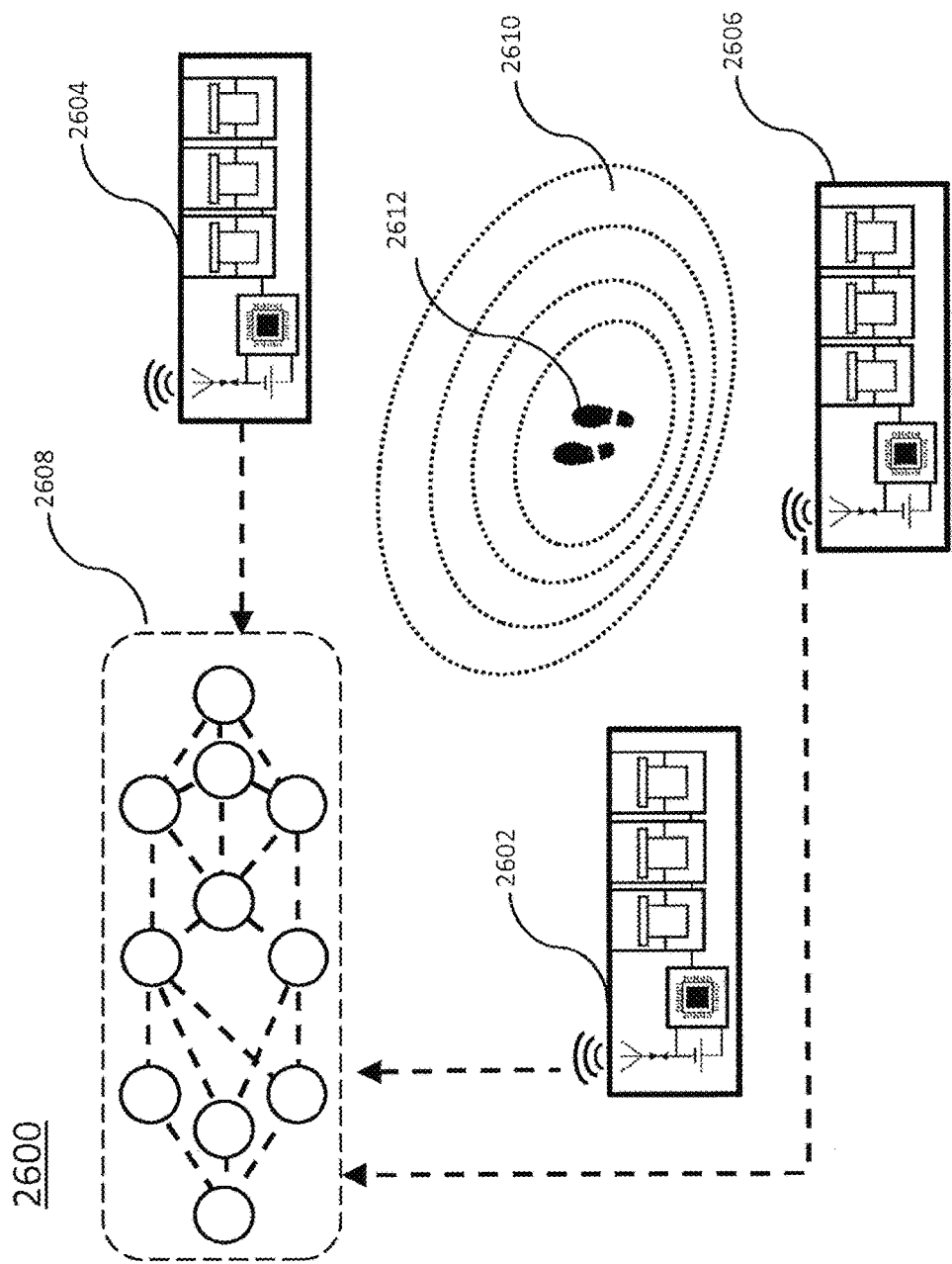

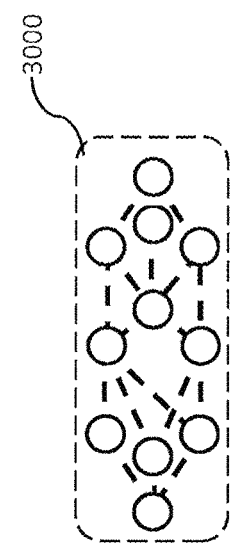
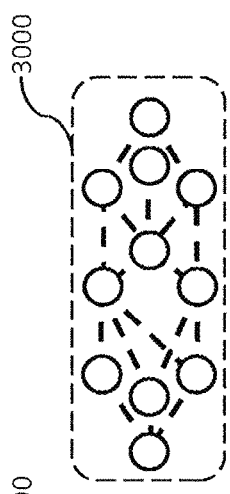
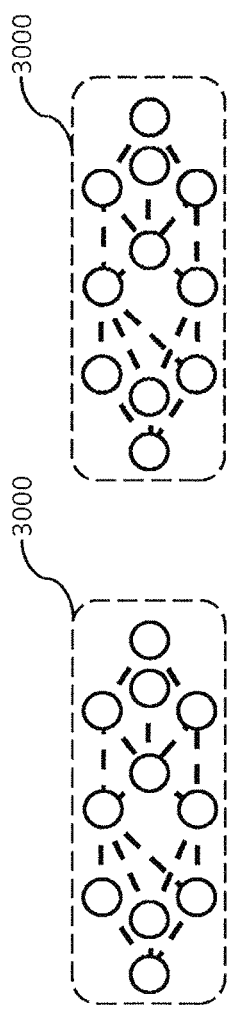
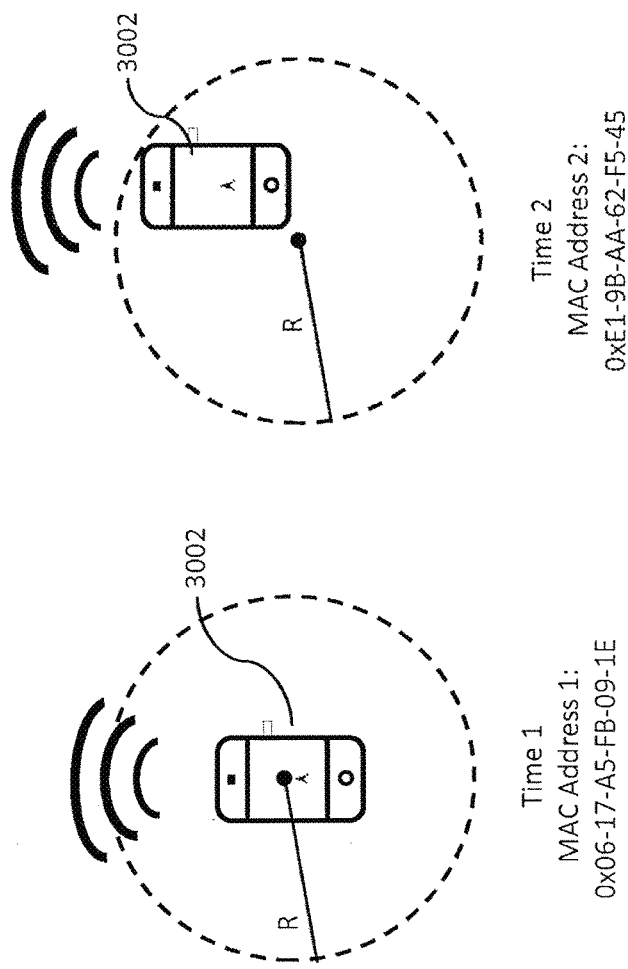

ASSET TRACKING USING ACTIVE WIRELESS TAGS THAT REPORT VIA A LOCAL NETWORK OF CONNECTED BEACONS

RELATED APPLICATIONS

This application claims the benefit of U.S. Provisional Application No. 62/523,457 filed on Jun. 22, 2017 entitled "Asset Tracking Using Active Wireless Tags that Report via a Local Network of Connected Beacons," and U.S. Provisional Application No. 62/445,031 filed on Jan. 11, 2017 entitled "Asset Tracking Using Active Wireless Tags that Report via a Local Network of Connected Beacons," the entire disclosures of which are incorporated herein by reference.

TECHNICAL FIELD

In various examples, the present subject matter relates generally to a device and method for alternately operating in a low power consumption mode and in a higher power consumption mode. When in the higher power consumption mode, the device communicates information related to network devices in the proximity of the device to allow the location of the device to be determined.

BACKGROUND

Asset tracking systems in previous systems relied upon the detection of an asset tracking device by a detection device. For example, the asset would pass by the detection device and the detection device would by some detection means would detect a "tag" or other identifier attached to the asset. The asset tracking system would know the location of the asset because the system would have knowledge of the location of the detection device.

Examples of various detection means include optical detection means and radio frequency means. An optical detection means may include detecting light reflected from a reflective tag attached to an asset, reading a bar code or other code attached to the asset or the like. An example of a radio frequency detection means may include engaging a radio frequency identifying (RFID) tag or the like attached to the asset. Like a barcode, the RFID tag may provide information about the asset.

The above examples of optical and radio frequency detection means require the detection means to actively engage the tag attached to the asset. Other examples include more complex asset tracking devices, larger than the "tags" described above, that constantly update and report the location of an asset through wireless radio frequency communication. The constant position updating and reporting causes the asset tracking device to always operate in a high power consumption state.

BRIEF DESCRIPTION OF THE FIGURES

The drawing figures depict one or more implementations in accordance with the present concepts, by way of example only, not by way of limitations. In the figures, like reference numerals refer to the same or similar elements.

FIG. 14A depicts an example of a configuration of RF enabled modulatable beacon lights arranged in an ad hoc mesh-type network and optionally/temporarily connected to Internet resources through a nearby mobile device;

FIG. 21A schematically depicts an illustrative VLC+RF mesh in a first state of packet transmission;

FIG. 21B schematically depicts an illustrative VLC+RF mesh in a second state of packet transmission;

FIG. 24B depicts an example of position estimation of passively powered tags using received radio signal strength indication;

FIG. 24D illustrates an example process based on the system of FIG. 24C.

FIG. 26 depicts an example of the use of tomographic footfall detection by sensors communicating with a lighting mesh;

FIGS. 30A-30C depict examples of location tracking of a user device despite random changing of MAC address.

DETAILED DESCRIPTION

Figure 1:
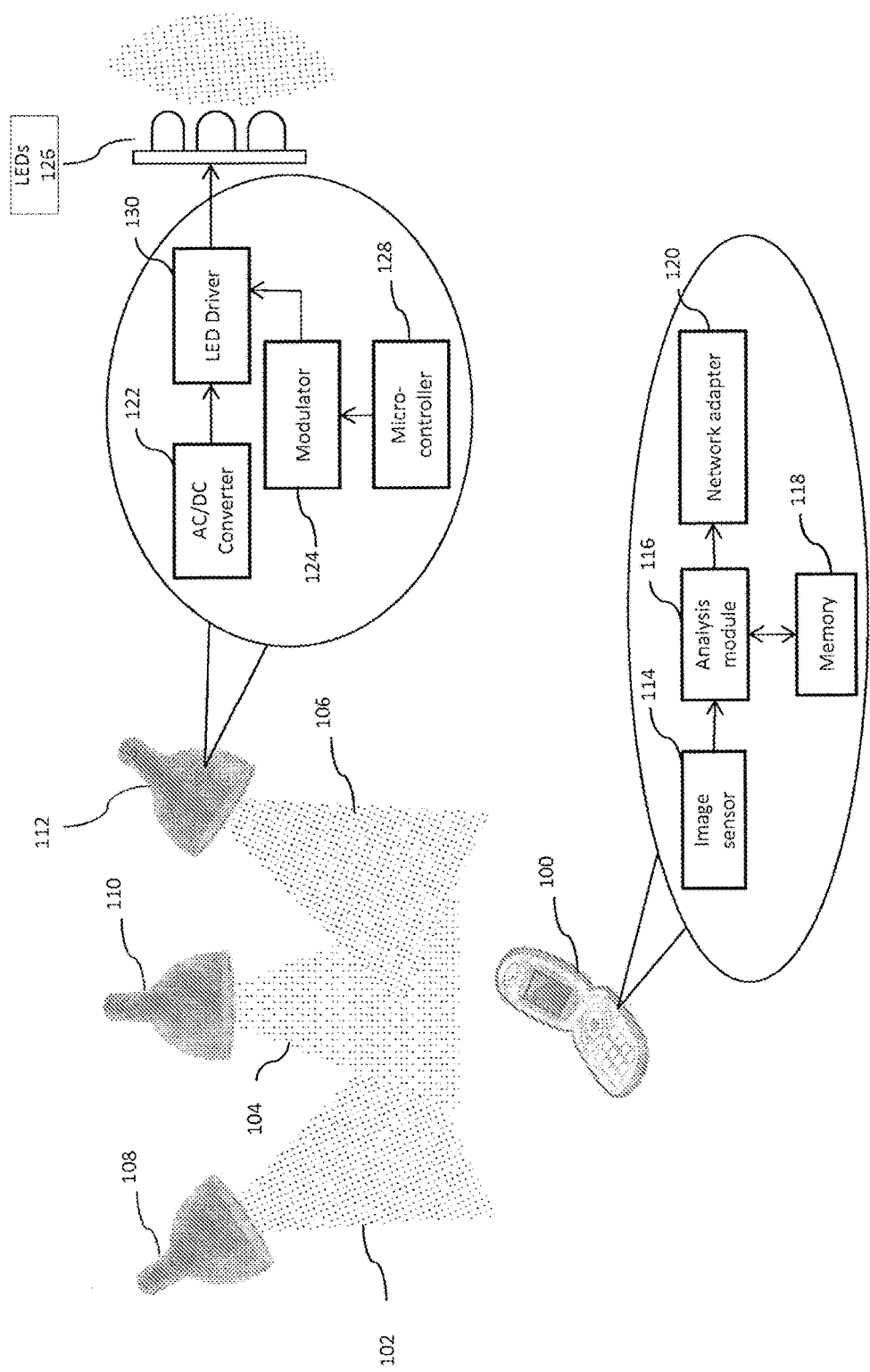
FIG. 1 is a representation of a mobile device receiving modulated light from LED light sources.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In later discussions of some examples, mobile "tags" are small, smart, powered devices that exchange radio signals with beacons having networked radio capability. The tag is active in that it actively communicates to obtain and it actively processes data and sends information. The tag, however, may be powered in a passive manner. In most examples, the networked beacons are lighting devices that also support visible light communications (VLC). A tag operates in a wireless network (e.g. a mesh) of the radio-frequency (RF) enabled beacon lighting devices. While in the service area, the tag actively collects and reports information that is used to estimate current position of the tag.

This positional information is uploaded by the tag through the wireless mesh network and used by a computing system (e.g., a back-end server or the gateway computer of the local mesh network) to estimate the position of the tag within the service area. A number of such tag position determinations over time can be used to track movement of the tag and thus movement of any asset to which the tag is attached or otherwise associated. Position estimates, for example, may be used to track departures and arrivals of tags/assets for the service area, and other spatial and temporal metrics of interest.

In such examples, a smart, powered tag therefore is configured to provide information that enables a device to locate the tag in the service area. The tag is configured to receive signals from one or more beacons in the wireless network of a particular venue or other service area, process the signals and transmit information based on the processed signals. The information may be transmitted to the one or more beacon devices from which signals were received or to another device in or in communication with the wireless mesh network.

In a specific methodology example, the tag goes through a sleep-wake cycle (governed by various criteria, described below) in order to conserve power and minimize network traffic. In such an implementation, the tag transitions between a sleep-state and a wake-state. When the tag "awakes," information collected by the tag includes RSSI (received signal strength indication), the power level of radio signals received from nearby nodes, as well as the unique node ID signals; and any or all of this information may be reported via transmission(s) to a back-end computer via the wireless mesh network.

As outlined above, the tags operate with a system having a wireless network of beacons, e.g. VLC enabled lighting devices having wireless communication capabilities. To fully appreciate aspects of the tag operations and tracking, it may be helpful first to consider examples of the over system.

In FIGS. 1-10 and discussion thereof, systems and methods that disclose providing a positioning service for devices based on light received from one or more light sources. FIGS. 11-30 pertain to the integration of VLC and radio capabilities in a lighting system.

In some examples, light sources are used to provide an indoor positioning service to mobile devices. Each light source is given a distinctive identification (ID) code, and database associates each ID code with specific location data (coordinates). The ID code is broadcast by modulating the visible-light output of the LED light source. This modulation occurs at speeds undetectable by the human eye yet detectable by a camera-equipped mobile device as modulation artifact in images acquired by the camera. Since robust detection of ID information broadcast by a point source of light is feasible only the vicinity of the source, the mobile device can be presumed to be in the vicinity of a light whose ID it detects. Detected light IDs can therefore be used to estimate the mobile device's location, e.g., by matching detected IDs to spatial coordinates using a database on a server. When a mobile device identifies light from more than one light source, the position of the device can be geometrically estimated with even greater accuracy.

In various examples, hashing or other encryption techniques may be used to obscure ID codes from third-party observers (e.g., competitors who wish to map a store and its VLC system). Herein, "hashing" denotes the unique mapping of a digital string to a data string of fixed size, with slight differences in input data producing large differences in output data. The hashed output for a given input string constitutes an encryption of the input string. For example, in an illustrative example hashed ID codes may be detected by a mobile device and transmitted to a server for de-hashing; the hash function itself is never exposed to third-party examination by being entrusted to the mobile device.

FIG. 1 schematically depicts portions of an illustrative example of indoor VLC positioning in which a mobile device 100 is illuminated by one or more LED light sources. Having detected the IDs of the one or more light sources, the device 100 communicates (e.g., via a radio means of communication) with a database that associates light IDs with light location coordinates and, potentially, other content. The location of the illustrative example may be any space capable of being illuminated by VLC light sources in a readily detectable manner.

In the illustrative example of FIG. 1 a mobile device 100 receives light 102, 104, and 106 from three light sources 108, 110, 112. Each light source 108, 110, 112 can be any lighting source used for general-purpose illumination, spot illumination, or backlighting that is capable of transmitting information by means of visible light communication (VLC). For the purposes of this disclosure, we consider any form of light capable of being suitably modulated (e.g., an LED light source) as a VLC light source: LED light sources are referred to extensively herein, but such references are illustrative and technologically nonrestrictive.

LEDs can be dimmed and brightened (i.e., modulated) more rapidly than the human eye can detect. LED light is therefore a medium through which data can be transmitted to devices equipped with appropriate light-sensing capability, e.g., a digital camera. As will be clear to persons familiar with the art of communications engineering, many forms of digital (two-state) and analog (continuous-state) modulation may be applied to an LED's light output, including amplitude-shift keying, amplitude modulation, frequency modulation, and many others. For example, the brightness of a light source may be modulated by one or more sinusoidal signals. All modulation techniques that can be applied to visible light are contemplated and within the scope of the subject matter, subject only to the condition that the modulation is of a degree and/or frequency not detectable by a human observer. Moreover, modulation of forms of light not generally detectable by a human observer (e.g., low-level infrared light), which not constrained by limits on flicker perception, is also contemplated and within the scope of the subject matter and intended whenever "VLC" and similar terms are used.

An example of a modulation technique employed in various examples is Digital Pulse Recognition (DPR). This technique exploits the rolling shutter mechanism of a complementary metal-oxide-semiconductor (CMOS) image sensor such as is found in many mobile-device cameras. As shall be further clarified with reference to FIGS. 6-12, a rolling-shutter CMOS camera sequentially captures portions of each image frame, whether a still photograph or a video frame, on a rolling (time-sequential) basis. These portions are typically rows of sensors (e.g., charge-coupled devices [CCDs]) corresponding to lines of image pixels that are exposed for successive periods of time. (A CCD may be "exposed" under electronic control—that is, may accumulate light-induced electrical charges—for only for a fraction of the time that it is actually illuminated by a light source. Herein, "exposure" refers to a period of charge accumulation, not a period of illumination by light.) Because rows of CCDs are exposed sequentially, illumination may be of a different brightness during the exposure of each row. Accordingly, a time-varying light source may produce rowwise striping in an image frame. For example, a light source modulated by a periodic waveform will tend to produce stripes of even width across a CMOS image, stripe width being a function of waveform period and rolling-shutter exposure timing. The frequencies of one or more distinct VLC tones can be deduced from striping patterns in an image.

For example, consider the three light sources 108, 110, 112 of the illustrative VLC beacon light-based indoor positioning system of FIG. 1 with the output of lights 108, 110, and 112 sinusoidally modulated at, respectively, 500 Hz, 600 Hz, and 700 Hz. These frequencies are well above the human flicker fusion threshold (i.e., about 60 Hz; rarely, as high as ~120 Hz), therefore undetectable to the eye. Mobile device 100 within view of lights 108, 110, 112 can detect DPR tones in light 102, 104, 106; correlate detected tones with light IDs by accessing a database that links IDs to light locations (as shall be shown more fully in FIG. 2); and then geometrically calculate (or receive the results of such a calculation from a server, not shown in FIG. 1) an estimate of its own location based on the locations of the detected lights 108, 110, 112. Even a single light detection would suffice for an estimate of the position of device 100.

The illustrative device 100 comprises an image sensor 114, analysis module 116, and digital memory 118 in order to capture images and analyze the images to determine if VLC information is present therein. To detect information encoded in ambient light, the mobile device 100 can analyze one or more image frames captured by the sensor 114 by using the module 116, whose logic can be implemented in any combination of hardware and software. For example, the module 116 can be an application that runs on a computational capability of the device 100. A network adapter 120 enables the mobile device 103 to connect to, for example, cellular telephone, Bluetooth, and WiFi networks. The network connection 120 can be used to access a data source containing light ID codes linked to location data and location-dependent content. Linking of ID codes to location data can also be accomplished by storing location data in the mobile device memory 118, but the network adapter 120 allows for greater flexibility and decreases the internal device resources needed.

Estimation of position as described above, and/or by other means, can occur with little to no user input, and can be employed in a number of ways, depending on the desired application. In an illustrative case of an indoor navigation application, the user would see an identifying "you are here" marker overlaid on a map of the indoor space they are in. In the case of content delivery, the user might see on their mobile device 100 images, text, videos, recorded audio, or other information about objects they standing near.

FIG. 1 also depicts internal components commonly found in a typical, illustrative LED light source (e.g., light 112) with the addition of components to allow for the transmission of optical signals via VLC. The VLC LED light source 112 connects (e.g., via Edison socket or other standard socket) to alternating current (AC) electrical power (e.g., mains power at 120 V, 60 Hz or other standard power) via a converter 122 that converts AC power into an direct-current (DC) power appropriate for most electronic devices. Light 112 also comprises a modulator 124 that increases and decreases power to one or more LEDs 126 to modulate their brightness, a microcontroller 128 which controls the rate and shape of modulation of the LEDs 126, and an LED driver circuit 130 which provides appropriate voltage and current to the LEDs 126.

The microcontroller 128 contains a nonvolatile memory storage area (e.g., programmable read only memory, electrically erasable programmable read only memory, or Flash) that stores the ID code of the light 112. The task of the microcontroller 128 is to send a predetermined (e.g., programmed) sequence of signals to the modulator 124, which in turn interfaces with the LED driver 130 to modulate the visible light from the LEDs 126. The sequence of signals sent from the microcontroller 128 determines the form of modulation imposed on the light from the LEDs 126 and the information conveyed by such modulation.

Figure 2:
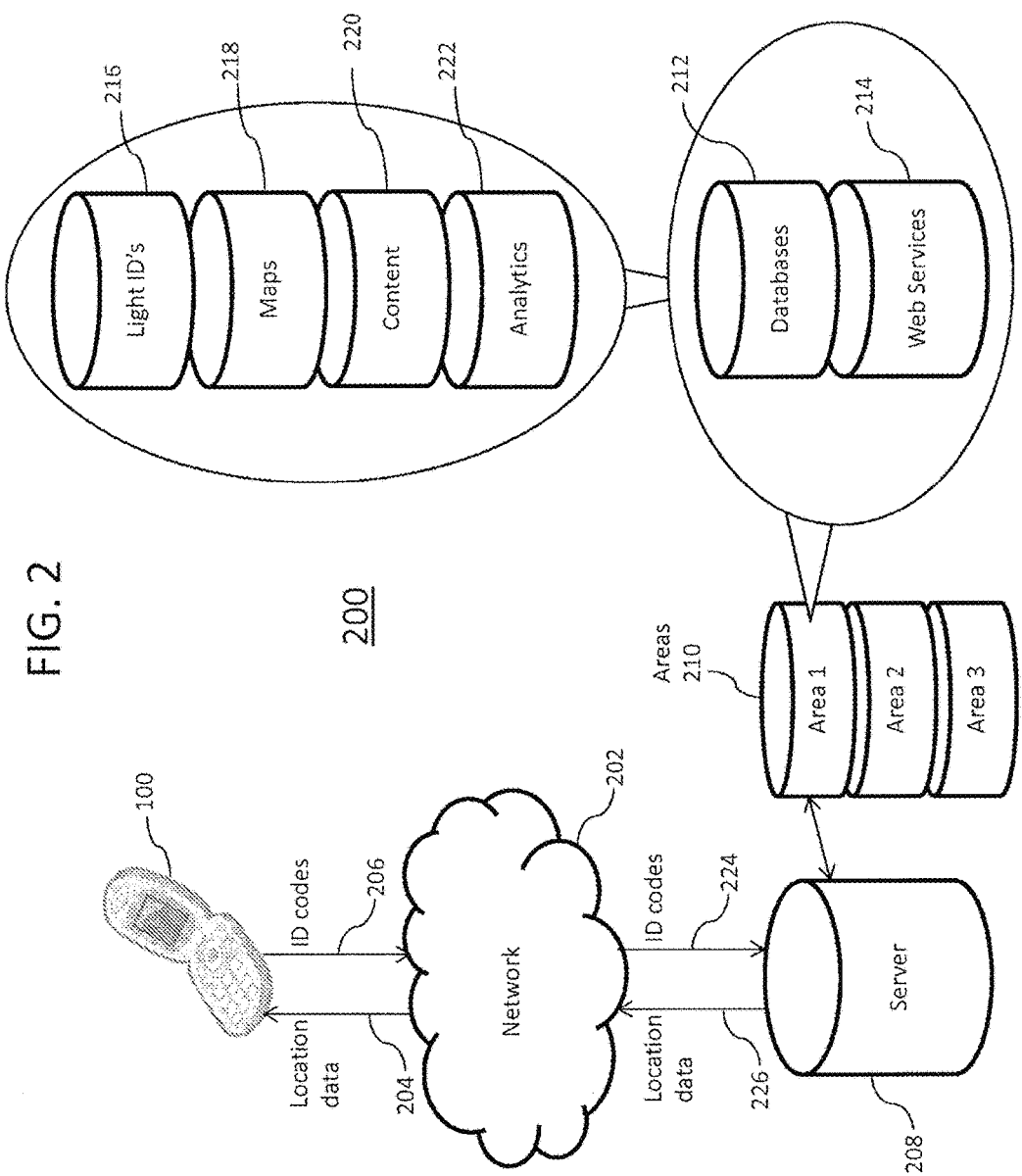
FIG. 2 illustrates a block diagram of a mobile device exchanging identification information and location information with a server via a network.

FIG. 2 is a schematic depiction of an illustrative system 200 in which a mobile device 100 that is illuminated by one or more VLC lights (not shown) is connected wirelessly via its network adaptor (e.g., adaptor 120 of FIG. 1) to a network 202. A multiplicity of mobile devices (not shown) illuminated by VLC lights may communicate with the network 202, as may other devices and networks (not shown). The network 202 can consist of a wired or wireless local area network with a method to access a larger wide area network or a cellular data network (e.g., Edge, 3G, 4G, and LTS). In essence, the mobile device 100 sends VLC detected light-source ID codes 206 through the network 202 to a server 208. The server 208 returns location information 204 to the device 100.

In various examples, the network 202 may comprise a hierarchy of networks. Such a hierarchy of networks may include a network of radio-frequency (RF) devices (e.g., Bluetooth low-energy transceivers) that are co-located with the VLC lights in an indoor space, that are powered from the power source of the VLC lights, and that intercommunicate with each other in a mesh topology or other network topology. The VLC lights may be controlled through the nodes of the low-level RF mesh (e.g., the lights' ID codes, modulation schemes, and on-off behaviors may be thus controlled). Such VLC-integrated RF mesh may relay data between any devices capable of suitable RF communication with the nodes of the mesh, including mobile devices, stationary computers, sensors, smart tags, robots, drones, and other devices.

Communications from the device 100 to the network 202 can include data additional to or other than light ID codes 206, including sensor data such as but not limited to GPS coordinates, compass measurements, and accelerometer/gyroscope data. Communications from the network 202 to the device 100 could include data additional to or other than location data, including but not limited to recorded audio, videos, text, and images, and the selection of such data may depend on criteria that include one or more of (but are not limited to) device location, temporal criteria, historical criteria, and user-specific criteria. Temporal criteria can include, for example, time of day, week, month, or year; for example, seasonal marketing and content could be automatically presented to the user of device 100, or content in the form of morning, evening, or nightly specials could be presented at particular times throughout a day. Historical criteria can include user location history (e.g., locations visited frequently), Internet browsing history, retail purchases, or any other information recorded about a mobile device user. User-specific criteria can include age, gender, past buying habits, and other information, as well as policies or rules set up by a user to specify the type of content they wish to receive or actions the mobile device should take based on location information. In an example of content provision based on user-specific criteria, a 20-year-old male user may receive different advertisements and promotions than a 60-year-old female user.

Illustratively, the capability of the server 208 may be physically and/or logically divided into portions or "areas" 210, each of which performs functions pertaining to a distinct service location. Distinct service locations are physical zones, either within a single structure or at diverse locations that are served by distinct VLC systems. Each location-specific server area 210 contains databases 212 and web-service resources 214 devoted to the location. Databases 212 consist essentially of information pertaining to a specific service installation (e.g., light IDs 216, maps 218, content 220, analytics 222). The installation-specific web-service resources 214 enable services which allow users, customers, administrators, and developers access to ID codes, indoor locations, and other information.

In an illustrative VLC indoor location service, the server 208 handles incoming ID codes 224 to appropriately return indoor location data 226 to the network for transmission to the mobile device 100. Handling of ID codes can include receiving incoming ID codes 224, searching service-location-specific databases 212 to enable code-to-light matches, calculating position coordinates based on ID codes 224, and communicating indoor location data 226.

In a typical VLC-enabled installation, tens to hundreds of LED light sources broadcast distinctive ID codes. The purpose of the Light IDs database 216 is to record where the ID codes are physically assigned at the installation. These records can take the form of but are not limited to GPS coordinates mapped into an indoor space. Maps in a location-specific Maps database 218 can take various physical and digital forms, being obtained either directly from the service location or from third-party vendors or other outside sources. A location-specific Content database 220 may contain, for example, ads and inventory information, and a location-specific Analytics database 222 may contain, for example, records of user shopping behavior. Databases may in general contain static, user-based, and/or dynamic content. Static content is unchanging information associated with the specific area 210, e.g. audio recordings, streaming or stored video files, texts, images, or links to local or remote websites. User-based content is dependent on user criteria, e.g., user age, sex, preference, habits, etc. Dynamic content changes with varying frequency, e.g., daily, weekly, monthly, etc.

At a typical VLC service location there is a small possibility of having duplicate ID codes, since there are in practice a finite number of available codes. To deal with duplicate ID codes, additional distinguishing information can be contained in the individual log records of the Light IDs data base 216, e.g., records of ID codes of lights in physical proximity to each other. The probability of a pattern of ID code proximities being inadvertently duplicated at a single location, or at more than one location, can be made vanishingly small by appropriate ID generation and assignment procedures. Distinguishing information may also include sensor data, including but not limited to accelerometer or gyroscope data, WiFi triangulation or fingerprinting data, GSM signature data, infrared or Bluetooth data, and ultrasonic audio data.

In various examples, "calibration" of a light-based positioning system herein refers minimally to the population of the Light IDs database 216 with light IDs installed at a given service location and physical location information for those lights. In an example, calibration of a light-based positioning system, either upon first installation or after the addition or replacement of VLC lights, is performed by having a user of a mobile device equipped with an application having a calibration capacity walk around the indoor service space of the positioning system. The mobile calibration application contains map information for the indoor space, with the positions of the LED light sources overlaid on the map. As the user changes position, they will receive ID codes from various lights. When the user receives an ID code, they will use the map on the mobile app to select which LED light source that they are standing under. Specific lights may be made to blink (e.g., by commands sent through an integrated Bluetooth mesh) in order to facilitate identification of lights by the user. After the user confirms the identity of a light, the mobile application sends a request to the server 208 to match the ID code detected with the light location contained in the lighting plan. In various examples, the calibration may be automated by using robots or flying drones to quarter the indoor space, associating light IDs with physical locations and potentially undertaking other calibration-related functions as well, e.g., performing automated, laser-based indoor-surveying operations in order to produce highly accurate position measurements for association with light ID detections. Manual or automated calibration procedures may also be employed to acquire finely-space measurements of light fields, radio fields (e.g., radiated by a mesh of Bluetooth transceivers), or other variables throughout the volume of a served space, a process herein termed "fingerprinting." Thus, calibration minimally includes the association of light IDs with light locations, but may also include the gathering of other data, including fingerprinting.

Calibration of LED light locations can also be achieved via crowd-sourcing. In this method, as mobile devices carried by users move around an indoor space receiving ID codes 206, they send requests to the server 208 containing the light ID code 206 received. The server knows the device's current approximate position based on other positioning techniques such as WiFi, GPS, GSM, inertial sensors, etc. Given enough users, machine learning algorithms running on the server 208 can be used to accurately infer the position of each LED light source. The accuracy of this calibration method depends upon several variables, including number of mobile application users. Various computational techniques, including Bayesian techniques, can be used to combine spatial information from a variety of sources to produce light location estimates that are improved or updated at intervals: for example, light-location estimates from a manual or automated commissioning process can be made more accurate and complete over time by incorporating crowd-source information in an iterative Bayesian process. For example, a light-based positioning system that was manually commissioned at first startup may be subsequently updated by crowd-sourcing as lights are replaced or added.

Figure 3:
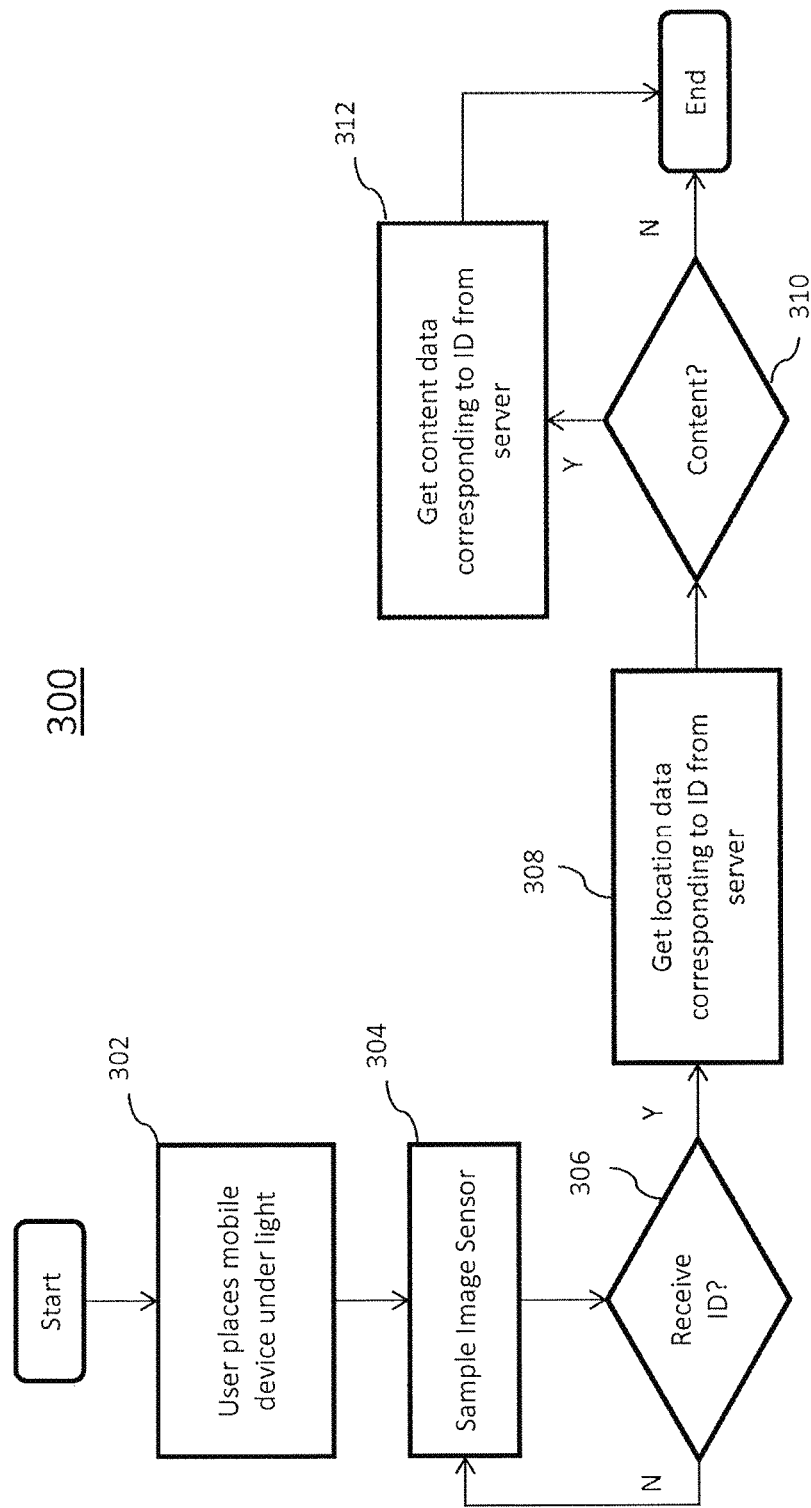
FIG. 3 illustrates the process of a mobile device receiving location and content information via a light-based positioning system.

FIG. 3 is a schematic depiction, according to an illustrative example, of the process 300 of receiving location and content information through visible light. Block "User places mobile device under light" 302 corresponds to the act of physically placing a camera-equipped mobile device underneath a VLC-enabled LED light source, e.g., by pulling the device out of a pocket. The user happens to be standing approximately underneath or adjacent to the LED light source. Block "Sample image sensor" 304 denotes the action, by an app installed on the mobile device, of commanding the embedded digital image sensor of the mobile device to acquire an image and reading the image data from the sensor. Block "Receive ID?" 306 denotes the conditional action to either move forward (if one or more light IDs are detected in the image), or return to "Sample image sensor" 304. Block "Get location data" 308 denotes the transmission of the one or more light IDs to a server and receipt from the server of a location estimate for the mobile device. Block "Content?" 310 denotes an inquiry by the server as to whether content (e.g., ads) exists that is associated with the received one or more ID codes (and/or the location estimate derived from the one or more ID codes) and meets criteria for transmission to the mobile device app. If transmissible content is available, the procedure continues to block "Get content data" 312, where the content is accessed and transmitted to the mobile device; if not, the process ends.

Figure 4:
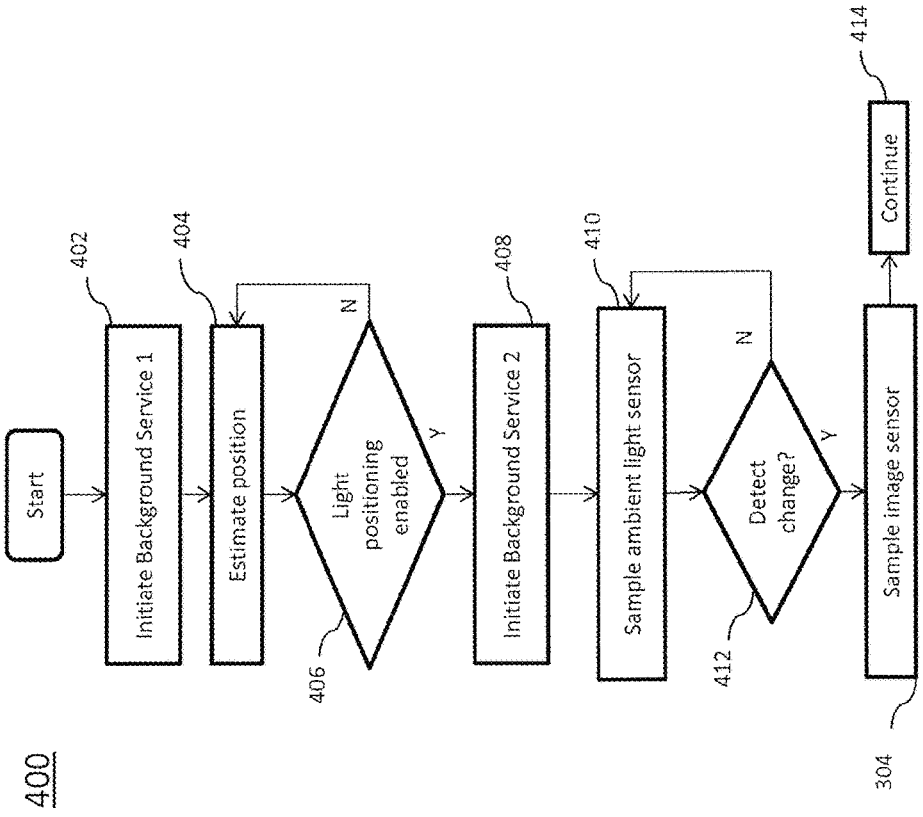
FIG. 4 is a process illustrating background services and how they activate various sensors contained inside the mobile device.

FIG. 4 is a schematic depiction of a method 400, according to an illustrative example, for turning on background services of a VLC location service application running on a mobile device and for determining when to sample an image sensor of the mobile device. Block "Initiate Background Service 1" 402 denotes activation of the first background service running on the mobile device (as, e.g., a capability of a VLC app running on the device). Service 1 is tasked with communicating wirelessly to determine if the mobile device is close to a VLC-enabled area. The wireless communication may comprise radio-frequency communication techniques such as global position system (GPS), cellular communication (e.g., LTE, CDMA, UMTS, and GSM), WiFi communications, or other. Block "Estimate Position" 404 denotes a function that samples the wireless communication signal and, based on sampled observations (e.g., RF signal strength measurements, RF transmitter ID codes) decides whether or not the mobile device is close enough to a VLC-enabled area to move to the next service.

Block "Light positioning enabled?" 406 denotes a conditional action to move forward if the mobile device is estimated to be within a VLC-enabled area or to repeat the "Estimate position" function if not. Block "Initiate Background Service 2" 408 is activated if the mobile device is estimated to have entered a VLC-enabled enabled area. Service 2 is tasked with performing the functions that obtain location information from modulated light. Block "Sample ambient light sensor" 412 denotes a function to order the ambient light sensor to begin acquiring images at its inherent frame rate. Block "Detect change?" 412 is a conditional action that moves forward if the Service 2 determines that the sequential image frame data show a change in observed light. The purpose of this conditional is to determine when the sensor has gone from dark to light (e.g., when the user has taken the device out of a pocket). Alternatively or additionally to measuring changes in image content, Service 2 can also look for absolute brightness values in image content (obviating the need to compare images) and can test for mobile-device accelerometer measurements above a fixed threshold (e.g., to determine when the user has taken the device out of their pocket). If "Detect change?" produces an affirmative, the method 400 moves to block 304 "Sample the image sensor," after which block 414 "Continue" denotes continuation of the method of FIG. 3 from block 304.

Figure 5:
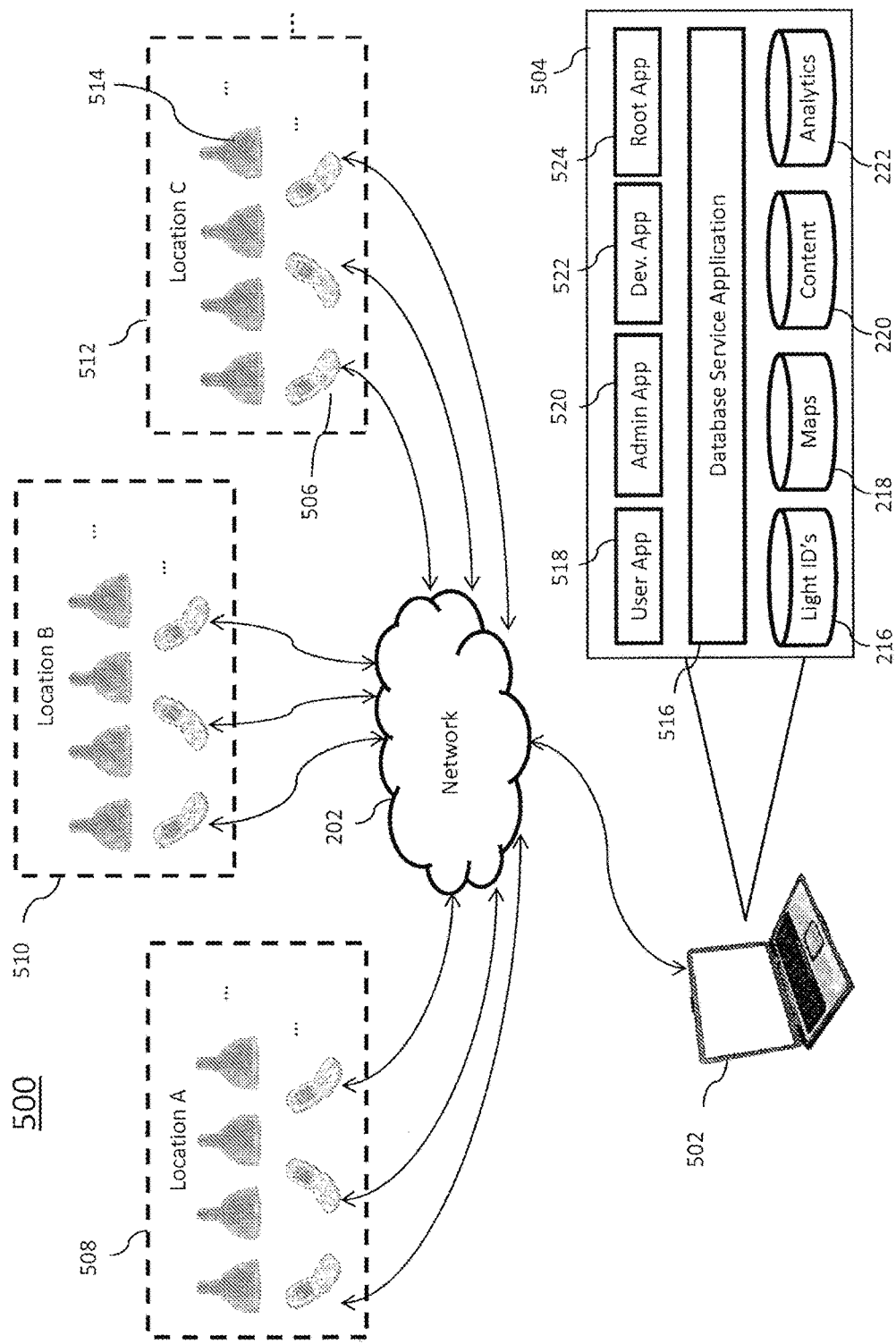
FIG. 5 illustrates a light-based positioning system in which a client device implements an informational service capability.

FIG. 5 schematically depicts, according to an illustrative example, aspects of a light-based positioning system 500 in which a client device 502 implements an informational service capability 504 of the system 500. The network 202 is a generic local or remote network, or hierarchy of networks, used to connect mobile devices (e.g., mobile device 506) at locations A 508, B 510, and C 512 with the service capability 504. Each location 508, 510, 512 contains multiple LED light sources (e.g., source 514), each of which broadcasts a unique VLC ID code. The client 502 can access a database service application 516 that implements multiple client privilege levels for different levels of access to databases 216, 218, 220, 222. These access levels are implemented by corresponding apps. These access apps include User 518, which serves general front-end system users; Administrator 520, serving users usually at an IT or operations management level at an installation; Developer 522, enabling access to the application programming interfaces of the system for custom application development; and Root 524, which enables master control over other user categories and access to everything contained in the databases 216, 218, 220, 224.

In typical operation of the system 500, mobile devices in locations 508, 510, 512 detect ID codes from lights and send the codes through the network 202 to the Database Service Application 516 through User app 518. A mobile device thus obtains read-only access to Maps 218 and (conditional on various criteria administered by the Database Service Application) Content 220. The Database Service Application has built-in write access to Analytics 222 in order to record the behaviors of the accessing mobile device.

In another mode of operation of system 500, the client 502 connects to the Database Service Application via an appropriate access app 518, 520, 522, or 524, enabled via a password-authorized login screen. Clients with administrator permissions have read/write access to Light IDs 216, read access to maps 218, read/write access to Content 220, and read access to Analytics 222. Clients with developer permissions have read access to Light IDs 216, read access to Maps 218, read/write access to Content 220, and read access to Analytics 222. A client with root permissions has read/write access to all databases. In various examples, a user may access the client device 502 at any permissions level through a device communicating with the network 202, e.g., a mobile device or a computer at a remote location.

DPR Demodulation Techniques

VLC light sources may produce patterns of stripes in rolling-shutter CMOS camera images. Image processing can be used to extract transmitted signal from striping. For example, consider a room containing five VLC light sources that are sinusoidally brightness-modulated at 500 Hz, 600 Hz, 700 Hz, 800 Hz, and 900 Hz respectively. Each sinusoid, also known as a DPR tone, can be used to identify its distinctive source (and thus proximity to the source and thus the approximate location of the camera). Herein, we presume that the exposure parameters of the CMOS camera exposed to light from the five VLC light sources are such as to enable the appearance of unaliased, detectable striping artifact in the resulting images (e.g., the CMOS camera exposure time is not so short as to undersample any of the sinusoidal light signals).

Described herein are two illustrative methods for extracting DPR tone information from a rolling-shutter CMOS images. One possibility, when a single tone is present, is to use line-detection algorithms to identify the pixel width of the stripes, which directly corresponds to the transmitted DPR tone frequency. This stripe width is then used to access a lookup table that associates width and transmitted frequency and determines the transmitted tones.

Figure 6:
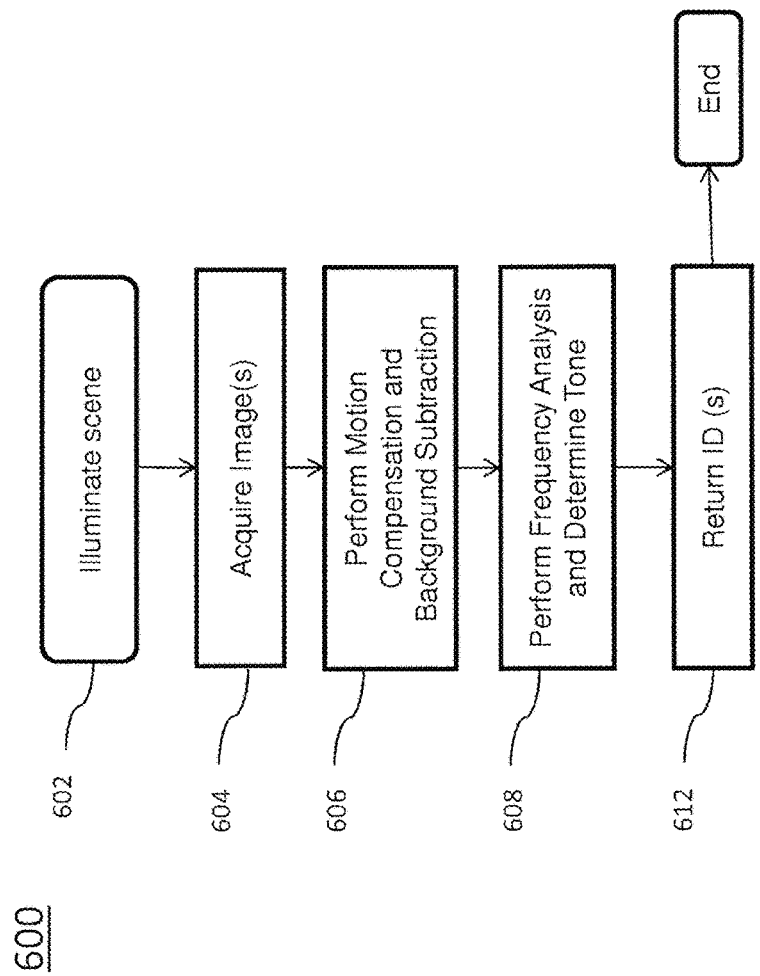
FIG. 6 is a high level flow chart of an algorithm for determining tones embedded within a DPR illuminated area, according to some examples of the present disclosure.

FIG. 6 schematically depicts a second method 600 for performing DPR demodulation according to one illustrative example, based on image pre-processing and Fourier frequency analysis (i.e., fast Fourier transform, "FFT"). Block "Illuminate scene" 602 denotes the illumination of a scene, e.g. a portion of a store interior, by one or more VLC light sources and the exposure of a rolling-shutter CMOS image sensor of a mobile device to a lighted scene. In this context, "scene" refers to any area within view of the camera. Block "Acquire Image(s)" 604 denotes acquisition of one or more images by the image sensor. In the one or more images, the brightness of any given pixel is partly scene-dependent, that is, depends on both the details of the scene as well as on the time-varying VLC illumination. Scene dependence means that pixels in the same row of the image (exposed simultaneously, thus not exposed to different levels of time-varying VLC illumination) will not all have the same brightness, and also that the relative brightness of different image rows is not solely dependent on the modulated illumination. If one calculates the FFT of such an image, the frequency content of both the scene and of any DPR tones modulating the illumination will be present.

To recover DPR frequency content independently of the scene, a background subtraction algorithm may be employed to essentially remove the scene, leaving (ideally) only DPR striping artifact. In an example, an implementation of a background subtraction method uses a video sequence of images. For any DPR tone frequency that is not an exact multiple of the video frame rate, the DPR bands will shift position from one frame to another. Therefore, if a sufficient number of video frames are averaged, the banding effect due to periodic modulated modulation will be reduced to a constant value added to all pixels of the averaged image. If the video is of a motionless scene, the averaged image will reveal only the underlying scene. This underlying scene (i.e., the background) may be subtracted from any individual frame to leave only the banding from illumination modulation. The effects of background scenes may also be mitigated, alternatively or additionally, by deliberate defocusing of the mobile device camera (a form of low-pass image filtering).

For video of a scene in motion, simple averaging of video frames will not accurately yield the underlying scene background. In such a case, motion compensation is necessary. By using standard feature-recognition techniques (e.g., phase correlation) that will be familiar to persons versed in the art of image processing, scene motion between video frames (for example, shifting or rotation of the whole scene due to camera movement) may be detected, after which each video frame may be shifted or transformed to cause it to approximately overlie the previous frame as much as possible. After performing these compensatory transforms on each frame in a series, the resulting frames may be averaged to produce a scene background image that may be subtracted from one or more of the frames to reveal DPR striping. In FIG. 6, block "Perform Motion Compensation and Background Subtraction" 606 denotes these operations.

After background subtraction, analysis of an FFT can be used to recover DPR tone or tones from any one frame or from an averaged frame. As will be clear to persons familiar with the science of signal processing, given a series of amplitude measurements of a signal containing one or more periodic components, the FFT of the series will feature peaks at the frequencies of the periodic components. Automated peak-finding techniques may be applied to such an FFT to identify the frequencies of any periodic components. Block "Perform Frequency Analysis to Determine Tone(s)" 608 denotes the performance of such analysis. In FIG. 6, the block "Return ID(s)" 610 denotes the matching of one or more detected DPR tones to specific VLC light ID numbers, which can in turn be associated with physical light locations.

Figure 7:
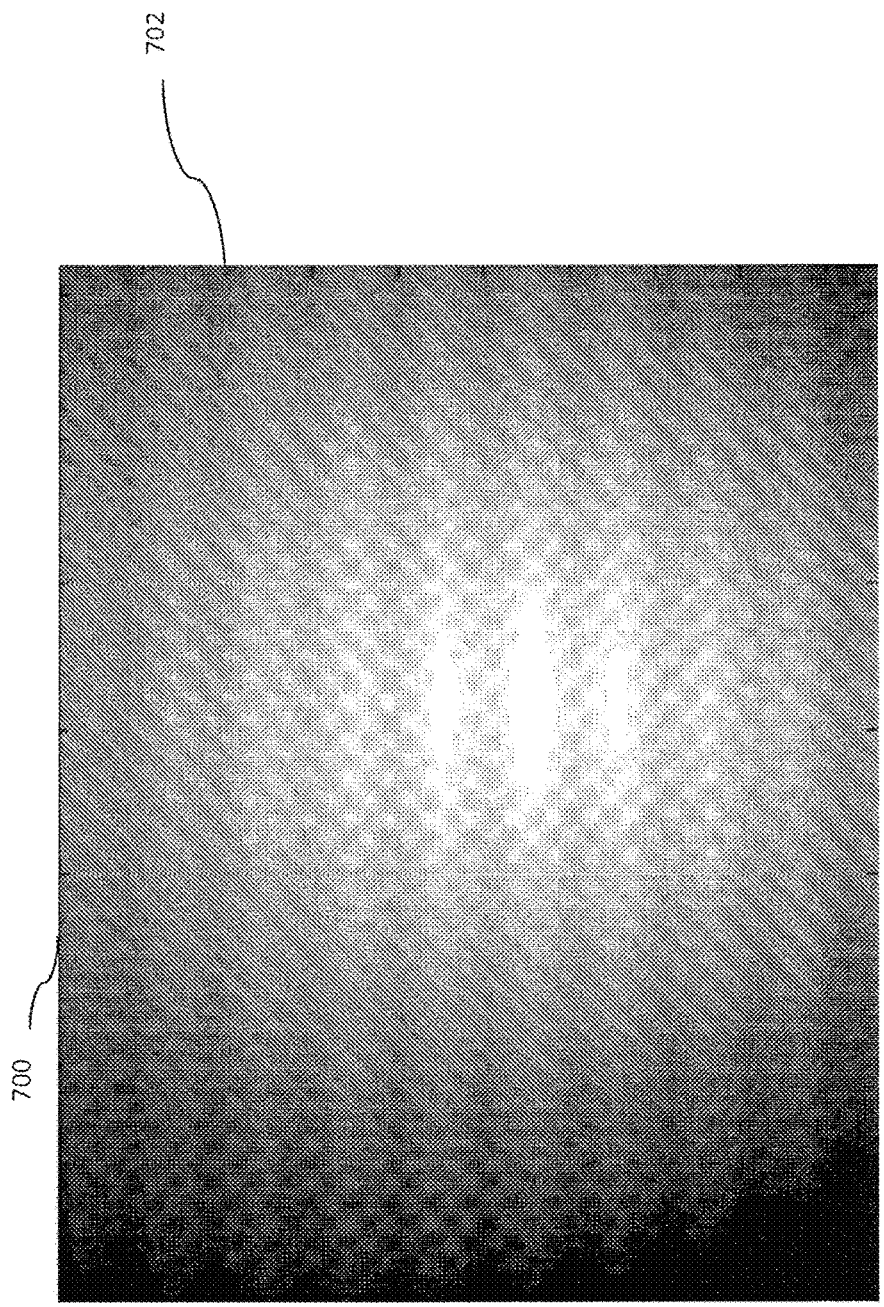
FIG. 7 is a photograph of a surface under illumination from DPR modulated signals, according to some examples of the present disclosure.

FIG. 7 contains a sample image 700 of a surface illuminated by a light source undergoing single-tone (in this case, 700 Hz) sinusoidal DPR modulation. The image 700 was recorded from a mobile device using a rolling shutter CMOS camera. The stripes (e.g., stripe 702) on the image 700 are DPR artifact.

Figure 8:
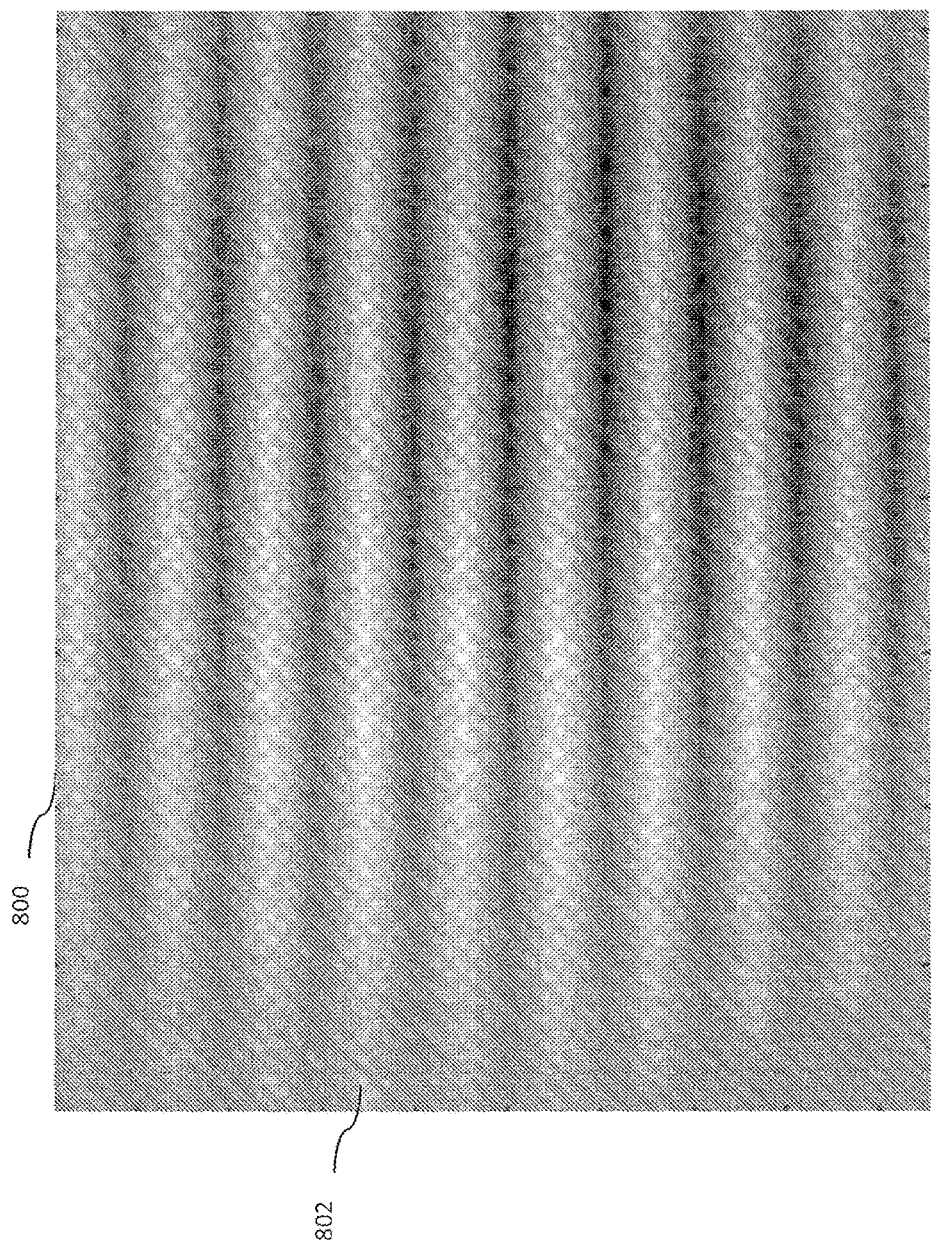
FIG. 8 is a post-processed image of a DPR modulated scene after performing background subtraction, according to some examples of the present disclosure.

FIG. 8 shows an image 800 derived by performing background subtraction on the raw image data of FIG. 7. The result is an image 800 of alternating dark and light stripes (e.g., stripe 802) that reflect sampling of the transmitted DPR signal. Thanks to background subtraction, the stripes are more pronounced than in the raw image data of FIG. 7.

Figure 9:
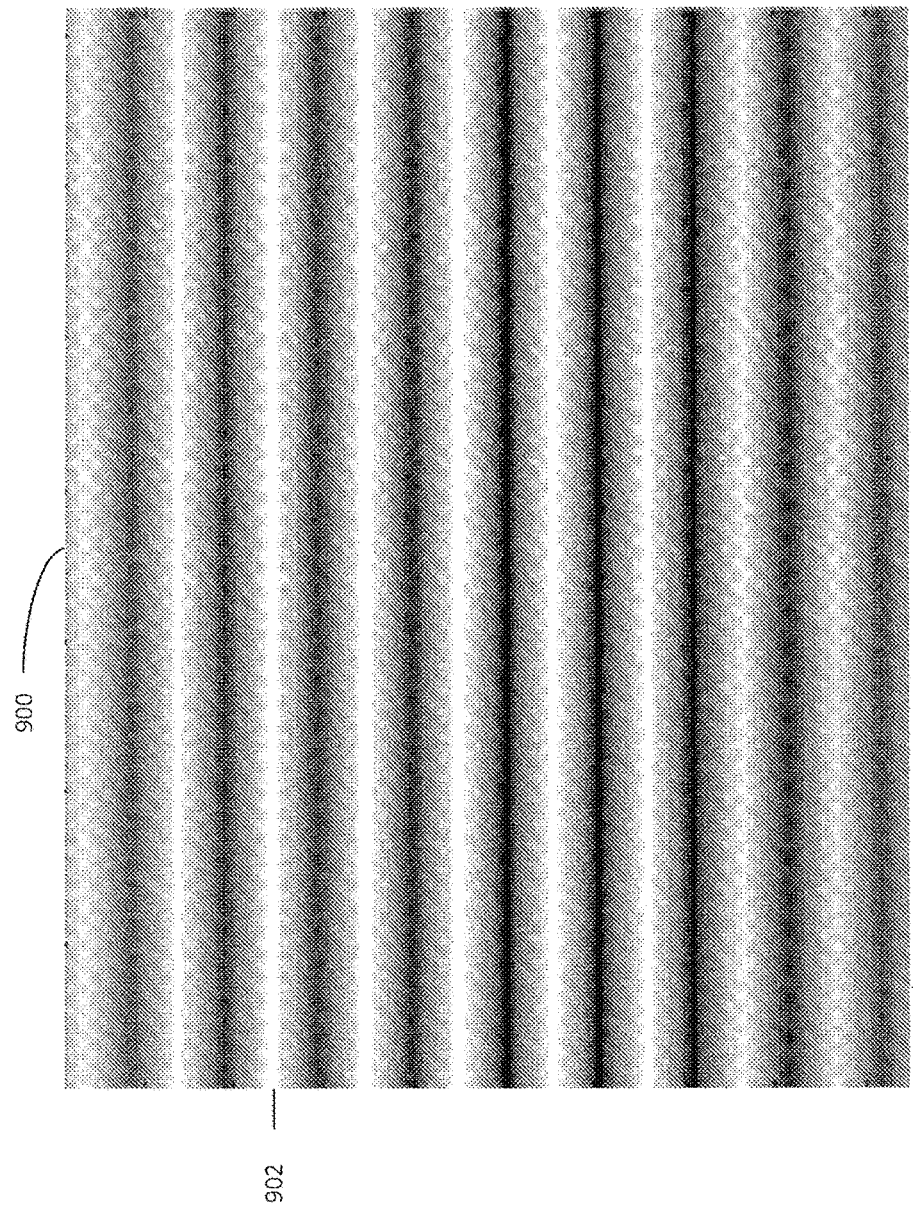
FIG. 9 is a post-processed image of a DPR-modulated scene after row averaging, according to some examples of the present disclosure.

Imperfect background subtraction and/or nonuniform illumination may lead to non-identical pixel values across DPR stripes: this effect is visible in image 800 as non-uniform brightness along each stripe. Taking FFTs of row values along different columns of such an image may produce different results, leading to ambiguity. One compensatory method is to assign the average pixel value for any given row to every pixel in that row. FIG. 9 displays the image 900 that results from applying row averaging to the background-subtracted image 800 of FIG. 8. DPR stripes (e.g., stripe 902) are highly visible and consistent. All columns of image 900 contain the same information, i.e., are simply repetitions of a single, averaged column, so only the averaged column need be retained for FFT.

Figure 10:
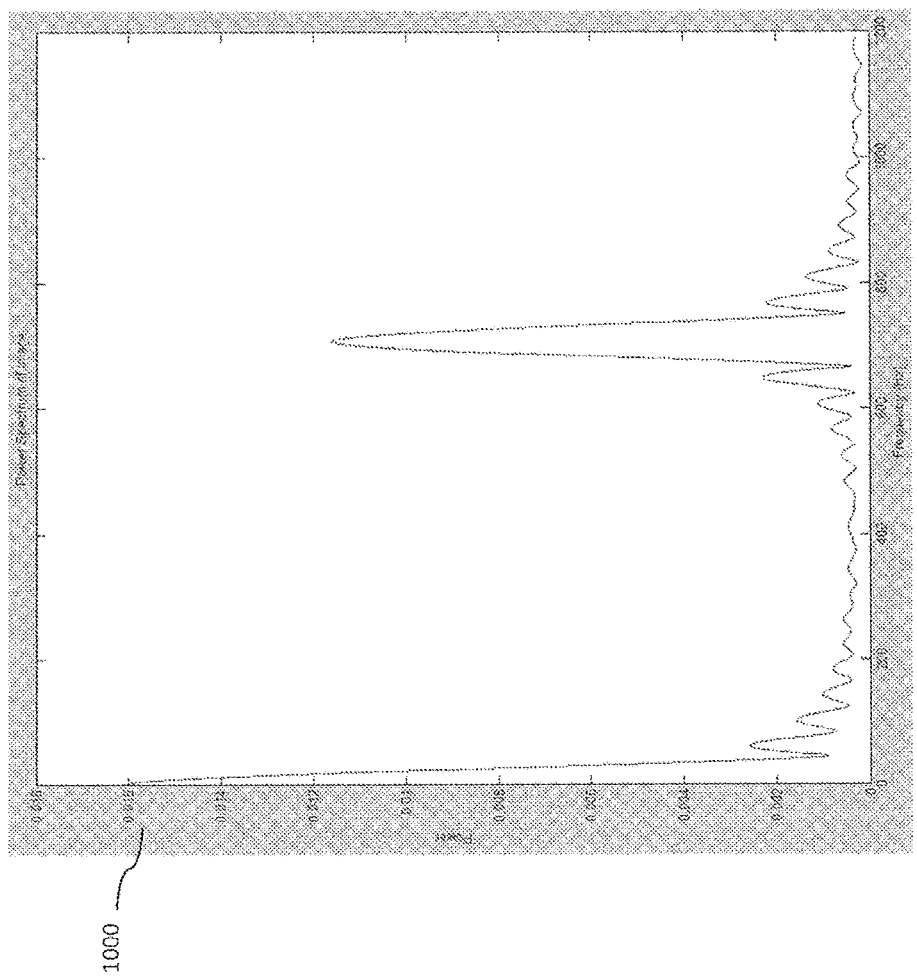
FIG. 10 is a plot of the 1-D spectral content of a DPR-modulated image, according to some examples of the present disclosure.

FIG. 10 shows the FFT 1000 of a column from row-averaged image 900 of FIG. 9. There is a peak at the DPR tone frequency of 700 Hz and a peak at 0 Hz. The 0 Hz (DC) peak does not correspond to a DPR signal; it may be removed either by low-pass filtering of the amplitude data of FIG. 9 or by employing a peak-detection algorithm that discards peaks at or near 0 Hz.

Figure 11:
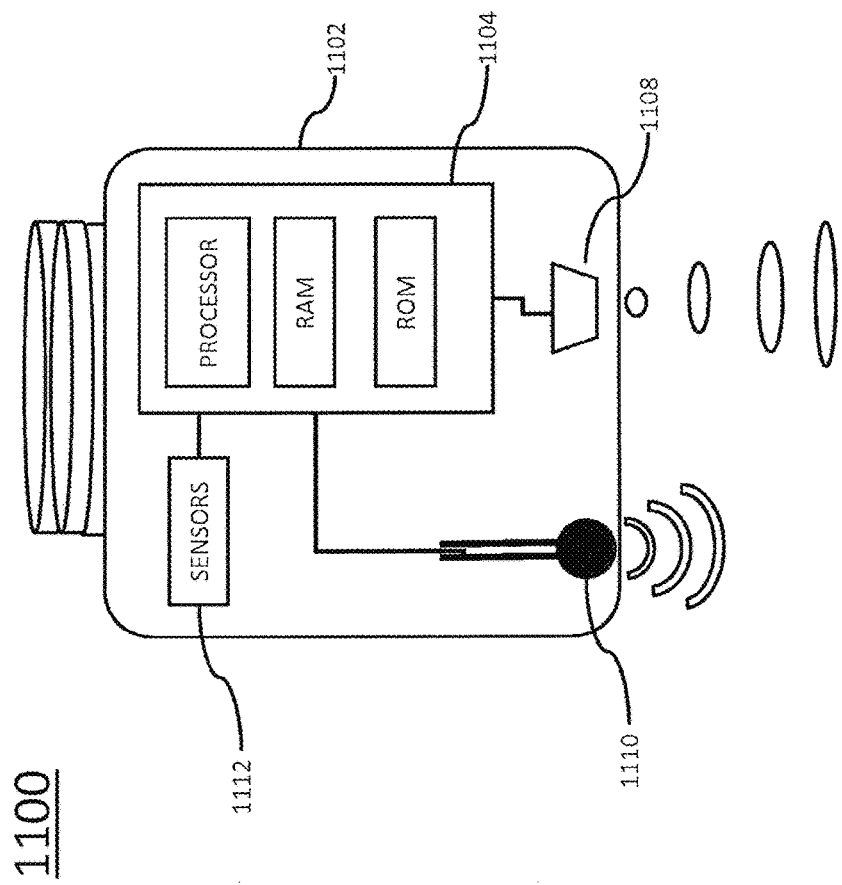
FIG. 11 depicts an example of a radio frequency communication enabled light for transmitting modulated light.

FIG. 11 depicts an example of a radio frequency communication enabled lighting device 1100 for transmitting modulated light to facilitate position determination of proximal computing devices, such as mobile phones, tablets, and the like. A modulating beacon light source may be combined with an RF communication capability, such as a Bluetooth capability or the like, to facilitate combined light and radio frequency (e.g., wireless) signal communication between the light and proximal devices. Detailed examples of a radio frequency communication means (e.g., a WiFi signal function) advantageously combined with a modulating beacon light for position determination of proximal mobile devices are described herein.

Modulating light source 1102 may include a processor 1104, such as a microcontroller, that may be configured to execute programs and process data that facilitate modulation of light from one or more LED lights 1108. The processor 1104 may be connected to a radio frequency (RF) transmit/receive antenna 1110 that may facilitate communication over wireless RF signals to other similarly equipped proximal devices, such as other modulating light sources, personal mobile devices, computing devices generally, RF equipped items such as appliances, tools, entertainment devices, RF tags, RF enabled network access points, multi-radio devices, and the like.

The modulating light source 1102 of FIG. 11 may further include one or more sensors 1112 for detecting aspects of the environment, including electromagnetic emissions from nearby computing devices. The sensors 1112 may be connected to the processor 1104 to facilitate collection, analysis, and communication of sensor data and/or data derived from the sensor data. Sensors may include ultrasonic sensors, video sensors, audio sensors, image sensors, optical sensors, temperature sensors, humidity sensors, air quality sensors, motion detection sensors, chemical sensors, radio frequency sensors, and the like. While the aforementioned sensor examples are contemplated, so are any other types of sensor that may detect an aspect of an environment into which the modulating light source 1102 may be deployed.

An RF enabled modulating light source 1100, such as the one depicted in FIG. 11, may facilitate simultaneous Bluetooth transmission and light modulation. Position detection is one particular example of an application for such an RF enabled modulating light source 1100. In an example, RF communication between the RF capability of the light 1100 and nearby mobile devices may facilitate enhanced position detection, as will be described herein. Communication among RF enabled modulating lights 1100 as well as communication between an RF enabled modulating light 1100 and a mobile device that is adapted for communication with an RF enabled modulating light 1100 may enable capabilities in position detection that may not possible or at least not as efficient with modulation of light alone. One exemplary capability is bi-directional communication. While position detection via modulating light enables mobile devices to determine and thereby report their position over a network (e.g., WiFi or cellular) to web servers, bi-directional RF communication allows the detection of particular mobile devices by the light 1100. When combined with a potential mesh-type network of RF enabled modulating lights, it is envisioned that a wide variety of data, content, inquiries, promotions, and the like may be effectively distributed among mobile devices that have been identified as connected to at least one RF enabled light 1100.

More generally, a network including or consisting essentially of RF enabled modulating light sources 1100 may enable the control and sensing of numerous aspects of the VLC and non-VLC aspects of the lighting function of such a network: any form of control and sensing that would be possible through direct, hard-wired connections to the nodes of such a network will in general be feasible through the RF aspect of a network of RF enabled modulating light sources.

RF communication capabilities typically comply with some network-like standard, such as Bluetooth. As an example, a Bluetooth network standard includes unique identifiers for each Bluetooth device that is connected to a network. In a similar way, each RF enabled modulating light 1100 may be configured with a unique RF identifier. This RF identifier may be used when determining a position of a properly equipped personal mobile device (e.g., a personal mobile device with an RF capability, a camera capability, and a mobile device application for interacting with at least these two capabilities). While a capability to receive and process such an RF identifier may facilitate coarse device location, it is quite common for two or more RF identifiers to be detectable in any of several positions due to the natural overlap of RF signals from nearby lights. Therefore RF identifiers alone may not be sufficient for fine position resolution. However, by combining RF identifier detection with modulating light detection techniques, improved accuracy and performance may be achieved.

One such way that improved performance may be achieved is through light namespace sharing. Because detection of a light identifier from a modulated light might require repeatedly receiving the modulated light to detect the specific identifier, when an RF identifier is used in combination with a modulated light identifier, determination of the modulated light identifier may be accelerated. This may be based on a known relationship between RF identifiers and modulated light identifiers, such as through a lookup function that accesses a dataset of identifiers that associates RF identifiers with modulated light identifiers. Even if two or more RF identifiers are simultaneously detected due to RF signal overlap, determination of the corresponding modulated light identifier may be much faster because the possible number of modulated light identifiers can be limited to those found in the lookup function for the simultaneously detected RF identifiers.

Figure 12:
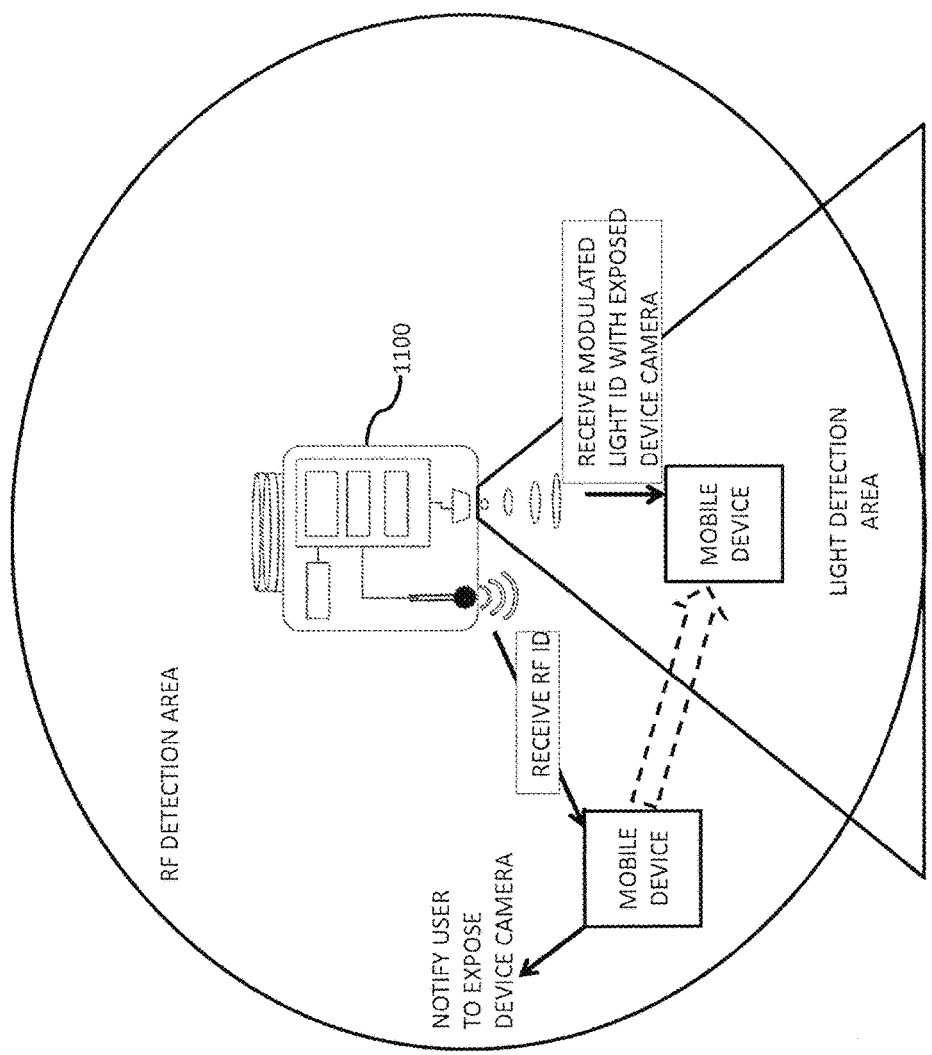
FIG. 12 depicts an example of early detection of a radio frequency identifier to facilitate detection of a modulated light identifier.

FIG. 12 depicts techniques for taking advantage of a wide ranging radio frequency communication detection area to enhance the performance of position detection based on light emissions from a modulated beacon light 1100. Another benefit of combining RF identification with modulated light identification involves a capability to push notifications to a user of a mobile device that is coming into proximity of a modulated lighting environment due to the generally wider area of access to RF communication signals than modulated light signals. Therefore, detection of an RF identifier transmitted from an RF enabled modulating light, such as the light 1100 of FIGS. 11 and 12, may enable activation of a mobile-device function, such as a mobile device application and the like, to notify the user of his/her proximity to a modulating light for position detection. User notification may include pushing a notification to a user of a mobile device to enable modulated light-based position detection when a function on the mobile device detects the presence of a transmitted identifier of an RF module that is integrated into the light. Such notification may include at least one of an audio and a video notification to the user to expose the mobile device's camera so that a modulated light detection application that uses the device's camera may receive the modulated light.

Figure 13:
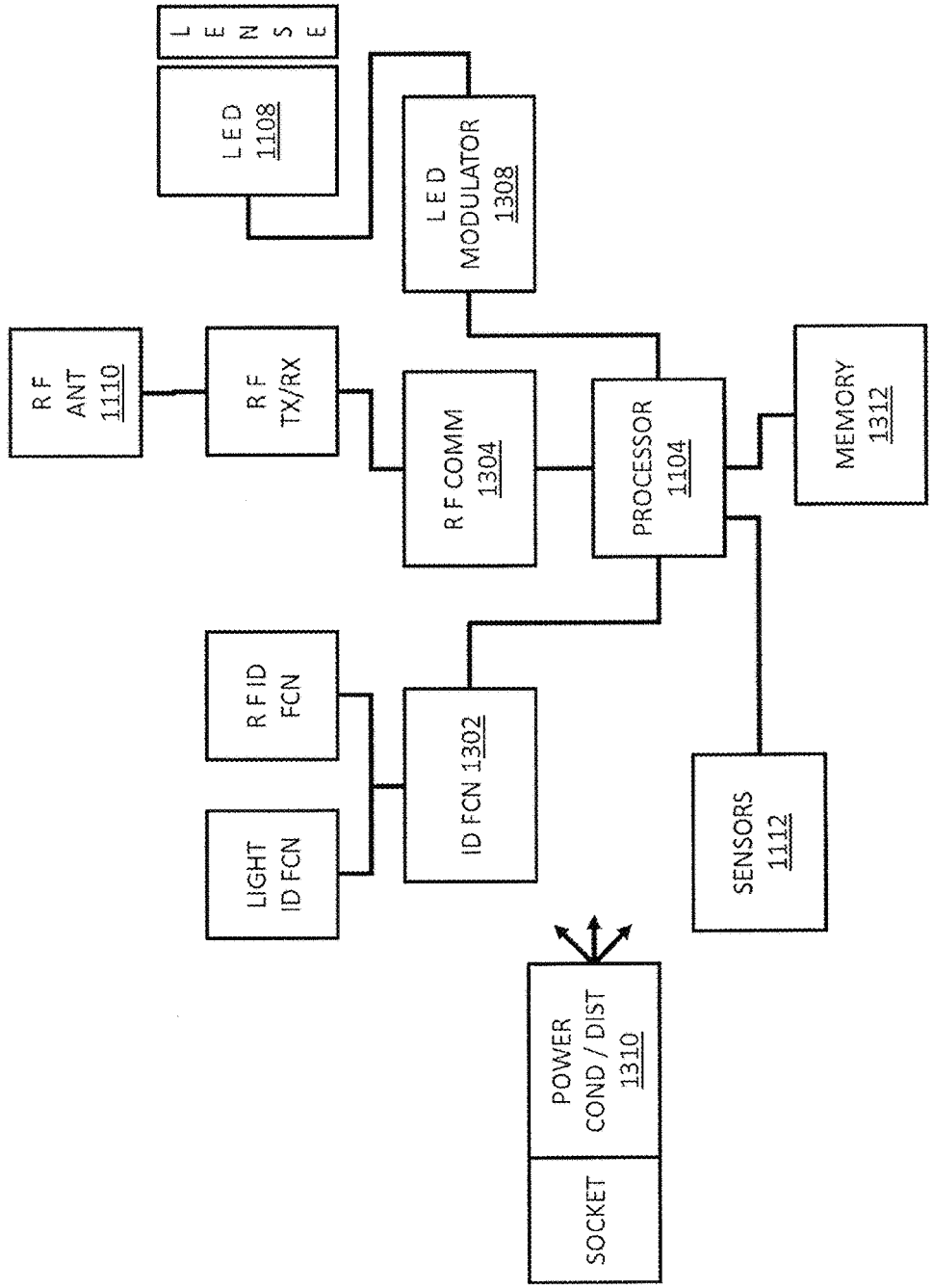
FIG. 13 depicts a schematic example of logical functions and features of a radio frequency communication enabled light for transmitting modulated light.

FIG. 13 depicts logical, functional, and structural features of a radio frequency communication enabled modulating beacon light source 1100, including a processor 1104, LED light 1108, RF antenna 1110, sensors 1112, ID function 1302 that may handle modulated light and RF identifier functionality, RF communication features 1304 for communicating over the RF radio signal with other lights 100 and/or mobile devices, LED light modulator 1308, power distribution 1310 for providing power to the light features from the power mains provided to the light through its socket connection, and a memory 1312 that may be used for program storage, data storage, and the like. In an example, RF ID function data and Light ID function data that may be used by ID function 1302 may be stored in the memory 1312. In another example, sensor data captured via sensors 1112 may be stored in the memory 1312. In yet another example, data received from mobile devices via the RF transceiver (TX/RX) interface may be stored in the memory 1312.

FIG. 14A depicts a configuration of RF enabled modulatable beacon lights arranged in an ad hoc mesh-type network 1402 and optionally/temporarily connected to Internet resources through a nearby mobile device 1418. Modulatable lights may be configured so that a modulated light signal provided from each light may be distinguished from modulated light signals produced by nearby lights, such as by lights in the same building, room, hallway, and the like. When such modulating lights are configured with RF capability they may communicate configuration information from light to light.

A network capability as depicted in FIG. 14A may include access through a mobile device or other RF enabled device to external (non-mesh) networks. In the example of FIG. 14A, a mobile device that may have Bluetooth and WiFi and/or cellular communication capabilities may act as a gateway for communicating data to/from RF enabled modulatable beacon lights. If the lights are configured into a network, it may be possible for an Internet resource, such as a position determination server 1408, to communicate to a networked light 1404 or 1404' by passing data through the Internet 1414 and a network access point, such as a cellular tower 1412 or a WiFi router 1410 that may be in communication with a mobile device 1418. If and/or when the mobile device 1418 is in Bluetooth radio signal proximity to one of the networked lights, an indirect connection may be made between the server 1408 and a light 1404. This may allow communication of information collected from mobile devices via the RF capability (e.g., identities of devices/users that pass through the area) by one of the lights to a remote server, such as server 1408. Although a mobile device 1418 is described as the primary gateway from the light mesh network to a wider area network, any other suitable network-network gateway may be used. A network-network gateway may be configured in close proximity to one of the networked lights that may enable communication from at least one of the lights through networks such as Ethernet, PoE, Zigbee, and the like. In various examples, software installed on a mobile device that is in contact with a non-mesh communications network (e.g., an app voluntarily installed on a smart phone that is connected to the Internet via WiFi and/or to a cell phone network) facilitates the mobile device to act as a network-to-network gateway. In an illustrative example, BLE packets sent by a VLC+RF mesh node to a phone are retransmitted (undecrypted) as payload via the telephone capability of the phone to a server/controller associated with the mesh. The packets may contain any data which the mesh is capable of circulating. In another illustrative example, a mobile device (e.g., tablet computer) contains both (a) a Zigbee transceiver capable of communicating with MESH of Zigbee low-power nodes, (b) an RF transceiver capable of communication with the RF capability of nodes in a VLC+RF mesh, (c) an app enabling the translation between the Zigbee informational format and the informational format of the VLC+RF mesh. In effect, items in communication with the VLC+RF mesh would be enabled to "appear" as Zigbee items to the Zigbee network, and vice versa. In these and various other examples that comprise a "bridging" capability, whether through mobile devices or dedicated, stationary, multi-radio devices, a VLC+RF mesh may be compatibly combined with a wide range of extant or traditional wireless/control systems that may coexist with the VLC+RF mesh in a working space or that may be non-collocated with the VLC+RF mesh.

Use of mobile devices as gateways between a VLC+RF system and another network (e.g., wireless mesh) may be opportunistic: e.g., mobile devices of customers who have installed an app related to the VLC+RF mesh may be opportunistically enlisted as gateways as the devices move in and out of the mesh's working space. Such a gateway function may be used, for example, to effectively increase the bandwidth of data reporting by mesh nodes to a server/controller, since under various conditions packets can be communicated more quickly through a gateway than through a series of mesh-node retransmissions as per the illustrative protocol discussed herein with reference to FIGS. 21A-21D. Gateway transmission may be used alternatively or additionally to transmission through a mesh controller node connected to a non-mesh network: e.g., upon failure of an external-connection node or device, a mesh may still be enabled to communicate with a server/controller by means of a gateway function, carrying on its various functions while calling for diagnosis and repair of the failure. The bridging and gateway functions of various examples are exemplified in FIG. 23.

In various examples, the position determination server 1408 is a general-purpose mesh server and controller (back end) that performs functions other than or additional to position determination, issuing commands to the RF and/or lighting capabilities of one or many network nodes, polling network nodes for information garnered from sensors, and so on. A general-purpose back end may be enabled to understand the locations, movements, and other aspects of mobile devices and other assets within the service area of the VLC+RF network mesh. Illustrative capabilities include inventorying, assisted navigation and reality augmentation, RF asset tag location tracking, robot and drone tracking, time-of-day-based control, real-time user-tailored control of active assets (e.g., video displays), security management, routine customer assistance, emergency assistance, ambience adjustment (e.g., music, lighting, and other environmental adjustments in response to sensed user behaviors), and more. In another example, routine scan (advertising) packet broadcasts from Bluetooth-capable mobile devices are detected by the RF capability of nodes, enabling a mode of position estimation of the mobile device based on received signal strength indication (RSSI) and/or node detection pattern. Such estimates may be combined with estimates based on detection of VLC beacons by a light-sensing capability of the mobile device, e.g., after the device user is prompted to expose their device to light based on detection of their presence by the RF mode.

Figure 14B:
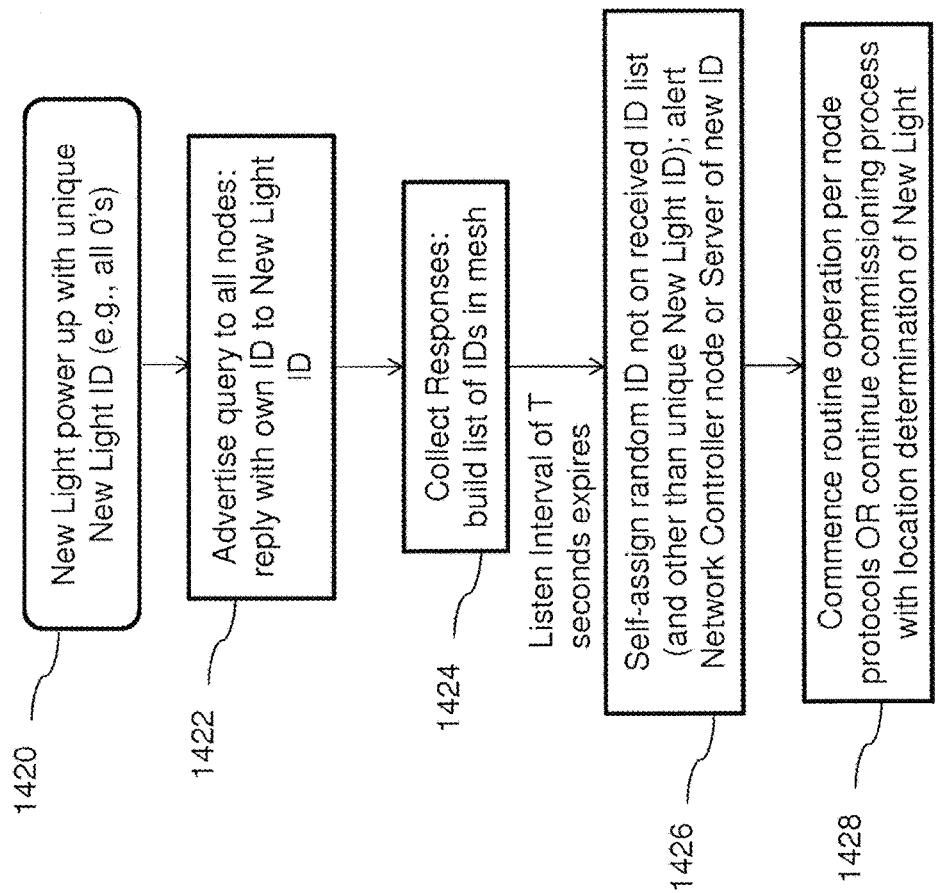
FIG. 14B depicts an example of the logic flow of an illustrative method for self-ID assignment of a light newly installed in a mesh.

Reference is now made to FIG. 14B. Communication from light to light, and of the light network 1402 with a server 1408 as described above with reference to FIG. 14A, may allow automatic configuration of identification data for each light so that when a new or replacement light is added to an existing ad hoc network of lights, the processor in the light may communicate via the RF capability with other lights to determine which light identifiers are already in use and so ensure that the new light adopts a distinctive identifier (ID). Automatic configuration of a light may facilitate determination by a newly added light that it is new to the network and may also facilitate determining which light was most recently added by communicating initialization and/or configuration data over the mesh-like network with the other lights. This may also facilitate determining a positioning of the light if the lights are installed in a known order, such as starting at one end of an aisle and proceeding down the aisle. Similarly, RF IDs may be changed dynamically yet remain unique within a configuration via light-to-light RF ID communication via such a network. FIG. 14B schematically depicts steps of an illustrative method, according to some examples, of self-commissioning of a light (i.e., New Light) just added to an existing network 1402 of one or more lights already commissioned. Upon first power-up 1420, New Light possesses a factory default ID (e.g., a string of zeroes) possessed by all new lights, and a firmware pointer causing New Light to undertake Action One 1422: Advertise a query to all nodes in network, asking them to reply with own ID with packets addressed to New Light ID. New Light then performs Action Two 1424: For a time interval T (e.g., one minute), long enough to give all nodes in a mesh 1402 of maximal size time to reply, listen for responses from mesh nodes with IDs, and during that interval, collect a list of all IDs delivered. After interval T, New Light undertakes Action Three 1426: self-assign a random ID other than its factory default and all IDs (if any) received, alert the server 1408 of its new ID, and proceed to Action 1428. In Action 1428, New Light commences routine node operation per mesh protocols and/or continues a commissioning process whereby the physical location of New Light is determined and stored in the server 1408. Various examples may employ other steps in a self-commissioning process of a new light, e.g., steps that enable (a) automatic determination of new-to-this-mesh status by a previously used but newly installed light (i.e., a light not possessing factory settings), (b) automatic determination of First Node in New Mesh status, and (c) automatic positional determination of a new light (e.g., "I am in fixture 12, Aisle 3") based on measurements of radio signal strength from other nodes in the network 402, as described elsewhere herein.

Figure 15:
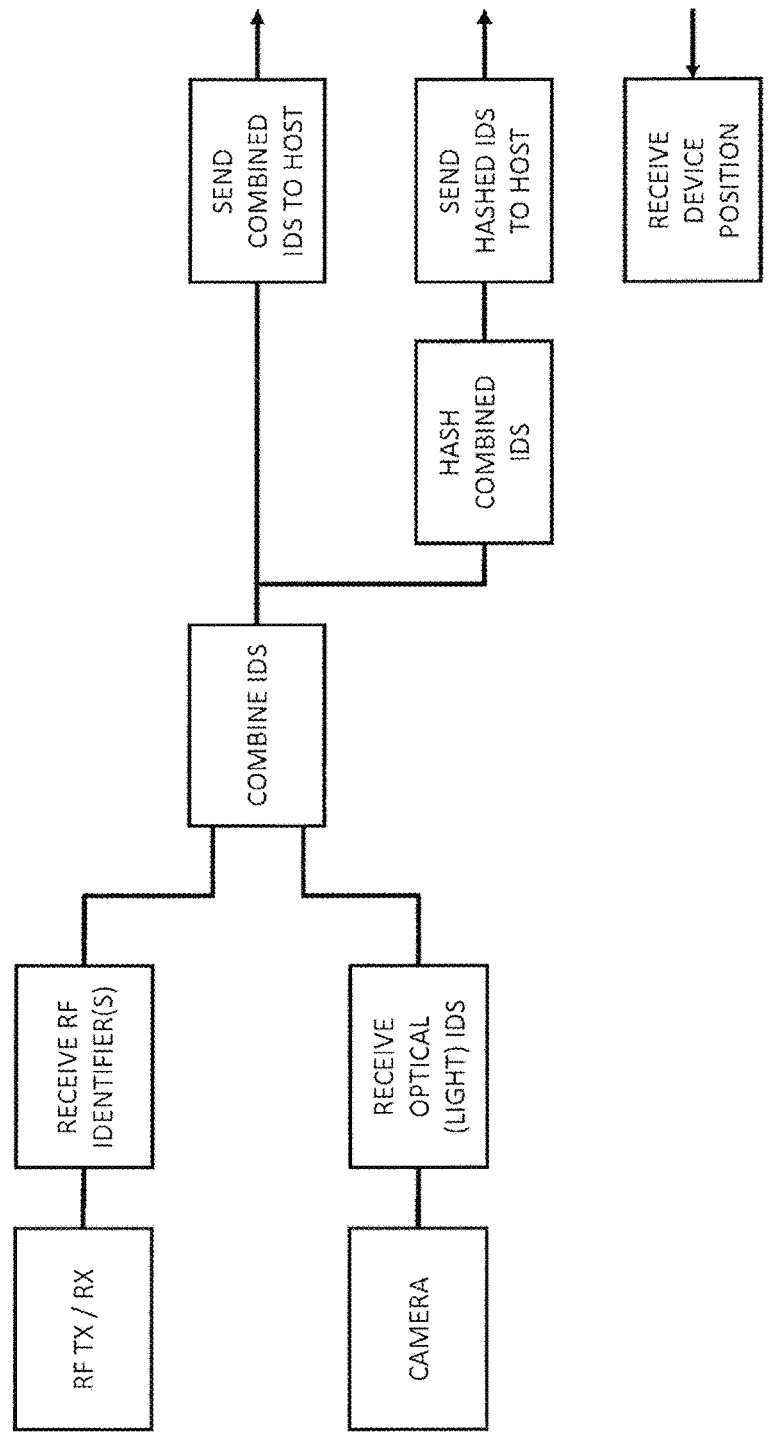
FIG. 15 depicts an example of a flow chart for generating a unique position identifier from a combination of a radio frequency identifier and a light identifier.

FIG. 15 depicts exemplary functional steps for using radio frequency and modulated light identifiers to receive an indication of a position of a mobile device relative to a modulating beacon light source. In the example of FIG. 15, a mobile device may receive via a modulated light captured by a mobile device camera an ID for a light. The mobile device may also receive an RF ID from an RF capability of a light. These IDs may be combined and sent to a host, such as a position determination server. Alternatively or in addition, the combined IDs may be processed through a hash function and the output of the hash function may be sent to a position detection server. The mobile device may receive position information from the server in response to the transmitted combined ID and/or hashed combined ID.

Figure 16:
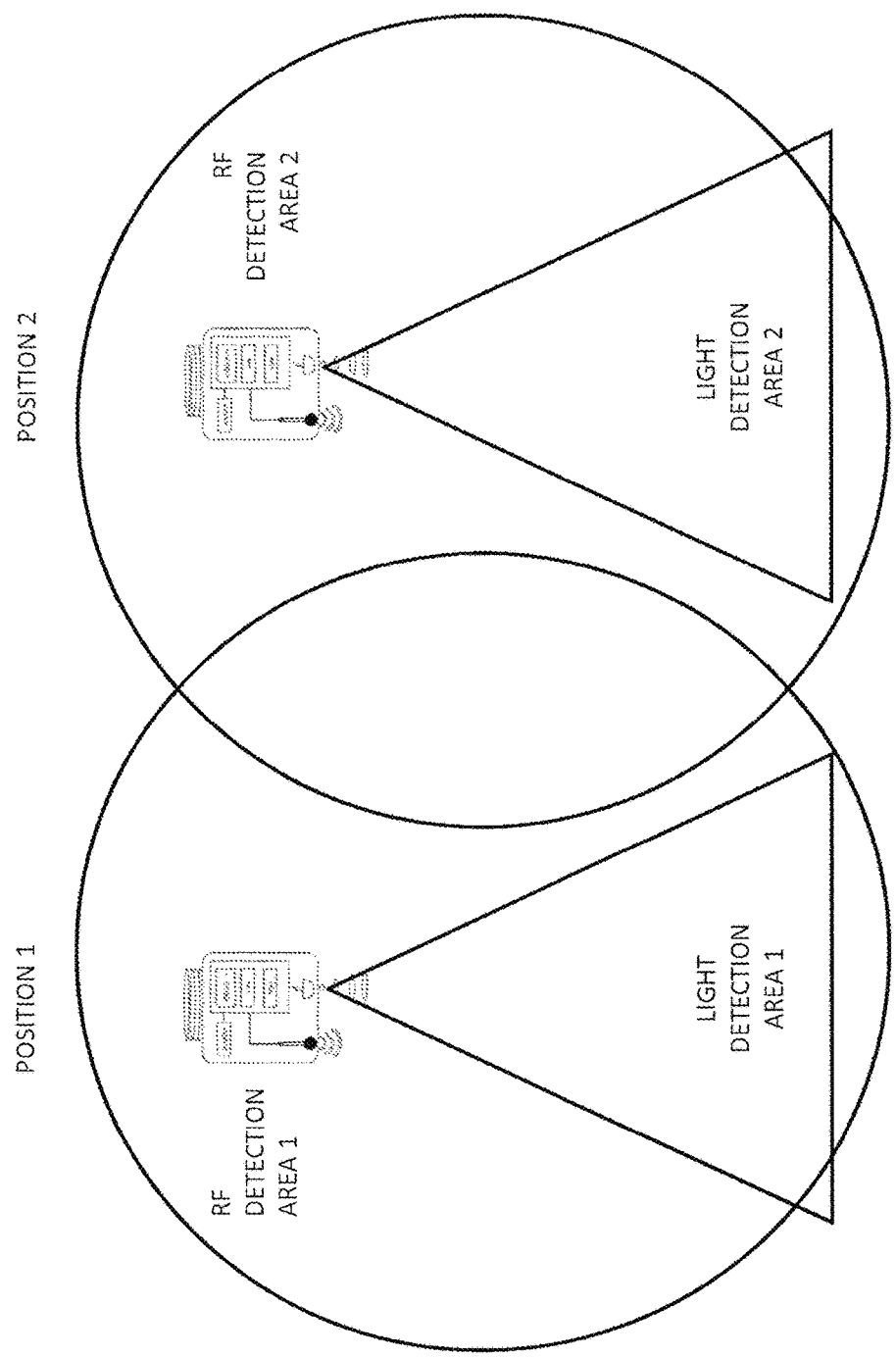
FIG. 16 depicts an example of a representative schematic of detection areas of two radio frequency communication enabled lights for transmitting modulated light.

FIG. 16 depicts two radio frequency communication enabled modulating beacon light sources that are close enough for the radio frequency communication detection areas overlap so that a single mobile device in an overlapping region may need further information to disambiguate which light the mobile device is closest to. The narrower modulated light detection regions may facilitate disambiguation of a light in position 1 from a light in position 2, as in this illustrative a mobile device cannot simultaneously detect a light in position 1 and a light in position 2.

Figure 17:
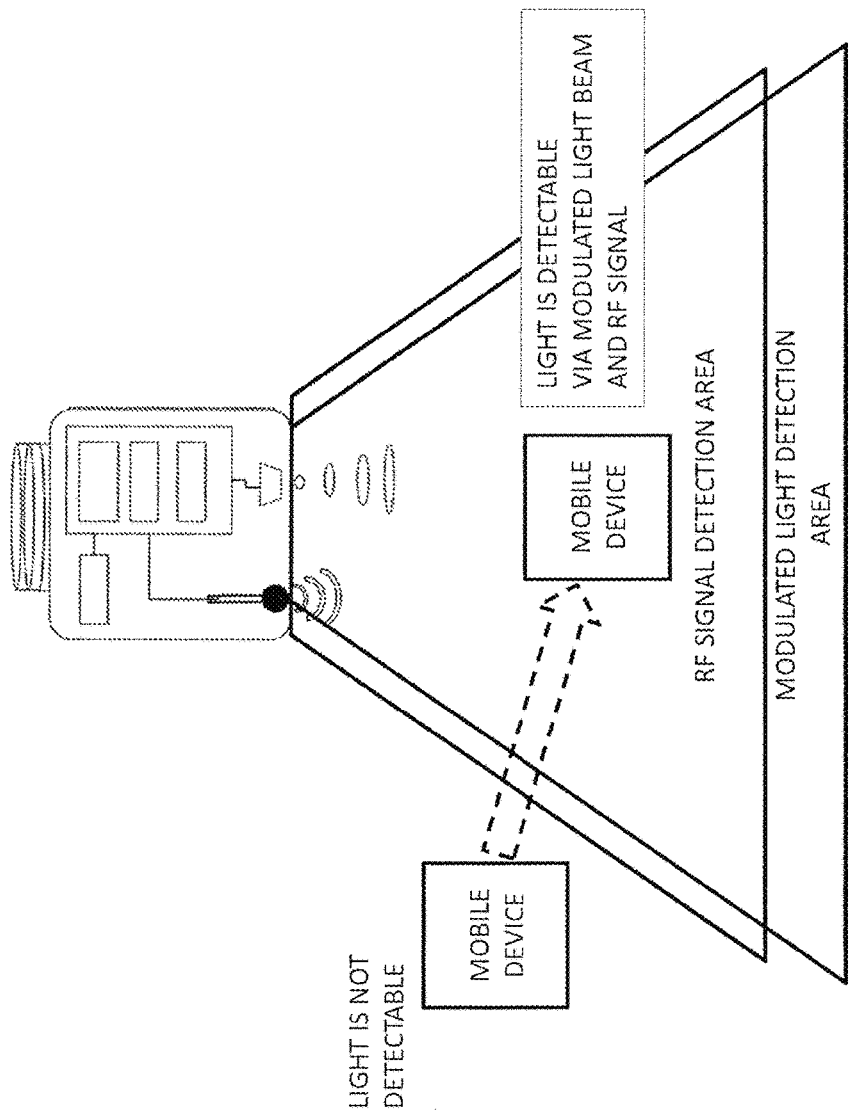
FIG. 17 depicts an example of directional transmission of radio frequency communication from a light for providing modulated light.

FIG. 17 depicts an example of a radio frequency communication enabled modulated beacon light with directionally limited RF emissions, such as by use of a directional antenna. Directionality of RF transmission may be achieved by a fixed directional antenna design: e.g., a conformal antenna design may be combined with a lighting fixture reflector that combines visible light direction with RF signal direction in a single unit. Or, a separate directional antenna (e.g., panel antenna) may be mechanically steered by actuators. Or, a phased array antenna (e.g., antenna employing microelectromechanical systems (MEMS) phase shifters) may be incorporated in a light. Some phased array antennas can programmably shape antenna radiation pattern, alter radiation pattern orientation, and modulate broadcast intensity; similar flexibility applies to signal reception. In various examples employing phased array antennas, the broadcast power, reception sensitivity, radiation pattern, direction, and other features of an antenna of an RF capability of a VLC+RF node may be dynamically reprogrammed through the VLC+RF mesh, or by a local controller in response to changing conditions, or by another device (e.g., mobile phone). Such programmable antenna characteristics may also be set to vary throughout a working space, statically or variably, from node to node. If statically programmed, RF antenna characteristics may be chosen, for example, to optimize overall VLC+RF performance over a working space that is oddly shaped, noncontiguous, or occupied by light-blocking, light-reflecting objects and other obstacles (e.g., partial walls, large metal objects) that may cause VLC and/or RF device-locating performance to vary or degrade from point to point. Such adjustments may be set during a commissioning or space-fingerprinting process, either manually or automatically (e.g., by quartering the space with a small RF-equipped and/or VLC-equipped flying drone or crawling robot to characterize system response throughout the space). If re-settable, system RF characteristics may be altered in a regular manner, or in response to measured characteristics of system environment such as usage patterns, RF interference, or by other criteria. In sum, the performance of a VLC+RF system may be improved, and its possible functions increased in number, by the inclusion of a configurable RF antenna capability.

Figure 18:
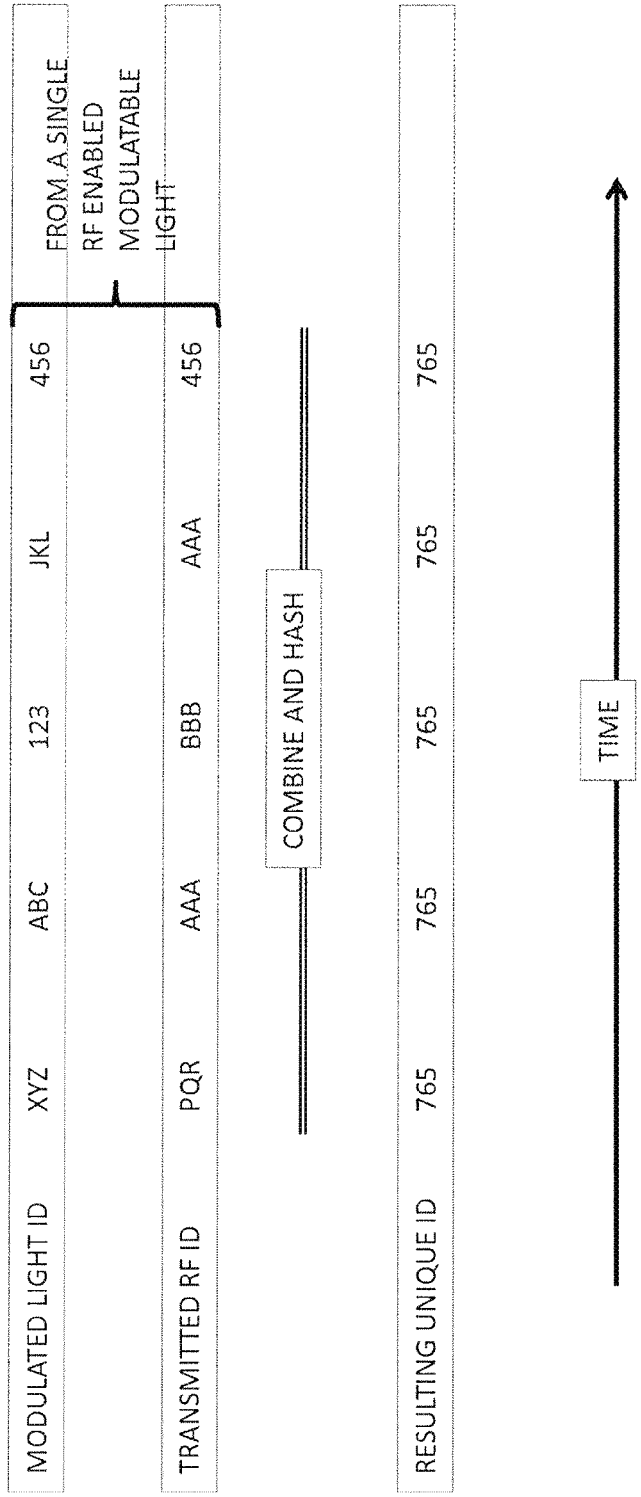
FIG. 18 depicts an example of the generation of a common unique position identifier from multiple combinations of radio frequency and light identifiers.

FIG. 18 depicts a hashing function that facilitates generating a common unique position identifier for a plurality of combinations of modulated light and transmitted radio frequency identifiers. This capability prevents third parties from surveying a deployment of modulatable lights and generating a competing map of the lights. Without the hashing function, it may appear that the light and RF IDs being emitted from a single light are nearly random, thereby defeating any attempt to determine the unique position identifier for each light.

The number of light and RF IDs and hashes producible by a finite number of bits is finite by definition. Therefore, given the manufacture of sufficiently large numbers of VLC+RF nodes, the repetition of possible identifiers, both pre- and post-hash, is inevitable. It follows that with some probability, non-unique identifiers may, absent potentially burdensome tracking techniques, be deployed within a single working space or in multiple working spaces. A mobile device that seeks, for example, to identify what store it is in by detecting a single node identifier may be caused to err by ID repetition. The likelihood of such errors can be reduced to an insignificant level by using combinations of two or more light and/or RF IDs as position identifiers presumed to be unique. If IDs are randomly assigned and located in an independent manner, and that the probability of the probability of any single combination of a number P IDs being identical to any other single combination of P IDs is approximately proportional to $p_{ID}^{P}$, where $p_{ID}$ is the probability of an ID repetition occurring in a given working space. Thus, for example, if $p_{ID}=1\times 10^{-9}$, then the probability of repeating a group of P=4 IDs is $p_{ID}^{P} \alpha (1\times 10^{-9})^{4}=1\times 10^{-36}$, a number sufficiently small to ignore in real-world applications.

Figure 19:
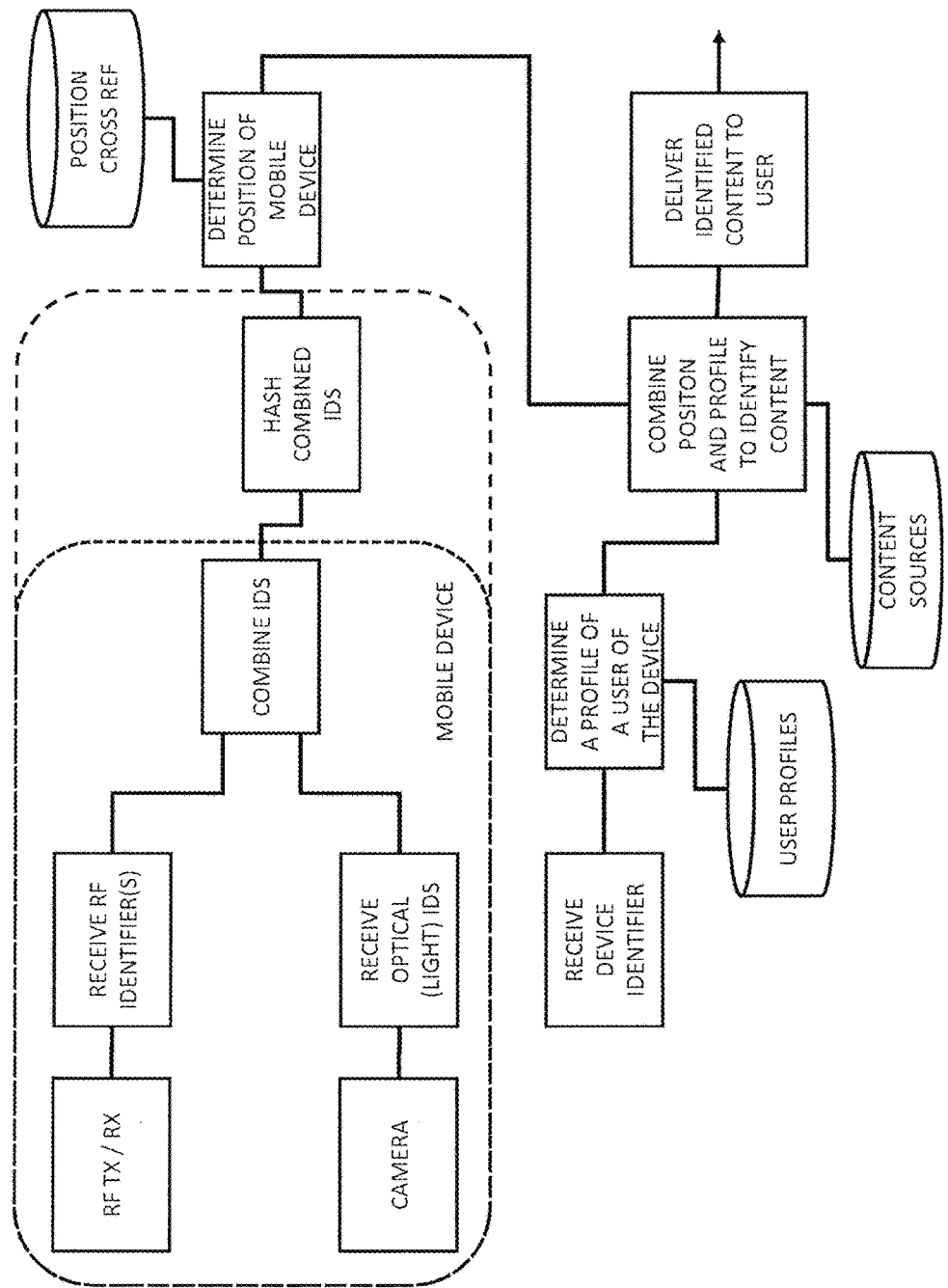
FIG. 19 depicts an example of a flow chart for generating user-targeted content based on detecting a radio frequency identifier and a modulated light identifier from a light.

FIG. 19 depicts a system for accessing user-targeted content based on position information received from a mobile device of the user, where the position information is derived from a combination of radio frequency identification data and modulated beacon light data and the content is targeted based on the determined position and an identifier of the user's mobile device that facilitates access to a user profile.

Figure 20A:
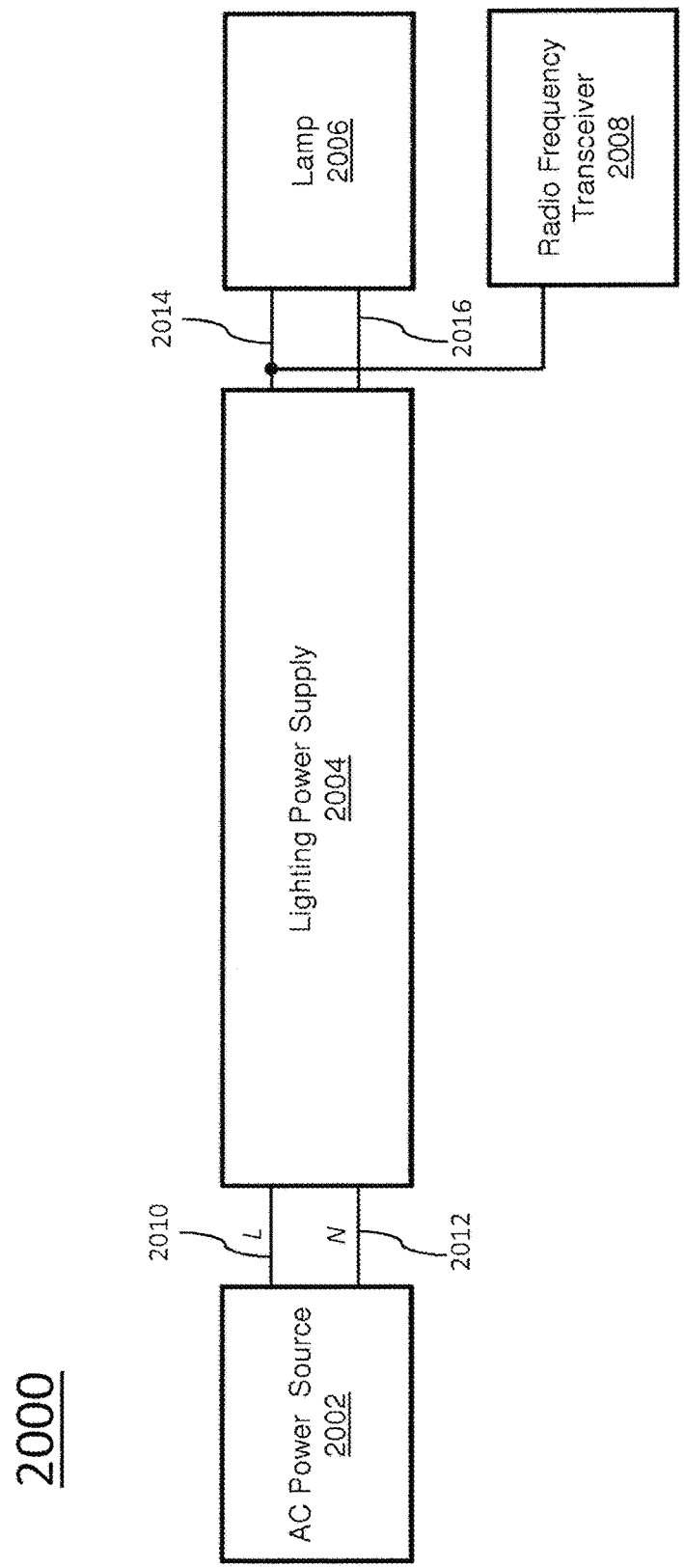
FIG. 20A depicts an RF capability of a VLC+RF node powered by a connection to the lighting-conditioned power of a light.
Figure 20B:
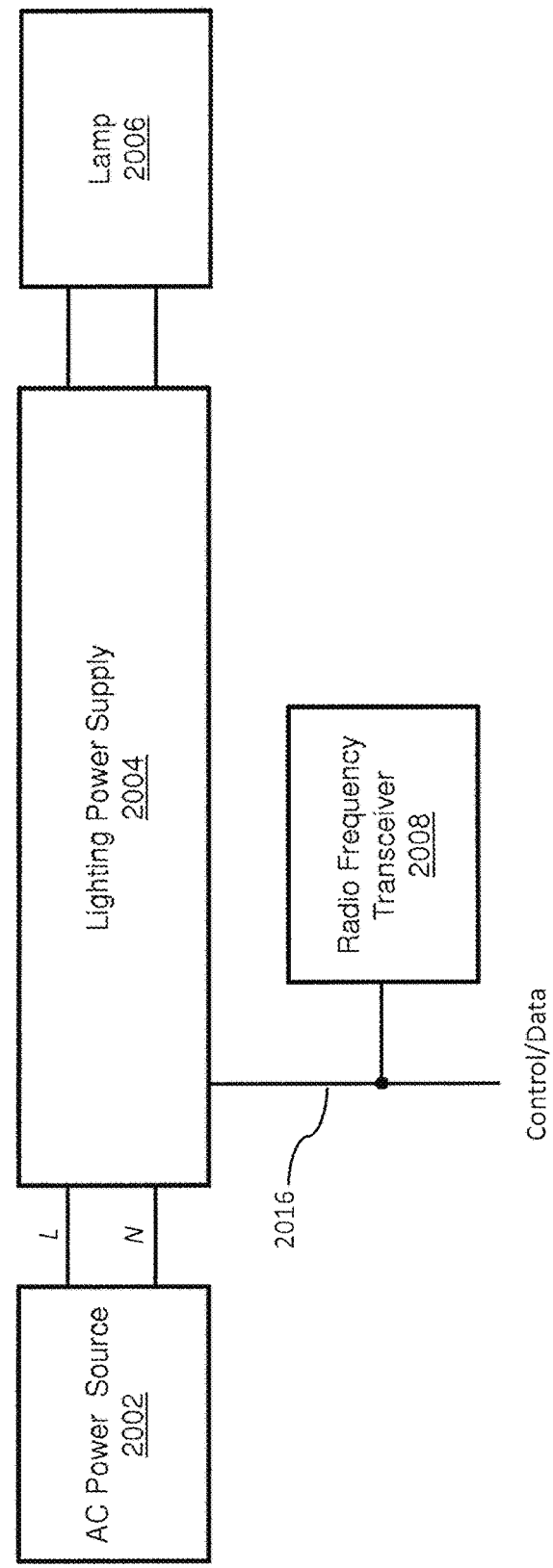
FIG. 20B depicts an RF capability of a VLC+RF node powered by a separate connection to the internal power supply of a light.
Figure 20C:
FIG. 20C depicts an RF capability of a VLC+RF node powered by attachment to the neutral wire of an AC power source of a light.
Figure 20D:
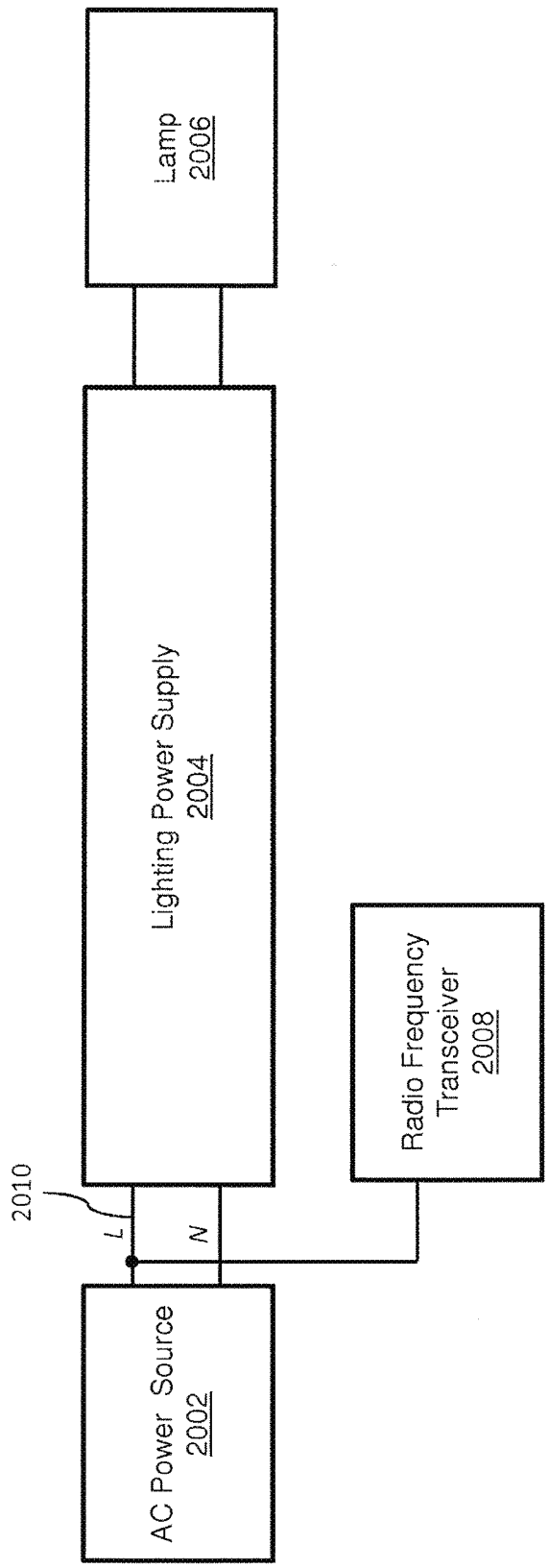
FIG. 20D depicts an RF capability of a VLC+RF node powered by attachment to the line wire of an AC power source of a light.

FIG. 20A depicts an illustrative arrangement for powering some capabilities of a VLC+RF light 2000 according to various examples. The light 2000 includes an AC power source 2002 (e.g., mains wiring), a lighting power supply 2004, an LED lamp 2006, and an RF transceiver 2008. In various examples the lamp 2006 may be of another type (e.g., incandescent), powered arrangements for mechanically directing the lamp may also be included, and the lighting power supply 2004 may include circuitry for output modulation of the lamp 2006. The AC power source 2002 provides a line conductor 2010 and a neutral conductor 2012 to the light power supply 2004 and the light power supply provides a live wire 2014 and ground wire 2016 to the lamp 2006. The lighting power supply 2004 may include an energy storage capability (e.g., a battery and/or capacitor) that enables the lamp 2006, the RF transceiver 2008, or both, along with other devices included within a VLC+RF unit, to continue functioning without interruption during power glitches or outages, up to a time determined by the energy storage limits of the power supply 2004. Alternatively or additionally, the RF transceiver 2008 may contain an energy storage capability. In FIG. 20A, the RF transceiver 2008 is powered by connection to the live wire 2014 (e.g., by insertion at the lamp installation point of a socket extender that breaks out power for the RF unit); in FIG. 20B, by connection to the lighting power supply via a bus 2016 that may carry combined power and control/data signaling; in FIG. 20C, by connection to the neutral wire of the AC mains (in which case the RF transceiver 2008 may contain an internal power supply); and in FIG. 20D, by connection to the line wire of the AC mains.

It is generally advantageous to piggyback the powering of the RF capability of a VLC+RF light onto the arrangements for powering the light, as depicted in FIGS. 20A-20D, since in typical working spaces (e.g., retail stores) mains power is architecturally supplied for a lighting system regardless of intent to install a VLC or VLC+RF system. In various other examples, the RF transceiver may be entirely battery-powered, or powered by harvesting acoustic, RF, and/or optical energy from its environment (e.g., an RF transceiver capability of a light may be powered by a photovoltaic cell illuminated by the light itself and/or adjacent lights and/or daylighting, enabling the RF transceiver to be installed simply by attaching it to the ceiling near a light). Without limitation, all such powering arrangements—wired, battery-powered, ambient-energy-powered, or any combination thereof—are contemplated and within the scope of the subject matter.

FIGS. 21A-21D schematically depict the principles of packet communication between RF nodes of an illustrative VLC+RF mesh 2100 and the control of lights in the mesh by such communication according to various examples. The illustrative VLC+RF mesh depicted in FIGS. 21A-21D features six nodes. In this illustrative example, each node may resemble the radio frequency communication enabled light for transmitting modulated light 1100 of FIG. 11; that is, each node comprises an RF transceiver capability, a light source, and a VLC modulation capability. In various examples, nodes may have capabilities other than or additional to those of light 1100 in FIG. 11, and may vary in capability within the mesh (e.g., some nodes may possess only RF communications capabilities while some may have both RF and VLC capabilities).

In the illustrative example, the RF transceiver capability of the nodes in FIGS. 21A-21D is of the digital packet type; that is, each RF transceiver broadcasts bits sequentially according to some physical modulation scheme, and the transmitted bits constitute groups or "packets" of fixed or, in some realizations, variable length. The bits of each packet, as shall be clarified in for one illustrative example in FIG. 22, are divided schematically into a string of contiguous fields or sub-groups. The packet fields may include information identifying the packet itself, the transmitter of the packet (e.g., "Node a"), and the intended recipient of the packet (e.g., "all nodes," "Node c," "all nodes in Group Two"); commands (e.g., "turn off your light"); data collected by sensors (e.g., temperature); and other information. The broadcast of some packets may be required by an RF interoperability standard, such as the Bluetooth standard; other packets, while conforming to the standard, may be transmitted optionally, and may enwrap information in a manner that constitutes a communications channel. In broadcasting, required packets (e.g., Bluetooth advertisement packets) will preferably be given broadcast priority, and optional packets will be broadcast opportunistically.

The mesh 2100 of FIGS. 21A-21D operates in a waterfall or non-routed fashion: that is, each node transmits packets to all nodes within physical range and receives packets from all nodes within range, and rebroadcasts and/or acts upon the packet, subject to certain rules, to all nodes within range. Some of the rules governing responses to received packets are as follows:

When not broadcasting a packet, listen for packets. (This implies alternate broadcasting and listening. In various examples where the RF capability of a light includes at least one each of an RF transmitter antenna and receiver antenna, broadcasting and listening may proceed simultaneously.)

If a packet is detected, extract its identifier (a.k.a., packet ID or identifying information).

Store the packet ID in local memory (e.g., the RAM of light 1100 in FIG. 11). Also store the packet ID if originating the packet.

Compare received packet ID to packet IDs already in local memory, if any.

If the packet ID matches one found in memory, classify the received packet as "seen" and "kill" it: that is, do not act upon any command it contains and do not rebroadcast it.

If the packet ID does not match any in memory, examine the packet to see if it contains commands addressed to the receiving node (e.g., "turn on the light").

If the packet does not contain commands addressed to the receiving node, take no action beyond rebroadcasting the packet.

If the packet does contain a command addressed to the receiving node, then "consume" the packet: that is, (a) execute the command and (b) retransmit the packet if and only if the packet is also addressed to other nodes, e.g., if the packet is addressed to a group of nodes.

If the packet ID does not match any packet IDs found in local memory and is not consumable by the local node, place the packet in the broadcast queue (i.e., broadcast or "advertise" the packet at the earliest opportunity).

Retire each packet ID in local memory after it has been there a certain period of time (e.g., 2 seconds). This permits packet IDs to be re-used after, at minimum, the specified retirement age times the number of nodes in the mesh. Re-using of packet IDs is advantageous because (a) otherwise demand for RAM might become large and (b) packet IDs are specified by a fixed number of bits in a packet field and are therefore finite in number, so when unique packet IDs are exhausted one must either cease broadcasting or re-use IDs.

It will be clear to persons versed in the science of network communications that the above rules are necessary and sufficient to assure that packets first broadcast by any node of the mesh will be communicated to every other node in the mesh and will cease to be rebroadcast by nodes in the mesh after a number of broadcast events not greater than the number of nodes in the mesh and potentially much smaller. It will also be clear that these rules are exemplary and that in various other examples, rule sets differing in various particulars from the example given, and likely more extensive, would also enable the practical operation of a packet-type, unrouted VLC+RF mesh (e.g., a BLE mesh). All such variations are contemplated and within the scope of the subject matter, as is the use of network topologies (e.g., bus, ring, star, tree) other than the illustrative mesh topology of FIGS. 21A-21D.

In the illustrative mesh 2100, each node's RF capability includes or consists essentially of a single antenna that may only transmit or receive at any given time: a node therefore listens for packets except when it is transmitting a packet. While transmitting, a mesh may miss (be deaf to) a packet broadcast by one or more other nodes. Although this potentially allows packets to disappear prematurely from the mesh, in various examples the VLC+RF mesh may incorporate at least two features that adequately mitigate the problem of packet-dropping: (1) for a given packet to be dropped by a mesh comprising asynchronous nodes, all nodes within receiving range of all other nodes broadcasting that packet must attempt transmission of that packet (or some other) simultaneously, and this is highly unlikely in an asynchronous mesh; and (2) as described further herein below, a packet definition standard may permit the inclusion of a response command that requires a receiving node to transmit a confirmation packet back through the mesh. Failure by a mesh controller node to receive a response packet may trigger presumption of a packet drop—loss either of the original packet or of the confirmation packet—and thus rebroadcast of the original packet. This process may be repeated until a timeout is reached and a network failure flag is raised or until packet receipt is confirmed.

In FIGS. 21A-21D, the progress of a single packet through an illustrative VLC+RF mesh 2100 is schematically illustrated. The packet (not shown) is either delivered to Node a 2102 from a device or network outside the mesh or is constructed within Node a 2102 by appropriate devices comprised by the node; or, a packet may originate within any other node in the mesh 2100. In the case illustrated, Node a 2102 broadcasts (advertises) the packet. In FIGS. 21A-21D, receipt of a packet broadcast by a node is indicated by an arrow drawn between the broadcasting node and the receiving node; e.g., in FIG. 21A, the broadcast from Node a 2102 is received by Node b 2104, Node c 2106, and Node d 2108. No other nodes in the mesh 2100 are within physical receiving range of Node a 2102. At the head of each arrow denoting successful transmission, a mark within the receiving node denotes the fate of packet: (1) A check-mark indicates that the node simply re-broadcasts the packet, (2) a bull's-eye indicates that the node consumes the packet (which may or may not entail rebroadcasting), and (c) an "X" indicates that the node kills the packet.

In FIG. 21A, Node e 2110, Node f 2112, and Node g 2114 constitute a group, Group One 2116, within the mesh 2100 (e.g., lights in a particular section of a retail space). The packet protocol of mesh 2100 enables commands be broadcast through the mesh 2100 that are executed by all nodes in Group One 2116 and by no others; nodes in a Group may also be individually addressed and controlled. In the state of mesh operation depicted in FIG. 21A, the light capability of Node e 2110, Node f 2112, and Node g 2114 is On, as indicated by open cones attached to the nodes of Group One 2114 (e.g., cone 2118). The illustrative packet transmitted by Node a 2102 is addressed to the nodes of Group One 2116 and contains a command to turn off the lights.

In FIG. 21A, the broadcast from Node a 2102 has been received by Node b 2104, Node c 2106, and Node d 2108. None of these nodes find the packet ID in memory, nor find that they are addressed by the packet. They therefore rebroadcast the packet, as indicated by the checkmarks in the node symbols.

FIG. 21B depicts the results of rebroadcast of the packet by Node b 2104, Node c 2106, and Node d 2108. In this illustrative mesh, the nodes are presumed to be operating in a non-synchronous manner so that packet collision (simultaneous broadcast of a packet by more than one node) is rare enough to be neglected. Node a 2102 receives the broadcasts of Node b 2104, Node c 2106, and Node d 2108; Node b 2104 receives the broadcast of Node c 2106; Node b 2104 and Node d 2108 are too far apart to receive each other's broadcasts; Node c 2106 receives the broadcasts of Node b 2104 and Node d 2108; and Node d 2108 receives the broadcast of Node c 2106. All packets received by these four nodes are killed, because all nodes find the ID of this packet in their "seen" list. Node e 2110 is the only node in Group One 2116 within receiving range of any of the first four nodes in the mesh (a-d) and receives transmissions from Node b 2104, Node c 2106, and Node d 2108. In this illustrative case it is posited that Node c 2106 is the first of these three nodes to rebroadcast the packet; therefore, Node e 2110 first sees the packet as broadcast by Node c 2106, places the packet ID in memory, and kills the packets redundantly received from Node b 2104 and Node d 2108.

Since Node e 2110 is in Group One 2116, to which the packet is addressed, upon examining the packet Node e finds a command addressed to itself and its fellow group members. Node e 2110 therefore consumes the packet, i.e., turns off its light and puts the packet on its broadcast queue. In FIG. 21B, the turning off of the light capability of Node e 2110 is represented by blackening in of the cone 2118.

Figures 21C, 21D:
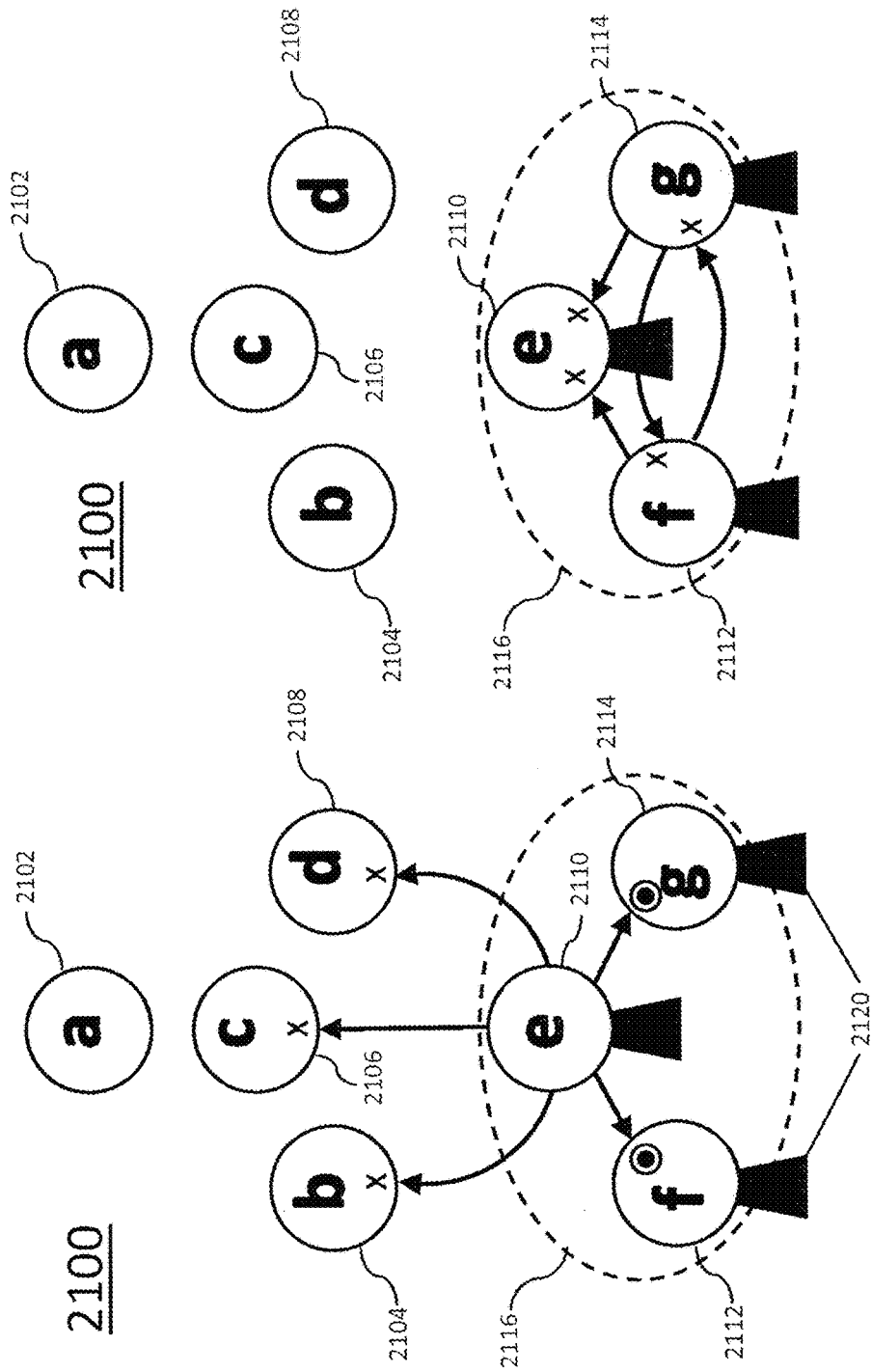
FIG. 21C schematically depicts an illustrative VLC+RF mesh in a third state of packet transmission.
FIG. 21D schematically depicts an illustrative VLC+RF mesh in a fourth state of packet transmission.
Figure 22:
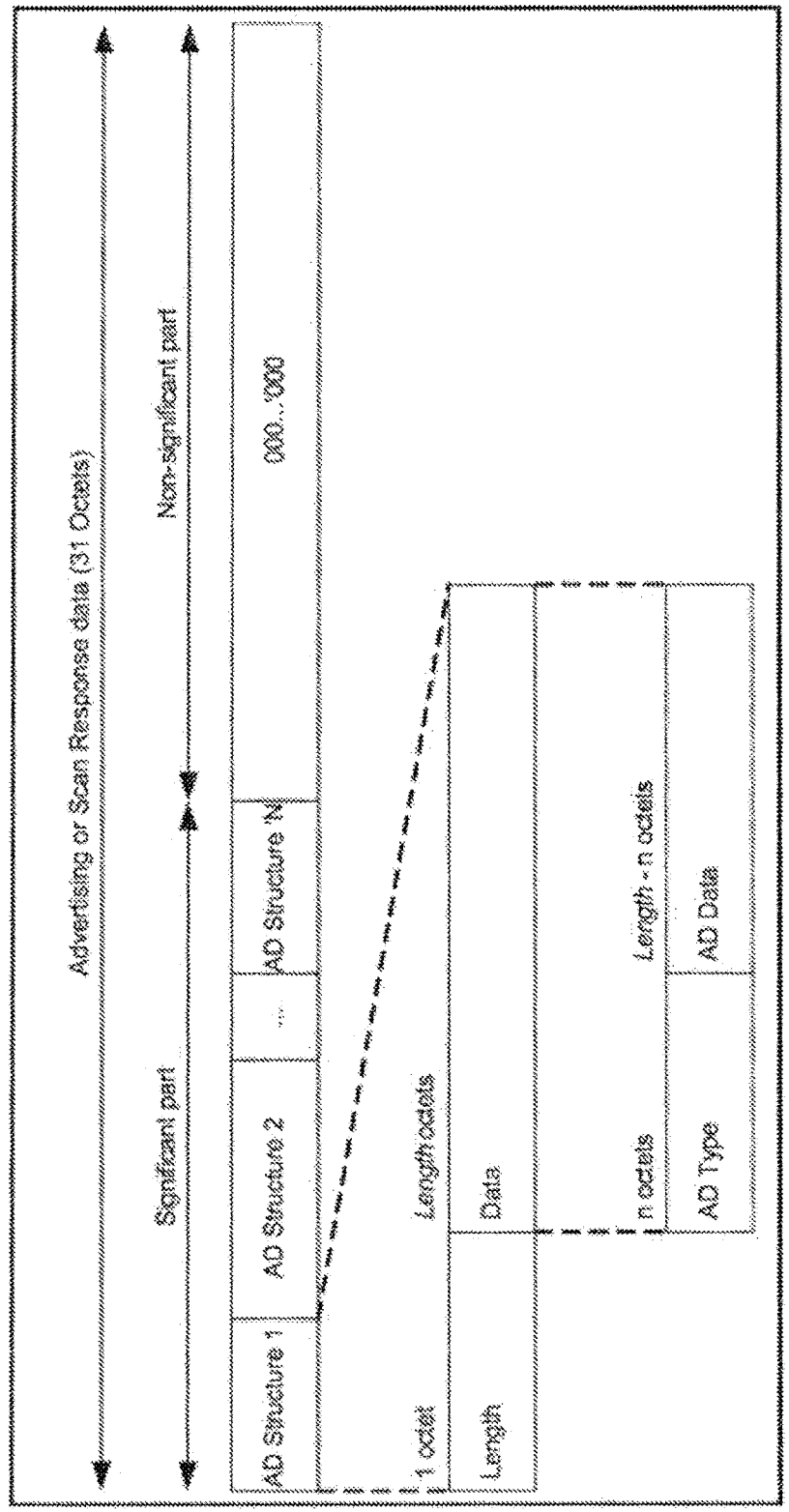
FIG. 22 depicts an example of the structure of an illustrative digital RF packet.

FIG. 21C depicts a subsequent state of operation of the mesh 2100 in which Node e 2110 has rebroadcast the packet. This broadcast is received by all nodes in the mesh 2100 except Node a, which is too distant to receive it. The packet is killed by Node b 2104, Node c 2106, and Node d 2108, as these have already seen the packet, but it is consumed by Node f 2112 and Node g 2114, which turn off their lights (as indicated by blackening in of the cones 2120).

FIG. 21D depicts the final stage in the history of the packet, which is rebroadcast by Node f 2112 and Node g 2114. All nodes in Group One 2116 receive this broadcast packet but all identify it as "seen" and kill it. Thereafter, the packet is no longer broadcast by any node in the network; also, its intended function (control of the lights in Group One 2116) has been accomplished. Similar propagation of various packet types containing data, commands, and the like, whether in this illustrative network or in more extensive networks, may be readily envisaged.

Typically, one node in the mesh 2100 is denoted a "mesh controller," which has unique authority (within a given mesh) to issue commands, receive data, and communicate with a device, mesh, or network outside the mesh. The mesh controller node may be a VLC+RF node or another Bluetooth-capable device (e.g., phone, laptop, server, joint Bluetooth+WiFi device). In various examples, as is clarified further herein below with reference to FIG. 22, a packet may contain a "command response" field that, set to an active state, instructs addressee nodes to transmit packets acknowledging receipt and execution of the command packet or returning data to the mesh controller. For example, if Node a 2102 of FIGS. 21A-21D were designated a mesh controller, and the packet transmitted in the illustrative packet history included an active command response flag, the state of operation of FIG. 21D would be followed by transmission of response packets by the three nodes of Group One 2116, which response packets would contain information confirming the dousing of the Group's lights and which would cease to propagate through the mesh 2100 only after having been consumed by Node a 2102. In general, a mesh controller may poll other nodes in a mesh 2100 for a range of information, including the operational state of its various capabilities, sensor data, ID data, LED operational history (e.g., current, voltage), ambient temperature, and the like. Also, a mesh controller may issue commands changing both RF and VLC identity codes and other operational parameters of nodes or changing the operational states of lights and RF transceivers, and may demand confirmation of the receipt and execution of such commands, and may communicate with devices, meshes, servers, networks, and the like outside the mesh.

Commands propagated throughout the mesh from a mesh controller may enable a number of functions, all of which are intended and within the scope of the subject matter. Without limitation, these include (a) light brightness control (on, off, dimming, flashing, VLC message programming, etc.), directional control of lights equipped with mechanical activators, retrieval of data from sensors, and retrieval of data collected by the RF capability of the mesh from mobile devices, tags, other nodes, and the like.

In various examples, provision is made for automatic specification of a mesh controller node, either upon system startup or in the event of failure of the designated mesh controller node; alternatively or additionally, the mesh may be configured to operate autonomously in one or more pre-determined default modes in the event that a mesh controller ceases to operate. For example, in the absence of commands from a mesh controller, the mesh nodes may be programmed to broadcast VLC beacon ID information and keep the lights on until further notice, and record sensor data in RAM in a wraparound fashion that records a moving window of most-recent readings.

FIG. 22 depicts an illustrative packet structure 2200 for a VLC+RF mesh according to various examples that employ some forms of the Bluetooth standard for RF communication. Typically, a Bluetooth device is required to transmit packets containing constrained, self-identifying content on a regular basis. Other packets may be transmitted optionally by the device. In various examples, the optional packets, herein termed VLC+RF packets, may be structured to perform the functions of mesh control, illumination control, VLC control, tag sensing, sensor reporting, mobile device detection, and other as described elsewhere herein. The following paragraphs describe the structure of VLC+RF packets employed by the RF aspect of a VLC+RF mesh according to various examples.

Each VLC+RF packet may be 31 bytes long, where a byte is defined as 8 bits (an octet). Each packet may be an Advertising packet (i.e., a packet containing identification or command information) or a Scan Response packet (i.e., a packet containing data solicited by a controller, including information about receipt of Advertising packets, execution of commands therein, etc.); Advertising and Command Response packets differ in function and content, but not in format. Each packet comprises a Significant Part and a Nonsignificant Part; the Significant Part may occupy the whole of the packet. Within the Significant Part or packet payload may be broken down into a collection of Advertisement Data (AD) Structures, each, as indicated in FIG. 22, composed of a single byte specifying the length of the AD Structure, a single byte specifying the AD Structure type, and some number of bytes of AD Data. Type identifiers for AD Structures are typically assigned numbers by the Bluetooth Special Interest Group.

In a preferred example, the VLC+RF packet contains a single AD Structure that may occupy up to the whole 31 bytes of the packet; this maximizes the non-overhead payload content of the packet. Thus, of the 31 packet bytes, 1 is occupied by the AD Length specification byte, 1 is occupied by the AD Type specification byte, and up to 29 bytes are occupied by a Mesh Message. The AD Type specification byte is set to 0xFF, the Bluetooth code for "Manufacturer Specific Data." To distinguish a Mesh packet from other Manufacturer Specific Advertising Data packets that may be sent (e.g., to mobile devices in the working space of the VLC+RF system), each Mesh Message will begin with a fixed Mesh-Specific Sequence (MSS) of 2 bytes, fixed at some arbitrary value (e.g., 0xB1BC).

The remainder of the Mesh Message (up to 27 bytes) consists of encrypted packet contents. Encryption prevents unauthorized users from taking control of the VLC+RF mesh and its functions (e.g., turning lights on and off) or harvesting information from the mesh. Nodes will decrypt a packet if they determine that it is not on their Seen list, and examine its contents to see if they are an addressee of the packet. Encryption may be by a variety of cryptographic techniques: in one example, a reversible cryptographic hash is employed. A portion of the encrypted packet contents (e.g., 2 bytes), possibly up to and including the entire encrypted packet contents is employed as a quasi-unique packet identifier ("quasi"-unique because although the number of possible M-bit strings is large for nontrivial M, it cannot be infinite—hence the need for ID re-use as discussed hereinabove with reference to FIGS. 21A-21D). This packet identifier may be the string employed by nodes for identifying packets as seen or not-seen, as discussed hereinabove with reference to the illustrative mesh of FIGS. 21A-21D.

The pre-encrypted or decrypted portion of the packet payload consists of (a) an octet of 8 1-bit flags, (b) the 3-byte ID code of the VLC+RF node originating the packet, (c) the 3-byte ID code of the addressee, which may be either a single node or a group of nodes, and (d) a Mesh Payload of up to 18 bytes length containing Commands and Parameters.

The AD structure of the VLC+RF packet is as follows, where N $\square$ 31 is the number of bytes in the AD Structure:

| AD STRUCTURE MAP | | | | | | |
|---|---|---|---|---|---|---|
| Length Specifier value = N | AD Type Specifier 0xFF | Message-Specific Sequence 0xB1BC | Flags Byte flags | Source Address Node ID | Destination Address Node or Group ID | Mesh Payload Command + Parameters |
| 1 byte | 1 byte | 2 bytes | 1 byte | 3 bytes | 3 bytes | $\square$ 20 bytes |

The functions of the Flags Byte bits are defined as follows:

| FLAGS BYTE MAP | | | | | | | |
|---|---|---|---|---|---|---|---|
| Group | Response | Reserved | Reserved | Reserved | Channel ID | Channel ID | Channel ID |
| bit 7 | bit 6 | bit 5 | bit 4 | bit 3 | bit 2 | bit 1 | bit 0 |

The functions of the Flags Byte bits are further explained as follows: (1) Bit 7, the Group bit is 0 if the destination address field is an individual node address, or 1 if the destination addressee field denotes a group number (where Group Address 0 denotes indiscriminate broadcast). (2) Bit 6., the Response bit, is 0 if the receiving node should not generate a response packet, and 1 if the receiving node should generate a response packet. (3) Bits 0-2, the three-bit Channel ID field, enable the specification of 8 (=23) channels. Each "channel" may be reserved for the use of a particular mesh. Thus, if the physical broadcast and reception spaces of nearby meshes (e.g., on adjacent floors of a building) overlap, traffic may still be segregated between the meshes by use of the Channel ID field. Each node in each mesh is programmed during system commissioning with its own Channel ID, and if a received packet contains another Channel ID, the node kills the packet.

The Command field and Parameters within the Mesh Payload field may be designated as follows: (1) A single byte may be devoted to specifying a Command; this allows the definition of 256 (=28) distinct Commands, which is ample for the operation of a VLC+RF mesh in various examples. Examples of Command field values include Set Mesh Controller Node ID, Response Packet (signifying that this packet is a response packet), Set Light Brightness Level, Blink Light, Set VLC Beacon ID, Device Data Channel (signifying that the packet payload consists of data being transmitted on a virtual channel above the packet layer), and others. (2) Parameters may contain data of any kind, including RF node IDs, VLC node IDs, light brightness level specifiers, portions of multi-packet commands, data for transmission to mobile devices in the service space, and a variety of other control, commissioning, and communications data. The Parameters field enables the VLC+RF packet protocol to act (as is common for packet protocols) as the basis for a structure of one or more virtual data channels that convey messages broken into fragments for transmission in packets. The bit rate of such virtual channels must always be less than the physical bit rate of the packet layer, but there are few constraints on the informational character of such virtual channels, which may include field definitions, error correction, encryption, packet structure, and any other features capable of example in a digital data stream.

Packet life cycle has already been partly described with reference to FIGS. 21A-21D. In various examples, two numerical parameters are defined for the whole RF capability of the mesh (e.g., programmed into the nonvolatile memory of all RF nodes) during commissioning of the mesh, namely (1) ADV_PER_PKT and (2) ADV_SEEN_TIME_LIMIT. ADV_PER_PKT is the number of times a mesh packet will be advertised by each mesh node (e.g., once), if the packet is to be advertised. ADV_SEEN_TIME_LIMIT is the number of seconds after receipt (e.g., two) that a packet ID expires (i.e., is deleted from the packet ID stack in node memory). ADV_PER_PKT constrains the amount of traffic across the mesh that will be entailed by the transmission of each packet; ADV_SEEN_TIME_LIMIT tends to constrain the lifetime of a packet in the mesh (although transmission through node rings and other cases, for sufficiently large meshes, could enable packets to ring through the mesh even after ADV_SEEN_TIME_LIMIT has expired). Decreasing either or both parameters tends to decrease the probability that a packet will be dropped; increasing either or both parameters tends to increase the lifetime of each packet in the mesh and so limit the effective bandwidth of the mesh as a whole.

It will be clear to a person familiar with the science of network communications that the foregoing packet and mesh specifications may in various examples be varied in many particulars without substantively altering the capabilities and applications of a VLC+RF described herein.

Figure 23:
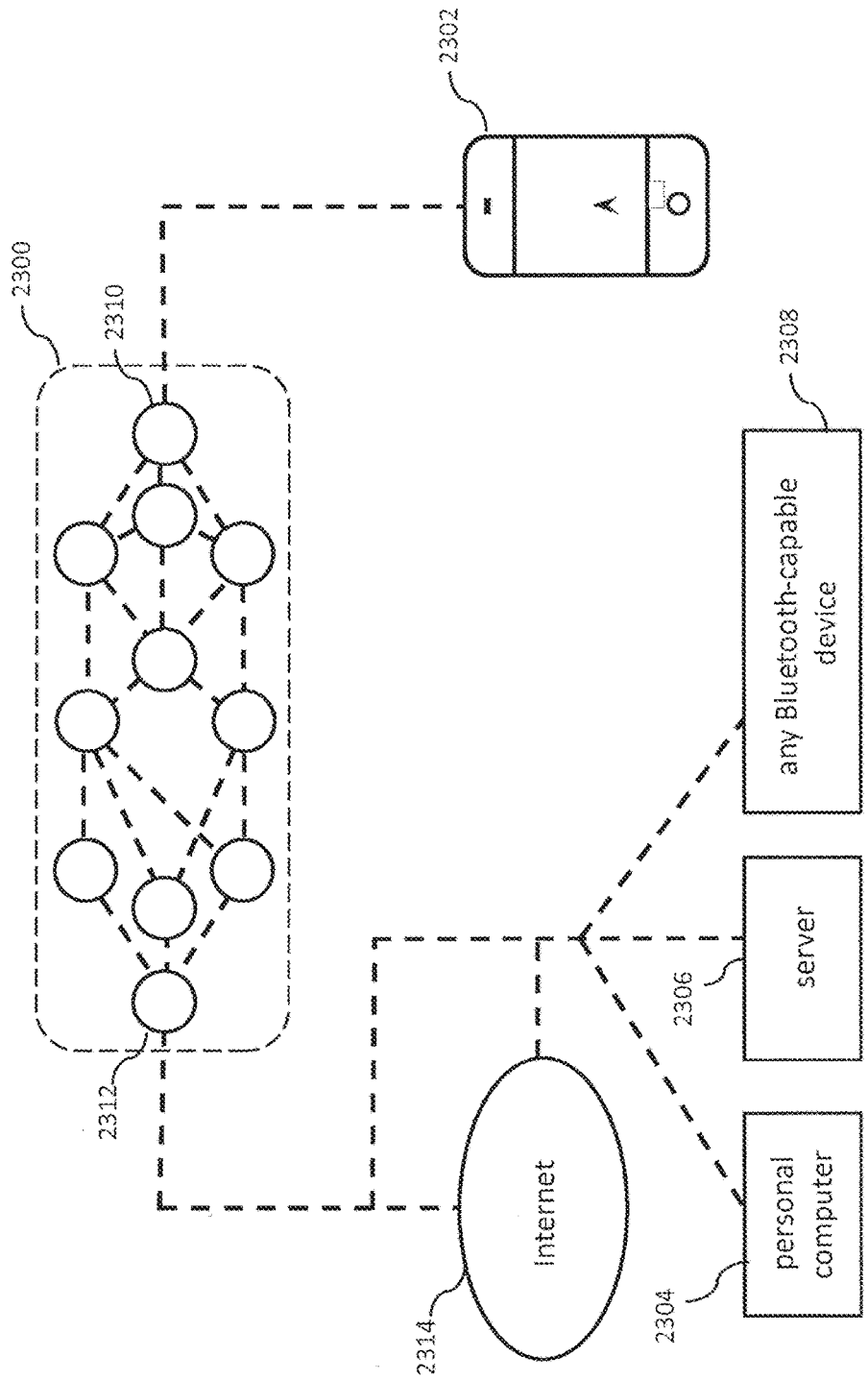
FIG. 23 schematically depicts a mesh network acting as a transparent range extender for an RF example.

FIG. 23 depicts the illustrative employment of a VLC+RF mesh 2300 as a communications range extender or "digital wire" for mobile and other devices (e.g., a phone 2302) in the service area of the mesh, according to various examples. As noted above with reference to FIG. 22, the packet level of a VLC+RF mesh 2300 may be used to support one or more virtual channels. Given appropriate design of such a channel, according to principles and methods that will be familiar to persons acquainted with the science of communications, a VLC+RF mesh 2300 may therefore be employed as a digital wire or range extender that enables an RF-equipped device (e.g., a Bluetooth-equipped mobile device, such as phone 2302) in the vicinity of the mesh 2300 to communicate with a distant device (e.g., a personal computer 2304, server 2306, or other device 2308) through the mesh 2300 without any necessity for the RF-equipped device 2302 to implement the mesh packet protocol. For example, a Bluetooth-equipped mobile telephone may establish contact, following normal Bluetooth protocol steps, with the BLE capability of a node (e.g., Node A 2310) in the VLC+RF mesh 2300. Some or all nodes in the mesh 2300, including Node A 2310, are equipped to recognize and broadcast non-mesh Bluetooth packets. Upon receiving a non-mesh packet from the mobile device 2302, Node A 2310 wraps the non-mesh packet's content into one or more mesh packets and broadcasts the one or more packets using, in an illustrative example, the packet protocol described above with reference to FIG. 22 and addressing the packet or packets to the mesh controller node 2312. The packet propagates to the mesh controller node 2312, which in this example is in communication with the Internet 2314 via a WiFi link (i.e., the mesh controller node is a multi-radio device). The mesh controller node 2312 unwraps the mobile device's Bluetooth packet content from the mesh packet and transmits it to the Internet 2314, which may in turn communicate with other devices 2304, 2306, 2308. Any response addressed to the mobile device 2302 reaches the mesh controller 2312, which wraps the response content into one or more mesh packets and broadcasts the one or more packets across the mesh 2300 to Node A 2310 (or to all nodes in Node A's group, or to all nodes in the mesh 2300) which unwrap the packet and broadcast its contents as a standard Bluetooth packet for possible receipt by the mobile device 2302. In other illustrative scenarios, the mobile Bluetooth-equipped device 2302 communicates with another Bluetooth-equipped device (not shown) in the working space, or in another mesh, or elsewhere transparently through the VLC+RF mesh 2300. In brief, a mobile device 2302 need not know that the mesh 2300 is there, yet the VLC+RF system transparently supports communications of the mobile device 2302 with other devices.

Further examples, features, and capabilities are described below.

In various examples, powering of RF tags and other devices in the working space of the VLC+RF system may be achieved by harvesting of RF energy from RF transmissions of the system, from illumination provided by the system, or from acoustic energy provided by the working area environment and/or by an acoustic (e.g., ultrasonic) capability of the VLC+RF system. Recent technological developments have increasingly enabled the harvesting of very small quantities of electromagnetic or mechanical energy from environments. For example, all receiving antennae intrinsically collect broadcast electromagnetic energy, which may be utilized for its information content, its energy content, or both. Also, piezoelectric and electromechanical devices (e.g., piezoelectric films and microelectromechanical devices) can convert acoustic energy to electrical energy, which likewise may provide information, energy, or both. Photoelectric devices can harvest energy from light for either sensing or power. One or more of these energy-harvesting modalities may be employed in devices. In various examples, a VLC+RF system powers one or more energy harvesting devices (EHDs) in its working area by broadcasting one or more of (a) ordinary Bluetooth signals in a nondirectional manner, (b) Bluetooth signals in a directional manner, e.g., as described hereinabove with reference to FIG. 7, (c) non-communicative RF signals matched to the receiving capabilities of EHDs, (d) ultrasonic signals matched to the matched to the receiving capabilities of EHDs, (e) VLC illumination and/or noncommunicative illumination, and (f) infrared VLC and/or noncommunicative illumination in a manner matched to the receiving capabilities of EHDs. RF powering of EHDs is preferred because RF waves, unlike light and ultrasound, readily pass through most objects and materials commonly found in the intended working spaces of such a system; moreover, RF direction of energy (e.g., by phased array beam steering or mechanical beam steering, as described hereinabove with reference to FIG. 7) may allow more energetically higher-efficiency powering of EHDs whose locations are known. EHDs may be stationary or mobile, and without limitation may include RF product tags, sensors, and LEDs.

Figure 24A:
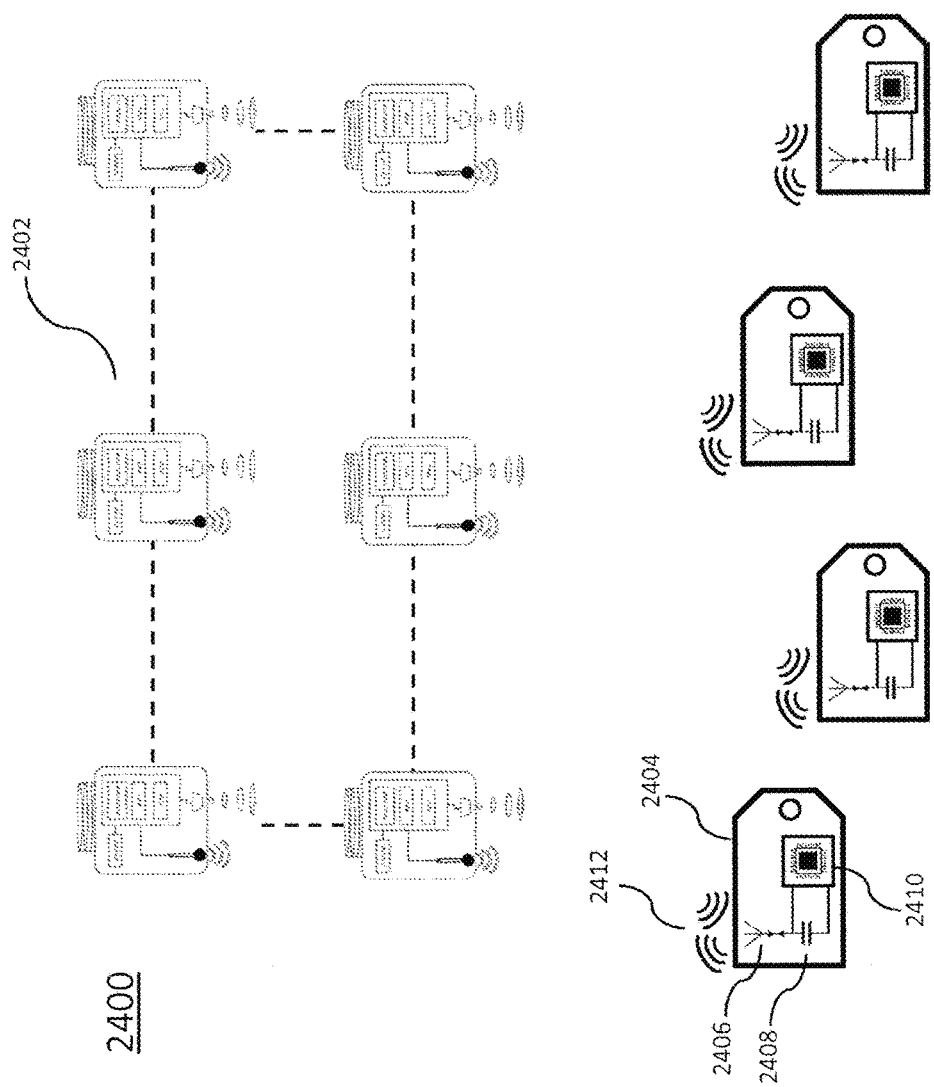
FIG. 24A depicts an example of a mesh network with passively powered tags.

Reference is now made to FIG. 24A, which schematically depicts an illustrative system 2400 in which a lighting mesh 2402 features a capability for communication with radio-powered EHDs, e.g., a passively powered smart tag 2404. Radio broadcasts from or more nodes of the mesh 2402 may be received by one or more tags 2404. Each tag 2404, in this illustrative example, includes or consists essentially of an antenna 2406, an energy-storing device (e.g., a capacitor) 2408, and an information processing device 2410. The information processing device 2410 may be a system on a chip such as, for example, the nRF51822 Multi-Protocol Bluetooth® Smart and 2.4 GHz system on a chip from Nordic Semiconductor, which includes at least a processor, such as a microprocessor or the central processing unit of a micro-control unit (MCU), a quadrature demodulator, random access memory, a 2.4 GHz radio, software and additional components.

The tag antenna 2406 is capable of both receiving radio waves, whether from nodes of the network 2402 or from other sources, and of transmitting radio waves, as symbolized by the two sets of ripple lines 2412 associated with the antenna 2406. When the antenna 2406 receives radio waves, some of which may be transmitted by one or more nodes in the mesh 2402, some of the energy in those waves is stored in the energy-storing capability 2408. When a sufficient amount of energy has been stored by the storage capability 2408, the information processing device 2410 may be powered for some interval. Its functions may include recording data received through the antenna 2406 and transmitting information (e.g., an ID code of the tag 2404) through the antenna 2406.

In addition, the information processing device 2410 may be configured to measure received signal strength indicator (RSSI) of a signal transmitted by a node in a mesh network (shown in FIG. 24C, for example); interpret the received RF and/or VLC signals to determine a node identifier of each node having an RSSI above the threshold; eliminate received signals that do not have a measured RSSI above the threshold, and transmit a list to a network gateway device. The transmitted list may include one or more of the above-threshold RSSI values together with a corresponding node identifier associated with each of the above-threshold RSSI values.

Transmissions by tags may be received by nodes in the network 2402, enabling location detection of tags and/or by other tags. In various examples, tags may in general perform all of the functions of continuously-powered nodes in the main network 2402, as well as tag-specific functions, enabling the tags to function as a passively-powered secondary network, or extension of the continuously powered network 2402. EHDs of various capabilities (not shown) may be present within the system 2400. Passively-powered meaning a device that utilizes an EHD or other device and does not utilize a continuous power source. Instead, a passively-powered device relies upon a power source that is recharged, such as a capacitor, by an external power source, such as a RF signal, light or the like to provide enough power to only perform an infrequent task. In various other examples, EHDs may harvest forms of energy additional to or other than radio waves; radio waves may be spatially directed toward EHDs by nodes of the network 2402; and other capabilities may be included or omitted.

A technique for estimating the positions of tags, nodes, and other components in communication with a lighting mesh and that may be enabled by RF capable modulating beacon lights is RF signal-based triangulation to determine an approximate position of a mobile device. This approximate position may be further narrowed through the use of the modulated beacon light data from lights in proximity to the approximate position. In various examples, RF position determination may employ received signal strength indicator (RSSI), a measurement of the power present in a received radio signal, to determine the location of an RF-capable mobile device. Since RF energy per unit area received from an omnidirectional transmitter such as most mobile devices employ drops by the inverse square of distance, RF transceivers closer to the cell phone will measure stronger RSSI for the advertising packets. Alternatively or additionally, a mobile device may make RSSI measurements of broadcasts from one or more RF capable modulating beacon lights, which measurements may then be used to estimate the device's position by triangulation, possibly taking into account non-omnidirectionality of RF transceiver broadcasts. Either the raw RSSI measurements or a position estimate calculated by the mobile device itself from those measurements may be reported by the device to a server, back end, or controller through the RF capability of the VLC+RF mesh or via another channel with which the mobile device is in contact (e.g., a cell phone network). In another illustrative example, BLE advertising packets broadcast by a cell phone are detected by one or more RF transceivers of a VLC+RF mesh. The RF transceivers are preferably located in a common plane (e.g., the ceiling of a store): however, RSSI may be used for mobile device position estimation even if RF transceiver locations are non-coplanar if their three-dimensional locations are accurately known. These measurements may be reported through the mesh, or via the mobile device employed as a gateway, or via one or more other mobile devices or nodes employed as gateways, to a mesh controller node or computer that contains software capable of algebraically estimating transmitter location from the RSSI measurements. RSSI measurements at a single moment, or over a short interval, may be used by the VLC+RF mesh and associated computing devices for position estimation of broadcasting device. Repeated position estimates by such means enable the estimation of transmitter dynamics (velocity, acceleration) and movement history. Doppler measurements at a single moment, or over a short interval, may alternatively or additionally be used in estimating device dynamics.

RSSI measurements, similarly reported to and analyzed by a computer within the wireless mesh network or in communication with that network, may also be used by RF transceivers of a VLC+RF mesh to estimate their own relative positions. In a preferred example, the RF transceivers of the beacon nodes of the mesh network are located in a common plane (e.g., the ceiling of a store), increasing the likelihood of a unique solution for the location of a multiplicity of RF transceivers given their mutual observations of RSSI. In various examples, RF transceivers may transmit packet or non-packet signals during a commissioning process or other process of net geometry determination based on mutual RSSI measurements: the broadcast of such signals (e.g., packets, pings, sinusoids, ramped sinusoids) may be controlled on a node-by-node basis through the VLC+RF mesh in a manner that increases the informational content of a set of RSSI measurements. The results of an RF net geometry determination may be combined computationally with the results of a visible-light net geometry determination based on, e.g., results of "fingerprinting" measurements of light beacon intensity, RSSI, or other measurable features of wave fields within the working space. The results of an RF and/or VLC net geometry determination may also be used, in a directed-type network, to set up routing tables for network nodes.

FIG. 24B is a schematic depiction of tag location estimation using RSSI in the illustrative system 2400 of FIG. 24A. In FIG. 24B, a tag 2414 in the working space transmits a packet containing a tag ID. The ID may be distinctive to the particular tag, or to a class of tags, or have other significance. The radio waves transmitted by the tag 2414 will travel a first distance 2416 to a first node 2418, a second (shorter) distance 2420 to a second node 2422, and a third distance 2424 to a third node 2426. The nodes 2418, 2422, 2426 are arranged in a non-collinear fashion (not in a straight line) and are equipped with an RSSI detection capability. RSSI magnitude measured by each node will depend on the distance from the transmitting tag to the node. Presuming that all tags transmit with equal signal strength, all tags at distance 2420 from node 2422 (indicated by a dashed circle centered on the antenna of node 2422) will be measured at a unique RSSI by node 2422. Similarly, a given RSSI uniquely determines tag radius for nodes 2418 and 2426 (also indicated by dashed circles, shown in part and centered on their respective nodes). There is only one point of intersection for the three RSSI radii, namely, the location of the antenna of tag 2414. Thus, RSSI measurements by three or more non-collinear nodes may be used to calculate the position of a node. In various examples, angle-of arrival information from two or more nodes may be used alternatively or additionally to calculate tag location. In various examples, tags may use RSSI measurements of pulses from multiple network nodes to calculate their own position, and/or to supplement position calculations by mesh nodes.

Several geometrical constraints are now noted. Two spheres whose centers are separated by a distance greater than the difference of their radii and not greater than the sum of their radii intersect along a circle. Two RSSI (i.e., radii) measurements therefore do not suffice to disambiguate the location of a mobile device: the mobile device might be anywhere on a circle determined by the two measured distances and the locations of the nodes measuring them. Moreover, three or more spheres having collinear centers can always be positioned so that all intersect on a circle. Thus, even when three or more radii are measured, collinear RSSI-measuring nodes can produce ambiguous location estimates for a mobile device. Finally, all arrangements of intersecting spheres having coplanar centers intersect at points, or along circles, that are symmetrical above and below the plane. There is thus always ambiguity in location estimates derived from a coplanar set of RF nodes about whether the detected transmitter is above or below the plane. All such ambiguities may be avoided in various examples by providing that a system using RSSI measurements for location estimation comprises at least four RF nodes, one of which is non-coplanar with the others. For example, in a system comprising a three or more coplanar nodes in a ceiling, one or more out-of-plane Disambiguation Nodes can also be installed. Each such node will always be more proximate to or distant from a mobile device that is below or above the ceiling plane, thus eliminating ambiguity.

Figure 24C:
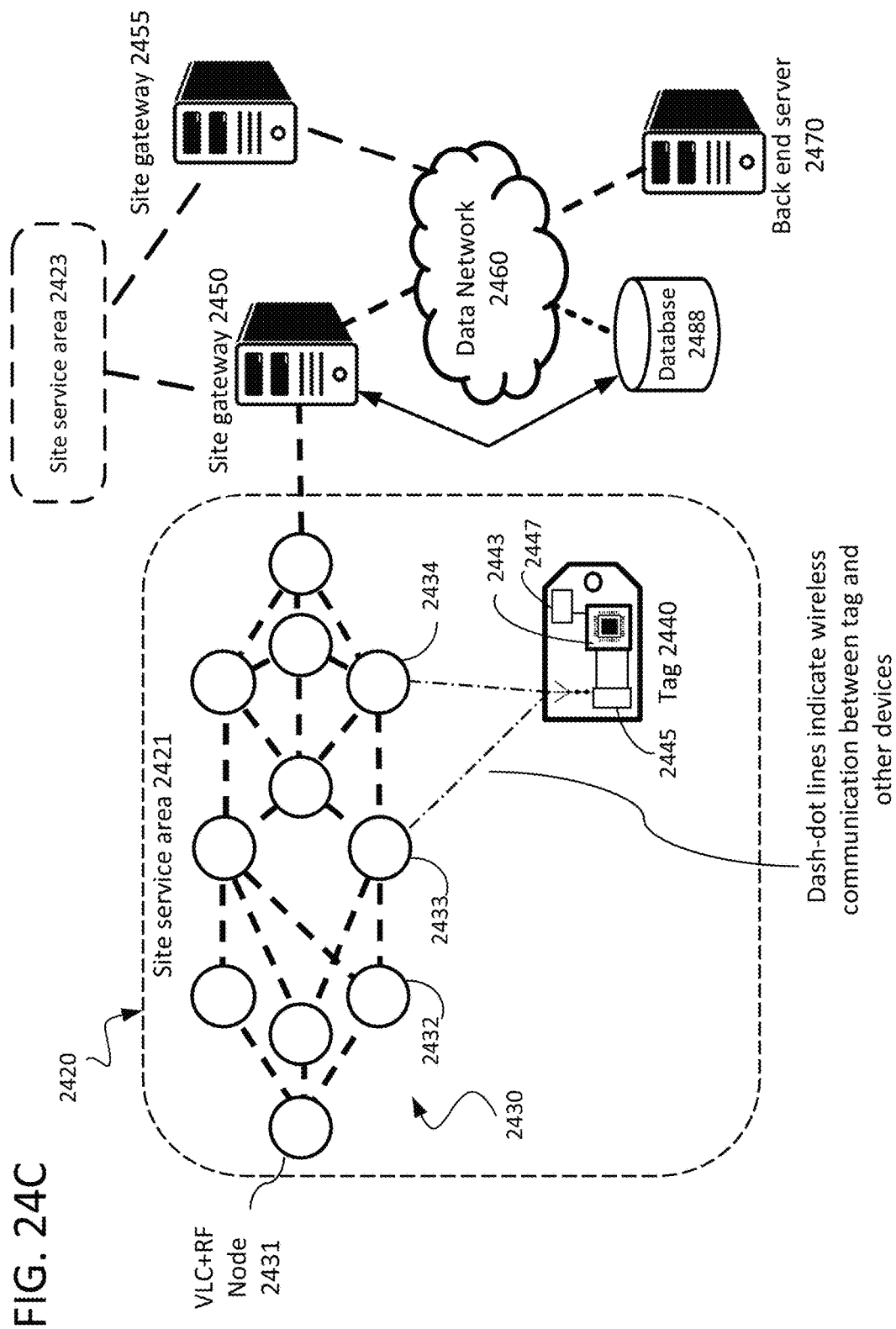
FIG. 24C illustrates another example of a tag position determining system implemented using tags configured to conserve power and to report information related to the devices in proximity to the tag.

FIG. 24C illustrates a tag positioning system 2420. The tag positioning system 2420 includes a site service area 2421 in which a wireless mesh network operates and is communicatively connected to a site gateway 2450. The system 2420 may also include a site gateways 2450, 2455, a data network 2460, a database 2488, a back end server 2470 and one or more other site service areas, such as 2423. In an example, the site gateway 2450 is configured to control and manage the site service area 2421, and has access to database 2448 directly and/or via data network 2460. The site gateways 2450, 2455 communicate with the back end server 2470 via a data network 2460. System equipment at the site service area 2421 may include a network 2430 of beacons such as networked devices 2431, 2432, and 2434. The devices 2431, 2432 and 2434 may be similar to devices 2402 of FIG. 24A and 2418, 2422, and 2426 of FIG. 24B. For example, the networked devices 2431, 2432 and 2434 may be lighting devices equipped with VLC and/or RF communication capabilities as described previously. Each of the devices 2431, 2432 and 2434 may be a beacon node in the wireless mesh network 2430, and the devices 2431, 2432 and 2434 may communicate with one another as well as other beacon nodes in the network 2430 and/or tags or mobile devices within the vicinity.

The tag 2440 as well as tags 2404 of FIG. 24A or 2414 of FIG. 24B, in the site service area 2421 may interact with the network 2430. The tag 2440 may be a smart tag (i.e., with a processing device and RF transceiver), but may different from tags 2404 of FIG. 24A or 2414 of FIG. 24B. For example, instead of being "passively powered" by an energy harvesting device (EHD) as described above with reference to FIG. 24A, the tag 2440 may include a power source 2445, such as a battery, a solar cell, a motion converter, a piezoelectric means, or the like. Therefore, the tag 2440 may be "actively powered" since the power supply may still provide at least minimal power to the tag 2440 information processing device 2443 to enable the information processing device 2443 to reliably perform functions in both in the low power consumption sleep mode as well as in the higher power consumption awake mode. In addition, the tag 2440 may be configured to receive signals transmitted by the respective devices, such as 2431, 2432 and 2434 in the network 2430, and react to the received signals as described in more detail below. An example of the electronic components and configuration in the tag 2440 may be provided by an ultra-low power wireless system-on-a chip, such as a Nordic Semiconductor nRF51822. In addition, the tag 2440 may be compliant with IEEE 802.15.4a and/or related specifications.

The site gateway 2450 may be located in proximity to one of the networked devices 2431, 2432 or 2434 and may enable communication from at least one of the networked devices through a data network 2460, such as the Internet, a local area network, a cellular network, or the like, with a backend server, such as server 2470. In addition, the site gateway 2450 also communicates with elements on or using the mesh network within the site service area 2423.

The backend server 2470 may be configured to communicate with and provide services (such as tag and networked device position determination, tag/asset tracking, content delivery, and/or the like) to one or more site gateways, such as 2450 and 2455. The backend server 2470 may be a third-party server located remotely, a computer/server co-located with the site gateway 2450 (for example, in a retail setting), or a server used to communicate with and/or provide services to multiple site service areas 2421 and 2423.

When a tag 2440 is in a network service area, such as 2421, and is in the awake mode, the tag 2440 is able to exchange radio frequency (RF) signals with at least one beacon node in the network service area. For example, a tag in a site service area 2421 actively receives signals, interprets the signals, measures signal characteristics and the like. The tag 2440 may report information, such as RSSI measurements and the node ID, e.g., the identifier associated with beacon devices 2431, 2432 and 2434, that corresponds to the RSSI measurement, obtained from nodes in the network. The reported information may, for example, be used to estimate the position of the tag 2440, track the movement of the tag, identify a number of tags in the site service area, detect a gathering of tags at a particular position within the site service area, identify network nodes near the tag, or the like. The beacon devices, also referred to as nodes, 2431, 2432, 2434 may be lighting devices that emit RF and visible light communication (VLC) signals detectable by the tag.

Each tag 2440 may, for example, be configured to wirelessly transmit or receive or both via one or more of: Bluetooth low energy (BLE), WiFi, VLC, Zigbee, or the like. A tag may be powered by any portable means, such as batteries, solar cells, motion converters, piezoelectric means, or the like.

The tag 2440 may alternate between sleep and wake states. Sleep is a relatively low-power, non-transmitting state in which an onboard timer runs, the tag may be responsive to a wake-up event, and the tag may regularly record acceleration history or other measurements and possibly respond conditionally to such measurements (e.g., wake up if the tag is moved). Upon waking, the tag attempts to perform one or more environmental measurements (e.g. the RSSI measurements discussed above) and to upload this information to the system back end. The upload may be through the mesh network via, for example, Bluetooth low energy (BLE), Wi-Fi or other RF technology. The sleep-awake cycle is a power management mechanism that enables power conservation by switching the tag into a low-power sleep mode when actions that may consume larger amounts of power are not required by the tag.

Location and motion estimates made based on a combination of measurements such as RSSI may typically be performed by a gateway server or back-end server on the cloud, but could potentially be performed, partly or entirely, by the tags or the nodes themselves.

The back-end server tracks tag IDs, reported tag data, estimated tag locations, service area sites, site maps including wireless device locations, derived metrics, and all other pertinent information.

It may be helpful for an understanding of the tag 2440 and its interaction with the network 2430 to discuss an operational example with reference to FIGS. 24C and 24D. The tag 2440 may alternately transition between a sleep mode or an awake mode. When in sleep mode, the tag 2440 is in a low power consumption state and may even be harvesting energy via RF signals or solar panels or the like. Conversely, when the tag 2440 is in the awake mode, the tag 2440 consumes power while performing more power intensive functions according to instructions in firmware stored on the processing device 2443.

FIG. 24D illustrates an example process based on the system of FIG. 24C. The process 2400D includes a sequence of operations. At step 240, a tag, such as 2440, that has a unique identity (i.e., tag ID) is in sleep mode. The tag 2440 may remain in sleep mode for a predetermined amount of time, a predetermined number of processor clock cycles, such as 3.3 GHz, 3.5 GHz, 16 MHz, 24 MHz or the like, of the tag processing device 2443, or in response to an event. For example, the tags, such as 2440, may be configured to awake from the low power sleep mode every X (integer such as 1, 50 or the 1000) number of hours or minutes, seconds, milliseconds (or smaller units), after a timer times out, after a number of processor clock cycles (e.g., 3,300,000,000,16 million or the like) or counts of the number of occurrences of an event, e.g., 10 times. An event may be a condition detected by one or more of the sensors 2447. For example, an event may be the detection of one or more movements, non-movement, light, darkness, an RF signal, a VLC signal, or the like by one or more of the sensors 2447.

As mentioned, the tag 2440 may awake at 242 in response to an event. For example, the tag 2440 may have sensors that may be active when the tag is in the sleep mode and in the awake mode. The sensors 2447, for example, may detect: movement, light, modulated light, an electric/magnetic field, moisture, or the like. As an alternative to waking at a particular time, the tag 2440 may be configured to wake when the event occurs. In a specific use case of when the tag 2440 is on a wheelchair in a site service area, and the tag is in sleep mode. An event may be when the wheelchair starts moving. The tag sensors 2447 may include a motion sensor, such as an accelerometer or the like, that causes the tag 2440 transition into awake mode, and begin detecting RF signals in the site service area. The tag sensors 2447 may also include a camera, such as a rolling shutter camera, or a CMOS device as described with reference to FIG. 1. The camera may be configured to, in response to detecting modulated light, generate an image from the modulated light, such as those images shown in FIGS. 7-9. The camera, for example, receives electrical power when the tag 2440 is in the awake mode. The tag processing device 2443 may be configured to analyze any image information collected by the camera of the tag sensors 2447.

While the tag 2440 is in sleep mode, the tag 2440 may be awakened, i.e. transitions into the awake mode at 242. For example, the tag 2440 may awake in response to the passing of a number of processor clock cycles by the tag processing device 2443, if a timer times out, when the tag experiences the event, or detects occurrence of a combination of these conditions.

In the awake mode, the tag 2440 begins performing tasks according to the instructions stored in its firmware (not shown). For example, a task performed by the tag 2440 in response to entering the awake mode may be detecting RF signals from beacon nodes of the wireless mesh network in a site service area, in which the tag is located, such as network 2430 of the site service area 2421. During a time T (which can be a window of time or a single point in time) or a number of counts C, the tag 2440 detects (at 244) RF signals transmitted, for example, by beacon nodes 2431, 2432, 2433 and 2434 as well as other nodes in the network 2430. The processing device 2443 of the tag 2440 is configured to measure a received signal strength indication (RSSI) of the RF signals detected from respective nodes within the network 2430. For example, the tag 2440 may measure an RSSI for each received RF signal, such as RSSI (2431), RSSI (2432), RSSI (2433) and RSSI (2434) that are measured by the tag 2440. The RF signals transmitted may by the respective beacon device/nodes 2431, 2432, 2433 and 2434 include distinctive identifiers (IDs), such as ID (2431), ID (2432), ID (2433) and ID (2434). In some cases, RSSI measurements may include values that are considered outliers which are removed by the asset tag processor.

At 248, the tag 2440 may generate a report with the node/device ID information that does not include the RSSI measurement values or data representative of the RSSI values. After a number of signals are received from different nodes or after a predetermined time, the tag processor 2443, as part of the report generation process of step 248, may select the node/device ID corresponding to a highest (or highest average) RSSI values of the number of received radio frequency signals for inclusion in the report. The selected Node IDs without their corresponding RSSI values are transmitted by the tag 2440 to a node, such as 2434 or the like, and through the mesh network to a computing system (e.g., the back-end server, such as 2470, or the site gateway, such as 2450, of the local mesh network).

The asset tag 2440 may communicate the generated report using a data packet communication protocol that limits the amount of data that may be transmitted in a data packet. For example, due to the size limits of the data packet, the asset tag 2440 may select the unique Node IDs of, for example, four device/nodes identified with the highest (or highest average) respective RSSI measurements, such as ID (2431), ID (2432), ID (2433) and ID (2434). The asset tag 2440 populates the data packet with the node IDs of the four selected nodes, but not the respective RSSI values. The report may also include a tag identifier. As a further alternative, the report may include in addition to the tag identifier, information obtained by the tag, such as temperature or the like. In addition, the number of nodes does not have to four, but may be 5-8, 1-10, 5-12 or the like.

An advantage of only transmitting the unique Node IDs is the compact size of the data allows use of data limited communication packets, such as BLE advertising packets, which have specific data size limitations. Due to the specific data size limitations of the BLE advertising packets, both the unique Node IDs and the nodes' respective RSSI values are not sent in the same BLE advertising packet.

In contrast to the process of step 248, another process is also contemplated and illustrated in FIG. 24D. In Alternative A, the tag 2440 at 249, generates a report that includes the RSSI values and node ID information. The report may also include a tag identifier. The processing device 2443 may limit the report to only those RSSI values and associated ID information for nodes exhibiting RSSI values that exceed a certain threshold. If there is a large number of RSSI values that exceed the threshold, the processing device 2443 may further limit the report to only include a number of RSSI values less than the large number of RSSI values that exceed the threshold, such as RSSI (2431), RSSI (2432), RSSI (2433) and RSSI (2434) and node/device IDs, such as ID (2431), ID (2432), ID (2433) and ID (2434) for a certain number of devices/nodes, such as the four (4) in this example. However, the number of nodes may be 5-8, 1-10, 5-12 or the like.

At 250, the tag 2440 may transmit the generated report to the network 2430 for delivery to a computing device. As described previously, RSSI information and node IDs may be used to determine the position of the tag 2440 with respect to the known locations of identified nodes 2431-2434 in the network. For example, when the nodes 2431-2434 are lighting devices, the computing device may have stored in a memory a map of the lighting device locations within the site service are 2430. The RSSI data is related to the distance between the tag and each respective one of the identified nodes. Processing of the node locations and RSSI distance related information enable estimation of the current tag location. The site service area 2430 may be a retail establishment or a part of a retail establishment, an outdoor area, a healthcare facility, a warehouse, factory, a package or container shipping facility or the like. In particular examples, the tag may be placed on a wheelchair or hospital bed.

Instead of transmitting the RSSI data and IDs as signals almost immediately after the signals are received by the tag 2440, the tag 2440 in another example may accumulate RSSI values and node IDs, generate a report as described in one of the above examples, and transmit the report at a particular time or at the occurrence of a particular event (e.g., detected movement of the tag, the detection of light, a change in temperature, air pressure, $CO_2$ level, air quality, or the like). For example, the processing device 2443 may store the RSSI and ID information in a memory (not shown) and may generate a report with the information needed for an asset tag position determination at a subsequent time.

At 250, the tag 2440 transmits the report generated in 248 that includes selected node/device IDs without the respective RSSI values that correspond to the selected node/device IDs. The tag 2440 selects the node/device IDs that correspond to the highest RSSI values. For example, the generated report at 248 may include the IDs, such as ID (2431), ID (2432), ID (2433) and ID (2434) that correspond to the nodes having the highest RSSI values, but excludes the RSSI values that correspond to the selected IDs.

Alternatively, the tag transmits the report generated in the Alternate A example at 249 in the form of a data packet including the ID of the tag, node ID (2431), node ID (2432), node ID (2433), node ID (2434), RSSI (for beacon node 2431), RSSI (for beacon node 2432), RSSI (for beacon node 2433), and RSSI (for beacon node 2434). The data packet may include other information such as an address of an intended recipient node or computing device, time of transmitting, time of RF signal detection(s) or the like. When transmitting the data packet, the tag may for example, address the packet to the node with the largest RSSI or simply broadcast the information to any node(s) in the vicinity of the tag 2440 for forwarding to a computing device for tag position determination processing.

At 251, the tag 2440, either immediately, or after some time interval, such as 1 minute or a certain number of counts, after transmitting the packet goes back to the sleep mode. The sleep mode continues for another period of time, as mentioned above, or until the occurrence of another event.

The process 2400D is the process of the Sleep-Awake mode cycles of the tag. However, the information in the packet transmitted to the network may also follow a process. For example, the RSSI and ID information transmitted by the tag 2440 is received by a beacon node in the network 2430 for delivery to a computing device (e.g., a controlling node in the network 2430, the site gateway 2450, or a back-end server, such as 2470). The computing device may be configured to determine and map the position of the tag 2440 within the site service area 2431. For example, the computing device may determine the position of the tag 2440 and use the information to track departures and arrivals of the tag 2440 from and to the site service area 2431. Upon receipt of the information, a recipient node in the network 2430 may transmit the tag packet to the site gateway 2450. The site gateway 2450 may be a computing device configured to determine the position of the tag 2440. Alternatively or in addition, the site gateway 2450 may send the data packet (and position determination) via the data communication network 2460 (e.g., the Internet) to a back-end server 2470.

The site gateway 2450 and/or back-end server 2470 may be configured to perform calculations to estimate the location of the tag at time T, and may derive other metrics (shipment velocity, handling frequency, or the like) from previous location estimates and other data. For example, the site gateway 2450 and/or backend server 2470 may use a light-beacon map that has the locations of the respective lighting device nodes based on the lighting device IDs included in the packet. Using such a light-beacon map, a position determination algorithm implemented on the site gateway 2450 and/or the back end server 2470 is able to determine with sufficient accuracy the position of the asset tag using only the node IDs (as in step 248 example) transmitted by the asset tag 2440. For example, the lighting device-beacon map (e.g., relative location information of the lighting device-beacon within an indoor location) is one example of other information about the nodes stored in a database 2488 that is accessible by the computer system, such as site gateway 2450 either directly or via data network 2460, and/or back end server 2470. Other examples may include aisle and shelving location information, lighting device-beacon installation height information, lighting device-beacon transmit power, temperature, air pressure, $CO_2$ level, air quality, number of tag movements, or the like.

It should be noted that while RSSI information of a larger number of nodes increases the accuracy of the position determination of a tag, even RSSI information of a single node suffices to make a position estimate of the tag, albeit with a relatively larger spread or uncertainty. Conversely, given the density of the installation of the lighting device-beacons in a typical indoor location, such as a retail store or warehouse, RSSI values are not always needed to accurately determine a tag location. For example, information, such as a light map or other information as mentioned above, maintained in a database, such as 2488, in combination with the Node IDs provides enough information for a computing device, such as the site gateway or back end server, to determine a location of an asset tag.

Figure 25:
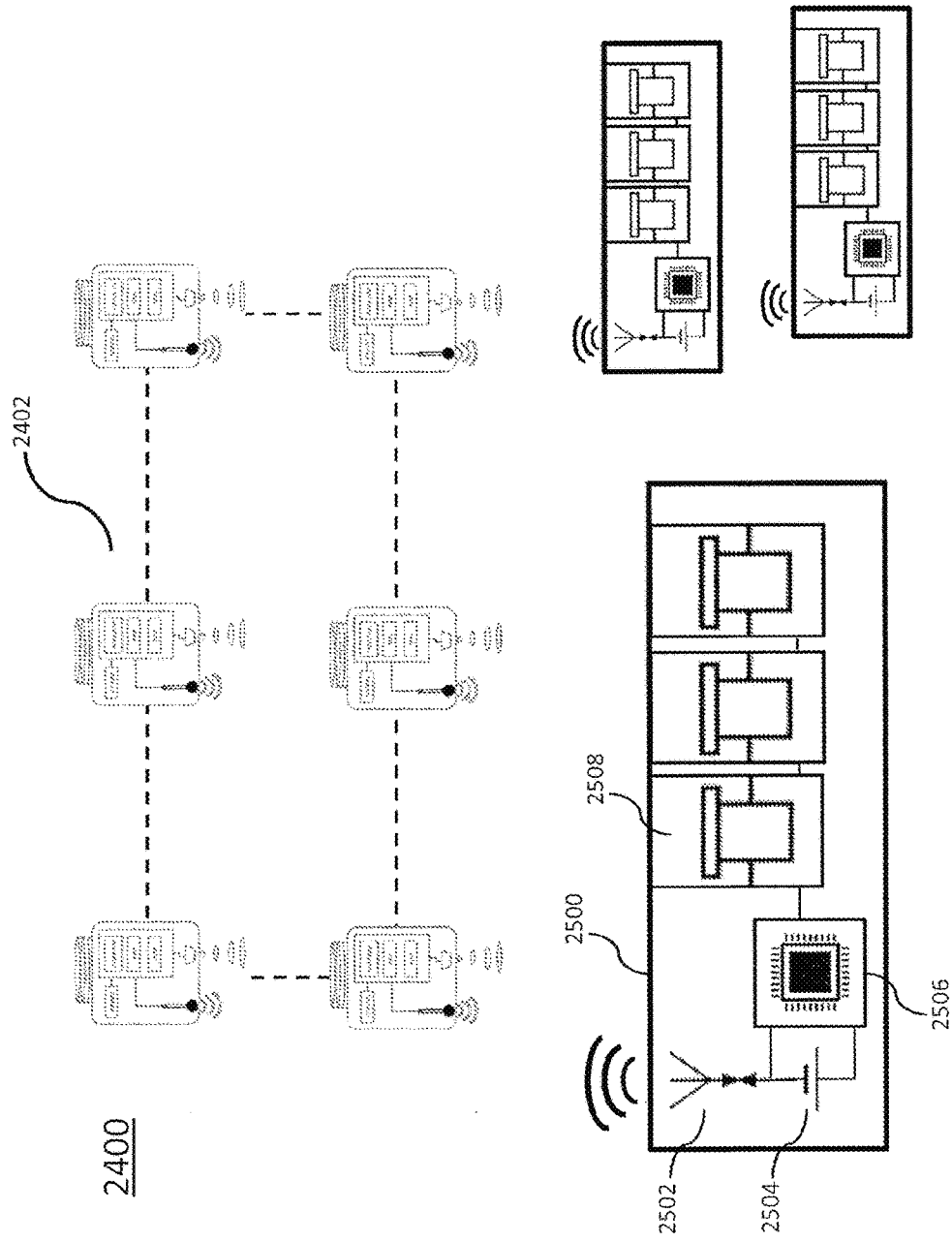
FIG. 25 depicts an example of communication between a modular sensor and a lighting mesh.

FIG. 25 is a schematic depiction of tag location estimation in the illustrative system 2400 of FIG. 24A. In FIG. 25, an environmental sensor 2500 in the working space includes or consists essentially of an antenna capability 2502, an energy storage capability (e.g., a battery) 2504, an information processing capability 2506, and one or more sensors 2508 which may be modular in nature (e.g., may be plugged in to customize the capabilities of the sensor 2500) and may sense properties such as sound, nonacoustic vibration, light, RF signals, gasses, and other conditions in the environment around the sensor-equipped tag. Three modular sensors 2508 are depicted as generic transducers in the illustrative sensor 2500 of FIG. 25. Multiple sensors may be present and may communicate with the mesh 2402. In various examples sensors may be powered by batteries, harvested environmental energy, or both, and may also function as tags, and position determination of sensors may be performed as described above with reference to "tags."

An aspect of the asset reporting methodologies described herein is efficient power management. As the asset tags described in one or more of the examples may have energy harvesting capabilities or be battery powered, a tag, such as 2500, may be configured to respond to a detected stimuli, such as movement, temperature, magnetic field, radio frequencies or the like, as described above. A tag configured to respond to stimuli instead of being configured to report its own position periodically may reduce its power consumption. For example, it would be a waste of power to report a location if the tag has not moved since its last report. Hence, a tag configured to respond to stimuli saves power as compared to a tag configured to make periodic location reports.

In examples above, an accelerometer was described as being built into the tag to detect tag acceleration above a certain threshold (or accelerations meeting other criteria). In response to the detection of the tag acceleration above a certain threshold (or accelerations meeting other criteria), the tag may awake and perform the RSSI measurements and reporting as described above. However, an accelerometer is an always ON device that continuously consumes a significant amount of power relative to the standards of battery-powered microelectronics. Since both the periodic reporting and powering of an accelerometer consume a relatively large amount of power, an approach other than the use of accelerometers to determine movement would be advantageous. Other approaches may use shock sensors, which are sensors that are configured to generate a signal representative of the rate and magnitude of a shock experienced by the shock sensor. A shock sensor may take various forms. For example, a shock sensor may be configured on a very small scale with a metal ball suspended by a spring inside a walled metal cavity. The spring and ball may be connected to a first part of a circuit and the walls of the walled metal cavity may be connected to a second part of the circuit. The circuit of shock sensor is completed when the ball touches one of the walls of the metal cavity, and completion of the circuit outputs a signal.

Shock sensors may have mechanical and/or electronic settings that allow the sensitivity of the shock sensor to be adjusted. However, these settings are not easily changed. For example, the shock sensor with mechanical settings may have a spring tension adjustment or other similar mechanical adjustment. An electronic shock sensor may incorporate some combination resistor-capacitor values to configure the response of the shock sensor. However, each of these types of adjustments require each shock sensor to be manually adjusted and/or taken apart, which can be time consuming and expensive. Alternatively, if a later use situation arises that was not considered in the initial or last adjustment, a new adjustment has to be performed to accommodate the later situation. For example, re-tuning of the shock sensor's detection circuit sensitivity involves either replacing the capacitor and/or resistor (expensive because it requires physical intervention with each tag) or supplying a controllable circuit that can vary the capacitor and resistor values (which adds complexity and expense). Therefore, a better approach is to create a system that allows for reconfiguration of a microcontroller's response to receipt of a signal from a shock sensor.

Figure 25A:
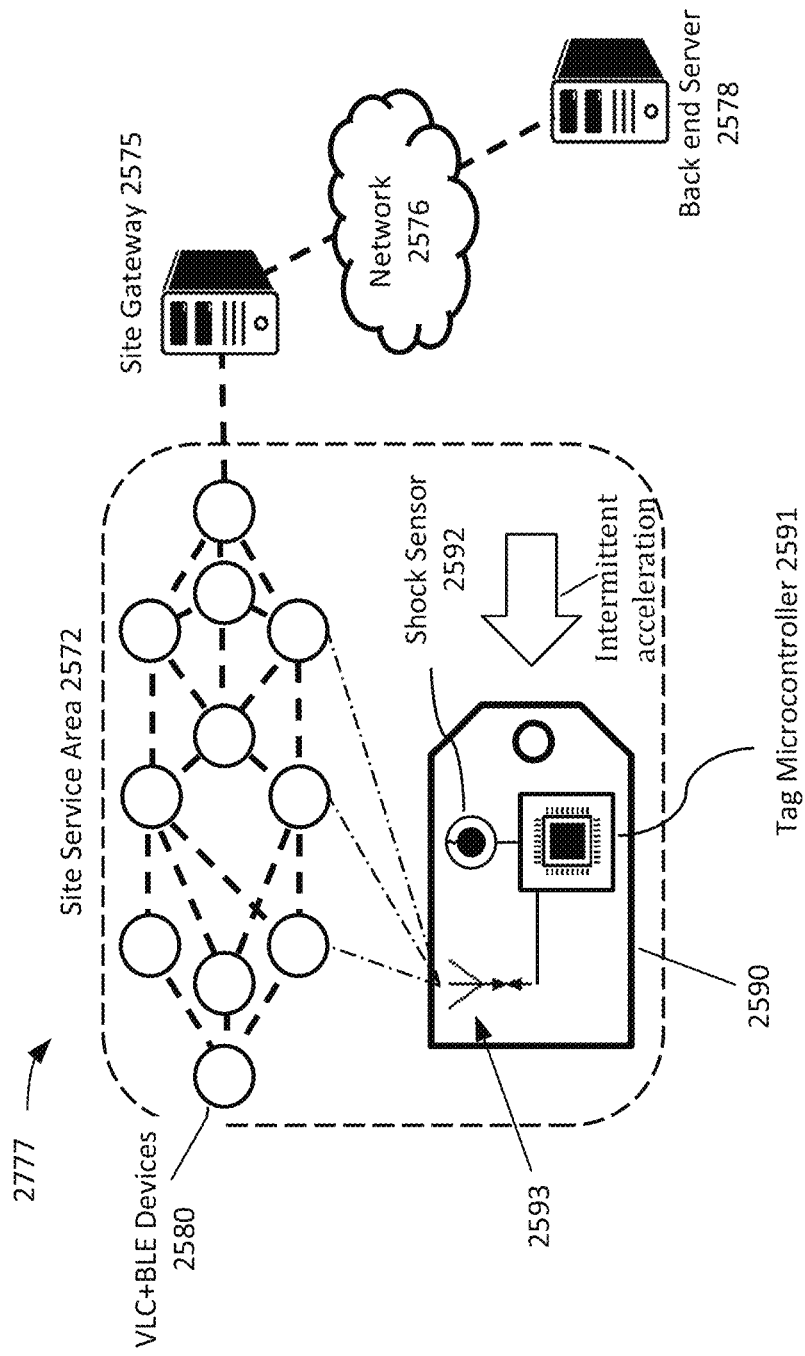
FIG. 25A depicts an example of a system for identifying a position of an asset tag, in which the asset tag incorporates an energy-saving shock sensor.
Figure 25B:
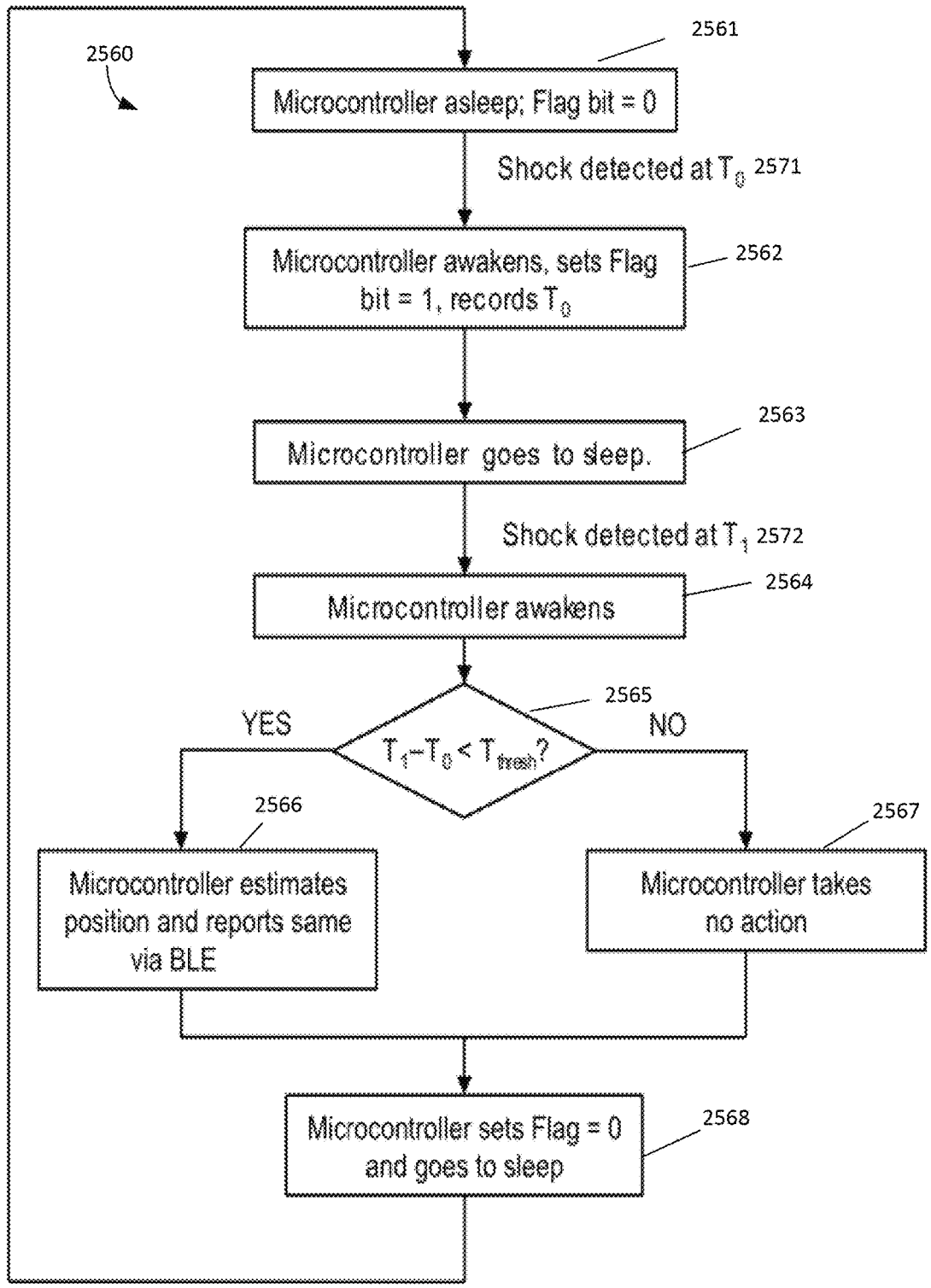
FIG. 25B depicts an example of an energy-saving process implemented by the asset tracking tag such as that shown in FIG. 25A.

The examples provided in FIGS. 25A and 25B describe a system 2777 in which a tag 2590 that includes a shock sensor 2592 coupled to a processing device, such as tag microcontroller 2591. As will be described in more detail, the shock sensor 2592 responds to motion above a certain threshold, so ambient noise or other sources of vibration, such as a passing shopping cart, high volume, low frequency music, accidental bumps or intentional picking up and putting down or the like do not create false indications of movement from the tag's location. For example, the tag 2590 may be accelerated above the certain threshold, and in response the ball is deflected to contact one of the metal cavity walls, which closes the circuit and enables a brief current to flow. Detection of a current pulse can be used to trigger a process for determining that the tag has moved, and performing the subsequent estimation and reporting of the tag's new position by the tag microcontroller 2591. Except when an acceleration occurs, the shock sensor 2592 uses very little power, i.e., much less than an accelerometer.

The example of FIG. 25A illustrates a system 2777 in which a tag 2590 exploits a low-cost, low-power device known as a shock sensor. In the example of FIG. 25A, a site service area 2572 includes a network of VLC and Bluetooth Low Energy (BLE) devices 2580 configured in a network. In general, the mesh network of VLC+BLE devices 2580 is structured and operates as in earlier examples. The network of VLC+BLE devices 2580 communicates with a site gateway 2575 that is coupled to another network 2576, such as the Internet, a private wide area network or local area network, a cellular network or the like. The network 2576 is shown coupled to a back end server 2578. The site gateway 2575 is shown outside the site service areas 2572, but the site gateway 2575 may be located within the site service area 2572. All or less than all of the VLC+BLE devices 2580 may be configured to communicate with the tag 2590. The tag 2590 may include a tag microcontroller 2591, a shock sensor 2592 and an antenna 593. The tag microcontroller 2591 may include a processor, a memory, a transceiver and other devices that enable the tag 2590 to function as an asset tracking device. The processor of the microcontroller includes a clock. Communications for asset tracking may be similar to earlier examples, except for a tag wake-up and response process responsive to the shock sensor 2592.

As mentioned above, the shock detection process must be robust enough to avoid unnecessary actuation of the shock sensor 2592 by occasional environmental vibrations. It is intended that a new location estimate (or series of estimates) is to be transmitted by the tag 2590 only if a series of shocks occurs within a certain interval (i.e. a sign of sustained, significant movement).

An example of such an improved process utilizes the Sleep/Awake cycling of the tag microcontroller described above and a shock sensor, such as a resistor-based detector, a mechanical vibration or the like, is described in more detail with reference to FIG. 25B. The resistor-based detector may be more accurate than In the example process 2560 of FIG. 25B, the tag, at step 2561, is in a state in which the tag microcontroller 2591 is in a sleep mode, and the movement status flag is set to 0 (indicating no movement). The tag microcontroller 2590 is coupled to a volatile memory in which a bit(s) is designated as the movement status flag, and is set, for example, to 0. In the Sleep mode, the tag microcontroller 2591 is in a low power state that includes maintaining a clock and the volatile memory status. In the sleep mode, for example, power in the milliamperes or millivolts range is also provided to the shock sensor 2592.

In the example, the shock sensor 2592 detects movements of the sensor. As mentioned above, different shock sensors may have different levels of sensitivity to movement. The shock sensor 2592 of the present example, in response to the detected movement (i.e. shock event), generates a current pulse that is applied at a terminal coupled to the tag microcontroller 2591. As mentioned above, the current pulse generated by the shock sensor 2592 may vary based on the rate and magnitude of the shock (e.g., movement) to the sensor. The microcontroller 2591 is configured while in the sleep mode (as well as the awake mode) to react to a current pulse that generates a voltage over a predetermined voltage threshold (e.g., a voltage associated with a logic "high") by exiting the sleep mode. For example, while in the sleep mode, the microcontroller 2591 may have circuitry that responds to either a voltage or current that generates a voltage over the predetermined voltage threshold. The voltage exceeding the predetermined voltage threshold may be a signal referred to as a movement detection signal. However, if the generated voltage is not over the predetermined voltage threshold, the microcontroller 2591 remains in the sleep mode. While the discussion of the movement detection signal has been with respect to a predetermined voltage threshold, it should be understood that the movement detection signal may be a current signal over a predetermined current threshold.

At step 2562, in response to a shock detected at 2571 that caused the output of a voltage over the predetermined voltage threshold (e.g., a logic high voltage), the microcontroller 2592 transitions into an awake mode.

In the awake mode, the microcontroller notes the over-the-threshold voltage, sets the movement status flag bit (in this example, from 0 to 1), and stores the time (i.e., t0) based on receipt of the setting of the movement status flag.

After setting the movement status flag, the microcontroller returns to sleep mode (2562). The clock is still running in the sleep mode, and the microcontroller monitors the clock.

If a subsequent movement detection signal (i.e. another over-the-threshold voltage based on a detected shock) 2572 is received from the shock sensor 2592, the microcontroller 2591 transitions to the awake mode (2564), and checks the time (which at this point is Time=t1) based on receipt of the subsequent movement detection signal.

The microcontroller, at 2565, determines whether the time between the last setting of the movement status flag and time t0 related to receipt of the subsequent movement detection signal was set less than a time threshold Tthresh (i.e. t1−t0<Tthresh). This calculation is intended to allow the microcontroller to determine that the tag movement has sufficient frequency and magnitude to warrant expending the energy to perform a position estimation operation. The period Tthresh may be, for example, 100 milliseconds, 50 milliseconds, or the like, depending upon the use application for the tag (e.g., a tag on heavier items may have a lower Tthresh as compared to a lighter item since the lighter item may experience more frequent ambient movements such as jarring or sound related vibration). Alternatively, the present logic may If the determination at 2565 is NO, the movement status signal (i.e., over-the-threshold voltage) was NOT received in a time less than Tthresh, the process 2560 proceeds to step 2567. In this case, the microcontroller takes not action with respect to measuring and reporting position related information but instead proceeds to step 2568. At step 2568, the microcontroller resets the movement status flag to 0 and transitions to sleep mode thereby entering the state at step 2561 until the next shock detection.

Conversely, if the determination at 2565 is YES, the subsequent movement detection signal was received in a time less than Tthresh, the process 2560 proceeds to step 2566. At 2566, the microcontroller obtains information usable to generate an estimate of a position of the apparatus. For example, the microcontroller 2591 may make RSSI measurements of signals received from VLC+BLE Devices 2580 and report the RSSI measurement data via a Bluetooth link with a network connected device, essentially as in steps 244 to 250 in the example of FIG. 24D. Alternatively, the microcontroller 2591 may make angle of arrival or time of flight determinations of signals received from VLC+BLE Devices 2580 for position estimation.

After generating the report at step 2566, process 2560 proceeds to 2568, at which the microcontroller resets the movement status flag to 0 and transitions to sleep mode thereby entering the state at step 2561 until the next shock detection.

The above example is provided by way of illustration and not limitation as many variations on the process 2560 are possible. For example, the microcontroller may use multiple bits, such as N bits (rather than a one-bit flag) as a counter for shocks (counting up to 2N−1 shocks with N bits), and upon being awoken by a shock (i.e. an over-the-threshold voltage is generated), the microcontroller checks whether a threshold number of shocks M (where M≤2N−1) have been detected within a predetermined time interval, such as Tthresh or the like. The threshold number of shocks M may be between 5-10 or some other integer value. If so, a position is reported; if not, then the microcontroller takes no action. Also, a sensor may be programmed to deliver a series of position estimates, separated by some fixed time interval, upon detection of movement. After sending the series of position estimates, the microcontroller may transition to the sleep mode. In addition, the criteria for movement detection may be adaptive (according to one or more algorithms) rather than fixed. Alternatively, there may be a time-out condition: e.g., a tag may be programmed to report its position once a day regardless of movement, so that the back end server 2578 knows the tag 2590 is active and accounted for in the system 2777.

In an alternative, the microcontroller may remain in the awake mode between shock detections since the process 2560 may be performed with step 2563 omitted even if the microcontroller 2591 is awake (e.g., conducting some sort of computational business) throughout. However, minimum energy will be used if the microcontroller 2591 sleeps whenever possible.

The process 2560 provides the advantage of being energy-efficient because there is no periodic reporting of unnecessary position estimates and no continuous digital quantitation of accelerations by an accelerometer. In addition, the microcontroller 2591 is programmable with changes in software that can be changed, e.g., via a firmware update transmitted through the wireless network. The tag is not committed to a single method (e.g., single-flag vs. multi-bit counter) or any single set of parameters (e.g., M or Tthresh).

Different individual tags or groups of tags (e.g., tags committed to different sorts of objects) can be programmed with different movement detection criteria. Different movement detection criteria can be used for different times of day or according to other meta-criteria.

Although the above described process was described with reference to a movement event, the process may be utilized with sensors or detectors in addition to or in place of a shock sensor. The process may respond to other events, such as changes in temperature, air quality, pressure or some other detected event.

RF position estimation of passive (EHD) tags and/or sensors linked to assets—e.g., merchandise, robots, furniture, clothing—within a working space may be used by the VLC+RF mesh for asset position mapping, inventorying, theft detection, and related purposes. Alternatively or additionally, battery-powered sensors or asset-linked tags may communicate with the mesh. In an illustrative example, the VLC+RF system is used as a backbone network for network tracking as follows: EHD or battery-powered modules comprising an RF capability regularly broadcast BLE packets that (a) contain encrypted data based on sensors variously comprised by modules such as temperature, humidity, CO or $CO_2$ or other gas levels, occupancy, RF spectrum monitoring, audio recording, brightness sensing, floor vibration, and other; and that, (b) when received by one or more VLC+RF nodes, enable the location of module through RSSI triangulation on the module. In this example, a generic base module having an RF capability allows for the physical plug-in of multiple sensor modules for customization. The sensing network—i.e., modules plus VLC+RF mesh—is managed via a cloud-based system accessed through the web via a representational state transfer (REST) application programming interface (API). Asset tracking by a back end may be enabled by communication between the mesh and the tag modules. Firmware updating and other control of tag modules may also be managed through the mesh. Such a system may enable simultaneous asset spatial tracking, inventorying, space usage characterization, environmental characterization, theft detection, and other data-driven functions.

FIG. 26 is a schematic depiction of portions of an illustrative system 2600 in which sensors are employed to support position estimation for users of a working space. Sensors 2602, 2604, 2606 are in contact with the floor of space served by a lighting mesh network 2608. Vibrations 2610 from footfalls 2612 transmitted through the floor (plane of the figure)—potentially from more than one walker, or from a wheelchair in motion, or from other forms of human or machine motion—may be sensed by appropriate vibration transducers of the sensors 2602, 2604, 2606. Sensor information may be transmitted by the sensors 2602, 2604, 2605 to the mesh 2608 and thence to a back end or computing device (not shown) capable of estimating the location of the footfalls 2612 through tomographic techniques (e.g., techniques similar to those known and used in the science of seismic tomography). User location information from floor-vibration tomography may be used alternatively to, or to enhance, location user location information derived from mobile devices carried by users as described elsewhere herein.

A single microcontroller in a VLC+RF node may be programmed to perform all light modulation and RF communication capabilities using timed routines or functions. The microcontroller may be configured to constantly broadcast and receive an RF signal while also ensuring that the modulation of the light (e.g., on/off state) is properly operated so as to provide the right modulation light function while avoiding human visible flicker in the light output.

An alternate configuration may include a separate in-line RF communication module that may be disposed in-line with a modulating beacon light. This combination may allow each physical combination of RF capability and modulating light capability to achieve capabilities that are similar to the integrated example described, such as in FIG. 11 above.

Various examples of the present subject matter incorporate RF devices (e.g., the Broadcom BCM4358 802.11ac WiFi 2×2 Multiple Input Multiple Output chip, and similar devices capable of BLE transceiving) that intrinsically determine Angle of Arrival (AOA) information for received RF signals. Such information may be used, independently of VLC and RSSI information, to estimate the position of a mobile device. In an illustrative case, such estimation is performed as follows:

Upon reception of a signal from the user's mobile device, the RF capability of a VLC+RF node measures AOA of the signal and sends that information, along with the node's own distinctive ID information, back to the mobile device via the standard BLE protocol.

The mobile device accumulates (and time-correlates, based on reception time) these Angle-of-Arrival+ID data sets from one, two, or more nodes in the lighting system.

The mobile device computes a location estimate from at least two Angle-of-Arrival+ID data sets transmitted to the mobile device by mesh nodes. For example, the device may group the three (closest in time) AOA measurements from distinct nodes and use these angles, along with the known locations of the nodes as determined from their IDs, to form a two- or three-dimensional position estimate of the mobile device. In an illustrative two-dimensional (planar) case, if two nodes have measured an AOA of a broadcast from a mobile device, one may draw a line passing through each node at the measured angle, whereupon the intersection of the two lines estimates the location of the mobile device. A similar approach can be used for three-dimensional position estimates using AOA measurements and known node locations from three or more nodes.

A position estimate based on AOA information may be augmented by positional estimation using RSSI measurements, VLC beaconing, and other sources of positional information (e.g., inertial measurements). For example, it will be clear to persons familiar with the science of probability and statistics that Bayes's Theorem may be used to make an optimal position estimate based on multiple sources of positional information. In a Bayesian approach, the position estimate is a 2D or 3D random variable having some prior distribution (distribution of uncertainty prior to the receipt of first data or additional data), with new AOA, RSSI, and VLC positional information constituting "evidence" that is used to update the prior. The posterior distribution (updated prior) of mobile device position may then be used as a prior distribution for a new, iterative round of estimation as additional evidence becomes available. Such an approach may maximize the likely accuracy of position estimates in a position estimation system gathering positional information from multiple modalities. In various other examples, non-Bayesian methods of combining positional information from two or more sources, or from a time series of measurements, are employed.

In another illustrative example, which may be implemented alternatively or additionally to the case just described, a mobile device measures AOA of packets broadcast by two or more RF nodes in a VLC+RF mesh and receives distinctive ID information from those nodes. Physical node locations derived from the ID information, combined with the AOA measurements, enable the mobile device to mathematically estimate its own location. In another illustrative example, a mobile device measures AOA and IDs for node broadcasts, while nodes simultaneously measure AOA and ID for the mobile device, and all these data are combined algorithmically, whether by a computational capability of the nodes, a node controller, the mobile device, or another device, into a single position estimate for the mobile device. Such an estimate may be combined with positional estimate information from other modalities. Moreover, as discussed hereinabove for RSSI measurements, nodes in a mesh may use mutual AOA measurements in order to produce or augment information about mesh node geometry. Such information may be used to assist or automate commissioning or updating of a mesh map, routing tables, etc.

Figure 27:
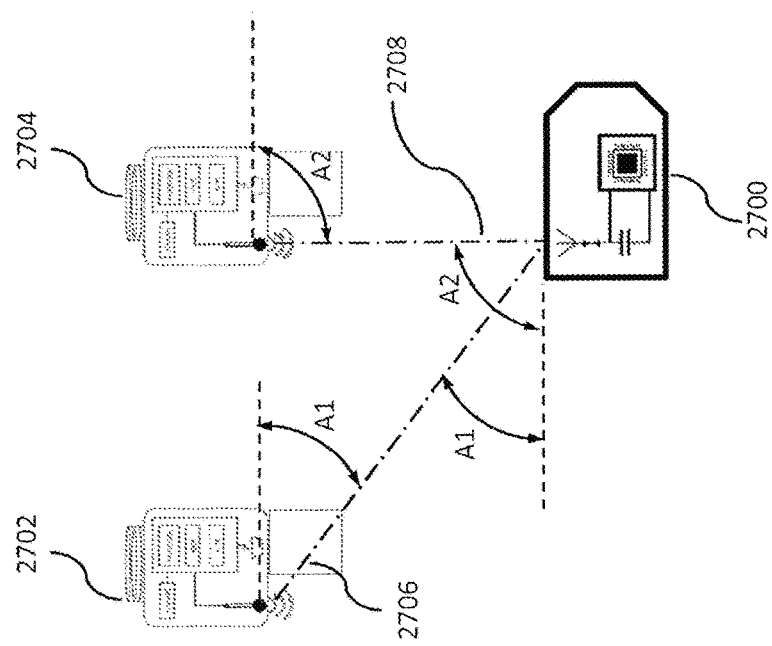
FIG. 27 depicts an example of the use of Angle of Arrival information to assist position estimation of a mobile device.

FIG. 27 is an schematic depiction of an illustrative method of position estimation of a tag 2700, similar to tag 2404 of FIG. 24, using an AOA capability of two nodes 2702, 2704 of known location within a lighting mesh (not otherwise shown), or of tag 2700, or of both. In one mode of operation, a signal or series of signal (e.g., packet) is transmitted by the tag 2700 and arrives at the nodes 2702, 2704. The AOA of the tag signal at node 2702 is A1 (depicted in FIG. 27) and the AOA of the tag signal at node 2704 is A2. Angle A1 defines a line 2706 on which the node 2702 and the tag 2700 both lie; similarly, angle A2 defines a line 2708 on which the node 2704 and the tag 2700 both lie. The intersection of the lines 2706, 2708 approximates the location of the tag 2700. Alternatively or additionally, the nodes 2702, 2704 emit pulses that are detected by tag 2700, which possesses an AOA capability. By the law of opposite interior angles, tag 2700 also measures AOAs of A1 and A2 and may therefore calculate (or transmit to a server the AOA information from which may be calculated) lines 2706, 2708 and their intersection, i.e., the location of tag 2700. AOA measurements made within a reasonably close time interval by all three devices—nodes 2702, 2704 and tag 2700—may be combined to produce a more accurate position estimate. In various other scenarios, more than one node and more than one tag may send and receive signals used for AOA position estimation. In various examples, the role of the tag 2700 of FIG. 2700 may be played by a sensor, mesh node, or any other device whose signals are capable of AOA detection by mesh nodes, or which can sense signals emitted by mesh nodes and possesses an AOA capability of its own. Tags, sensors, mesh nodes, and other intercommunicating devices in the lighting system may all, potentially, collect and share information that contributes to the position estimation of space users and physical assets.

Coordination of light function may be accomplished via RF enabled modulatable lights. This may allow for certain lights to temporarily produce a particular modulation signal, emit a particular color, and the like. In a retail environment, such a temporary use may be used to indicate a special offer or otherwise bring a shopper's attention to a particular position in the retail space. Likewise, information, offers, content, and the like could be transmitted from RF enabled lights to nearby mobile devices, thereby effectively providing in-store notification of certain specials, and the like without requiring a formal site-wide customer accessible WiFi network or relying on external private wide area network use (e.g. cellular networks).

Figure 28:
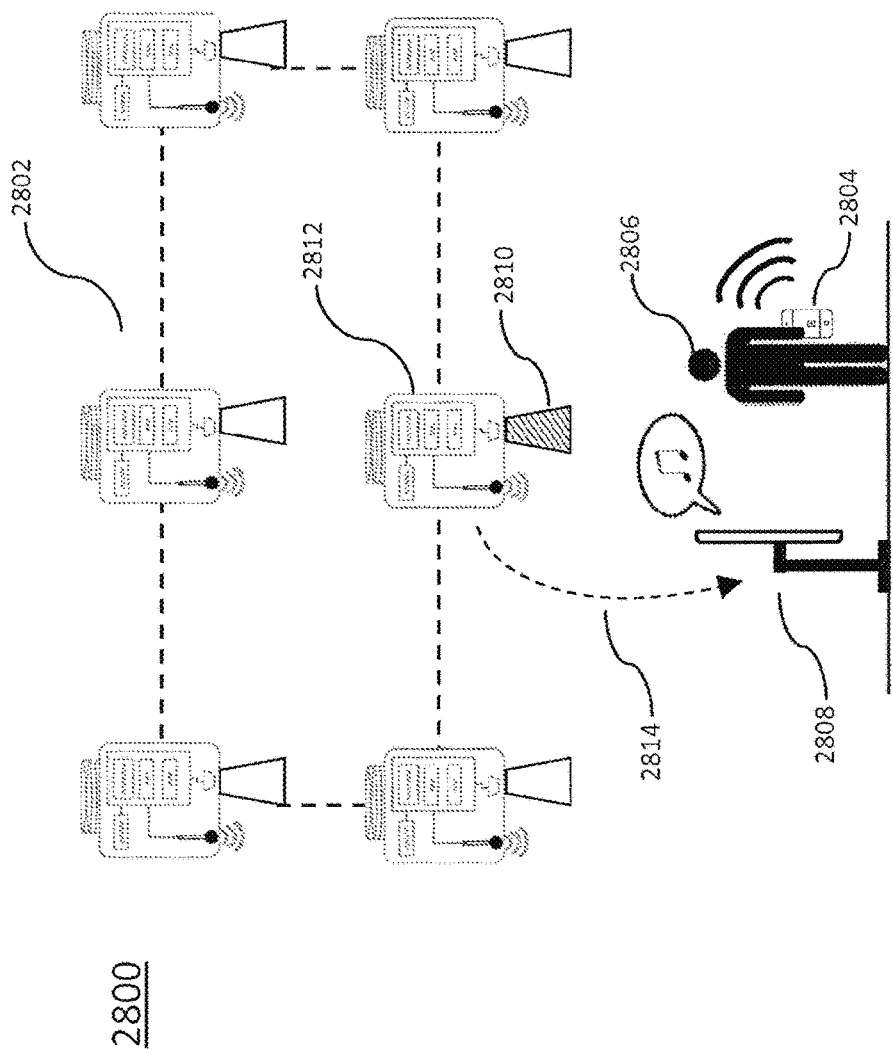
FIG. 28 depicts an example of the coordination of the lighting capability of a mesh with user location.

FIG. 28 is a schematic depiction of an illustrative system 2800 including or consisting essentially of a lighting mesh 2802 that has a coordination of lighting function capability. Mesh 2802 senses the presence of a mobile device 2804 and approximates its location (e.g., by VLC, RSSI, or another technique as described herein). The back end (not shown) of the mesh determines that the device user 2806 is in the vicinity of a display screen 2808. Through the mobile device 2804, the back end pushes to the user 2806 an invitation to view content on the screen 2808. The user 2806 indicates interest, whereupon the light 2812 emitted by the light 2810 most proximate to the user 2806 is dimmed by a command transmitted through the mesh and directed specifically to the light 2812. (In FIG. 28, undimmed light is indicated by a white trapezoid under a light, and dimmed light is indicated by a cross-hatched trapezoid under a light.) The mesh also transmits a signal 2814 to the display screen indicating that it is to display certain content appropriate to the user 2806. This is an illustrative of many similar employments of a network of RF enabled position determining lights having coordination of lighting function capability that may described.

A network of RF enabled position determining lights may enable light-to-light coordination. Functions such as synchronized modulation, phase locked modulation, duplicated modulation signal broadcasting to strengthen a particular modulation ID signal, simultaneous modulation to reduce destructive interference, and the like may be implemented. Control of any one light or a group of lights may help with trouble conditions, such as directing emergency personnel to a position in a large warehouse type store to assist a person in need of medical help.

An application, such as a smart phone application, may be used to facilitate configuring and optionally controlling a lighting setup for a location. To prevent random programmers from taking control of the lighting setup, security measures, such as encryption and multi-factor authentication may be used. Such an application may depict a visual map of a lighting setup so that accessing (e.g. via a touch screen) any of the lights in the map may allow the user to control the selected light (e.g. cause it to visibly blink, turn off, turn on, stop broadcasting a modulation signal, run a diagnostic or setup function, and the like).

Modulated light position determination may be combined with RF position determination in an integrated LED-based light and user-specific profile data to inform a content server of a position of a nearby mobile device/user. In an illustrative example, the content server may then deliver user-targeted content to a nearby screen (e.g. advertising screen) that is proximal to the determined position of the mobile device/user. Alternatively or additionally, the content server may deliver user-targeted content to other media (e.g., speakers) proximal to the determined position of the mobile device/user or to one or more mobile devices of the user. Position determination may be used to direct personnel to the assistance of a user in the working space: e.g., personnel may be equipped with mobile devices that inform them of a real-time, mesh-enabled position estimate of a mobile device user who has requested personal attention, and so be enabled to rendezvous with the user even if the user's position changes after the personnel are dispatched.

Bluetooth networking capabilities that facilitate rapid delivery across a network of a high priority information packet may be exploited in a network of RF enabled modulating beacon lights to ensure rapid delivery of content (e.g., advertisements) from a server through the light-based RF network to a user's mobile device that is connected to the light-based RF network.

Figure 29:
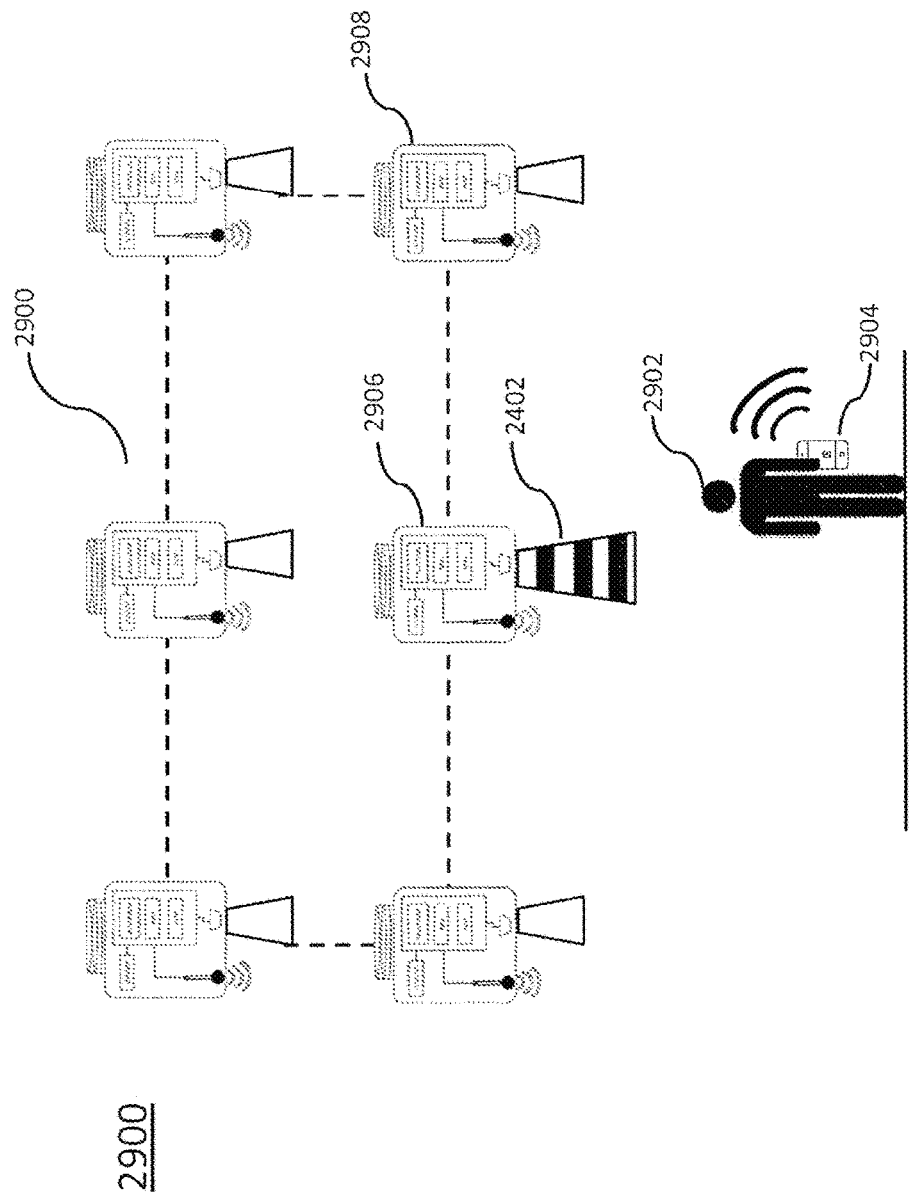
FIG. 29 depicts an example of a use of the coordinated lighting capability of a mesh in commission the mesh.

Commissioning of a newly-installed or revised lighting network may be facilitated by capabilities of a VLC+RF mesh. For example, in a commissioning process where a commissioner carrying a mobile device assigns location information to specific ceiling lights, and has just assigned a location to a light, the commissioner may wish to identify a next light for commissioning. However, a plethora of lights may be candidates. Via the RF capability of a VLC+RF mesh, the commissioner may request that candidate lights in their vicinity and proximate to the light just commissioned be made to blink. By means of RSSI measurements reported through the mesh to a back end, proximity of candidate lights to the light just commissioned can be determined, narrowing the field of candidates and speeding the commissioning process. FIG. 29 is a schematic depiction of aspects of a commissioning process of a lighting mesh 2900. The locations of some or all of the nodes of the mesh 2900 are not initially known. A commissioner 2902 carries a mobile device 2904 and wishes to associate a physical location with a next light in the mesh (e.g., the light 2906). Having previously commissioned a nearby node 2908, the commissioner 2902 sends a command (through, e.g., an RF capability of their mobile device 2904) to flash lights in the vicinity of the nearby node 2908. By means of RSSI measurements of node 2908 and possibly other nodes, the back end of the mesh knows that light 2906 is near the node 2908 and causes the light 2906 to flash (indicated by striped trapezoid under light 2906). The commissioner then knows which light is the next to commission, and determines a physical location for the light (e.g., using indoor survey equipment). The physical location of light 2906 is then associated by the back end of the mesh with that light and the commissioner may proceed to associate physical location data with other lights in the mesh. In various operating scenarios and various examples, other procedures may be followed for light commissioning assisted by an RSSI capability and other RF capabilities of lights.

In various RF communications systems, such as some standards proposed for cell phones, IDs broadcast by mobile devices are changed randomly to prevent unwanted location monitoring (surveillance) of mobile device users. However, such random periodic ID shifting may defeat location tracking desired by a user, e.g., a user who has installed an enterprise-specific app enabling their device to communicate with an in-store location detection system. The RF capability of a VLC+RF mesh may enable location tracking of a user despite random ID shifting. For example, a BLE-capable mobile device with random periodic ID shifting will advertise a given ID a number of times before changing its ID. Pairing one or more spatially correlated location and movement estimates (VLC, RF, or both) with a series of RF ID receptions may enable the probabilistic (e.g., Bayesian) assignment of a consistent device identity to a transmitter despite random periodic ID shifting. Such position tracking will tend to be made more accurate by VLC-based, higher-resolution position estimates of the mobile device, typically dependent on software voluntarily installed on the user's device and therefore mitigative of privacy concerns. Location-based services and information may therefore continue to be delivered to a customer participating in a location tracking system.

FIGS. 30A, 30B, and 30C schematically depict an illustrative use of location tracking to permit continuous track of a user whose mobile device periodically and randomly changes its media access control (MAC) address. FIG. 30A depicts a first operational state of a mesh 3000 at a Time 1, at which the position of a device 3002 broadcasting a certain MAC address, MAC Address 1, has been estimated by the back end (not depicted) of mesh 3000. Around the position estimate of Time 1 a circle of radius R may be defined. FIG. 30B depicts a second operational state of the mesh 3000 at a Time 2, some specific interval after Time 1. In FIG. 30B, in the time elapsed between Time 1 and Time 2 the device 3000 has changed its MAC address to MAC Address 2. A device detection and position estimate at Time 2 by the mesh 3000 finds that the device broadcasting MAC Address 2 is less than radius R from the Time 1 estimate of the position of device 3002, which broadcast MAC Address 1. Consequently, the back end of mesh 3000 re-identifies device 3002 as the broadcaster of MAC Address 2. FIG. 30C depicts an occasion on which a device broadcasting MAC Address 1 is not detected within radius R of the Time 1 location estimate for device 3002; rather, a device 3004 broadcasting MAC Address 2 is detected farther than radius R from the Time 1 location estimate for device 2002. Consequently, the back end of system 3000 does not identify device 3004, the broadcaster of MAC Address 2, as the original device 3002; correctly or not, the back end identifies the broadcaster 3004 of MAC address 2 (in the case of FIG. 30C) as a distinct device from device 3002 of FIG. 30A. In various examples, the procedure used to identify device continuity with changing MAC address or other broadcast identifier may differ in its details; e.g., a more computation-intensive, Bayesian, multi-data-source method may be employed to estimate broadcaster identities.

Hashing may include a unique mapping of a digital string to a data string of fixed size. A networked server may be configured to generate the unique location identifier from the first and second plurality of identifiers. The mobile device may transmit the first and second plurality of identifiers to the networked sever. A networked server may be configured to receive the unique location identifier from the mobile device. The unique location identifier may be unique to one light or is common to a plurality of lights.

Figure 31:
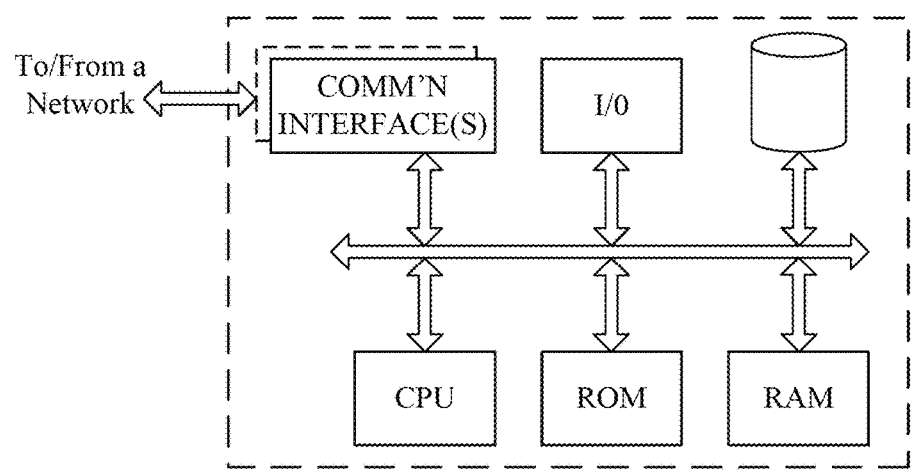
FIG. 31 illustrates a network or host computer platform, as may typically be used to implement a server.
Figure 32:
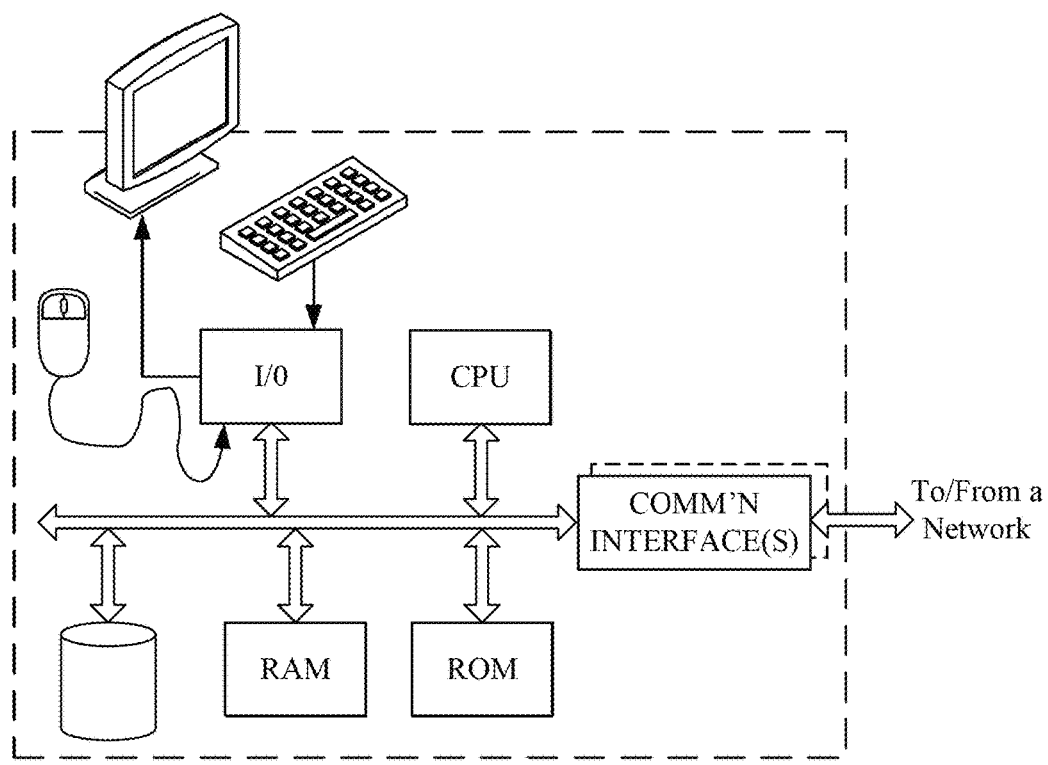
FIG. 32 depicts a computer with user interface elements, as may be used to implement a personal computer or other type of work station or terminal device.

FIGS. 31 and 32 provide functional block diagram illustrations of general purpose computer hardware platforms. FIG. 31 illustrates a network or host computer platform, as may typically be used to implement a server. FIG. 32 depicts a computer with user interface elements, as may be used to implement a personal computer or other type of work station or terminal device, although the computer of FIG. 32 may also act as a server if appropriately programmed. It is believed that those skilled in the art are familiar with the structure, programming and general operation of such computer equipment and as a result the drawings should be self-explanatory.

Hardware of a computer, for example (FIG. 31), includes a data communication interface for packet data communication. The computer also includes a central processing unit (CPU), in the form of circuitry forming one or more processors, for executing program instructions. The computer hardware typically includes an internal communication bus, program and/or data storage for various programs and data files to be processed and/or communicated by the server computer, although the server computer often receives programming and data via network communications. The hardware elements, operating systems and programming languages of such computers are conventional in nature, and it is presumed that those skilled in the art are adequately familiar therewith. Of course, the computer functions may be implemented in a distributed fashion on a number of similar hardware platforms, to distribute the processing load.

Hardware of a computer type user terminal device, such as a smart tag PC or tablet computer, similarly includes a data communication interface, CPU, main memory, firmware and one or more mass storage devices for storing user data and the various executable programs (see FIG. 32).

Herein, wireless RF communication is on occasion denoted by reference to "Bluetooth," but any wireless communication means may be similarly employed and all such are implicitly intended, subject to constraints arising from variations in capability, wherever "Bluetooth" and related terms are used. Examples of wireless RF communication means intended herein, without limitation, include Bluetooth, Bluetooth-Low-Energy (BLE), WiFi, Enhanced NFC, WiMax, 3G, 4G, and the like. Also herein, lighting systems described as embodying "VLC" and similar capabilities may minimally possess only an illumination capability, not necessarily a visible-light communications capability, in some or all lights.

Also herein, the term "positioning system" and similar terms refer inclusively to systems that perform functions additional or alternative to determining the position of a mobile device in a working space. Examples of such additional or alternative functions, without limitation, include determining the orientation and/or state of motion of a mobile device in a served space; gathering and/or exchanging information about the distribution of magnetic fields, RF signals, illumination, or other measurable quantities throughout a working space; communicating operational commands, sensed data, queries, maps, identifying information, marketing and sales information, and other information with, between, or through mobile or stationary devices in the working space; wirelessly supplying electrical power to stationary or mobile devices in the working space; and using stationary or mobile devices as gateways through which to access other devices or networks, such as an intranet or the Internet. Also herein, the term "indoor" (e.g., in "indoor positioning system") is understood to include all relatively local areas or volumes, whether partly or wholly contained inside a building or not, that may be served by a VLC+RF positioning system.

Having described several examples, it will be apparent to those of ordinary skill in the art that other examples incorporating the concepts disclosed herein may be used without departing from the spirit and scope of subject matter. The described examples are to be considered in all respects as only illustrative and not restrictive.

What is claimed is:

1. A tag comprising:
   a radio frequency transceiver;
   a power supply; and
   a processing device configured, upon execution of instructions maintained in firmware to:
      in response to expiration of a time period or an occurrence of event, exit a sleep mode, wherein the sleep mode is a low power consumption mode;
      upon exiting the sleep mode, enter an awake mode;
      receive radio frequency signals transmitted by one or more lighting devices in a network of lighting devices, wherein each of the respective one or more lighting devices transmitting the radio frequency signals includes a device identifier of the lighting device that transmitted the signal;
      measure a received signal strength indicator of the radio frequency signals;
      associate the received signal strength indicator of the radio frequency signals with the device identifier included in the signal;
      transmit the associated device identifier of the one or more lighting devices in the network as a data packet to a computing device for determination of a position of the tag;
      upon transmission of the data packet exit the awake mode; and
      enter the sleep mode.

2. The tag of claim 1, wherein the transmitted data packet further comprises the received signal strength associated with the device identifier included in the data packet.

3. The tag of claim 1, further comprising:
   firmware configured to maintain program instructions for execution by the processing device.

4. The tag of claim 1, wherein the processing device is further configured to:
   select the device identifier corresponding to a highest received signal strength indicator value of the number of received radio frequency signals for inclusion in the data packet.

5. A method, comprising:
   in response to expiration of a time period or an occurrence of event, exiting a sleep mode by a processor of a smart tag device, wherein the sleep mode of the tag device is a low power consumption mode;
   upon exiting the sleep mode, entering, by the tag device, an awake mode;
   receiving while the smart tag device is in the awake mode at least one radio frequency signal from a respective one or more nodes in a network, wherein each of the one or more nodes in the network transmits a radio frequency signal that includes an identifier of the respective node in a network transmitting the radio frequency signal, and the one or more nodes in the network are lighting devices;
   measuring a received signal strength indicator of each of the at least one radio frequency signal transmitted by each respective node;
   generating a report with the node identifier and the received signal strength indicator of the respective node;
   transmitting the report to a computing device for determination of a position of the smart tag device with respect to the node in the network;
   exiting the awake mode; and
   reentering the sleep mode.

6. The method of claim 5, further comprising:
   receiving the transmitted report by the computing device; and
   determining by the computing device a position of the tag within a site service area, the site service are including the network.

7. The method of claim 5, wherein the one or more nodes of lighting devices in the network are equipped with radio frequency transceivers for transmitting the radio frequency signals to the tag and between lighting devices in the network, and
   the computing device is configured to:
      determine the position of the tag based on a map of the lighting devices within the site service area.

8. A tag comprising:
   a radio frequency transceiver;
   a motion sensor responsive to movements of the tag;
   a power supply; and
   a microcontroller configured, upon execution of instructions maintained in firmware to:
      in response to a movement detection signal received from the motion sensor indicating a movement by the tag, exit a sleep mode, wherein the sleep mode is a low power consumption mode;
      upon exiting the sleep mode, enter an awake mode, wherein the awake mode is a higher power consumption mode than the sleep mode;
      in the awake mode, set a movement status flag bit indicating a movement of the tag;

stores a time based on setting of the movement status flags return to the sleep mode;

in response to receipt of a subsequent movement detection signal, enter the awake mode;

store a subsequent time based on receipt of the subsequent movement detection signal;

responsive to time between setting of the movement status flag and the subsequent time related to receipt of the subsequent movement detection signal being less than a time threshold, obtain information usable to generate an estimate of a position of the tag;

transmit the obtained information as a data packet, to a computing device for determination of a position of the tag;

upon transmission of the data packet, set the movement status flag to indicate no movement;

exit the awake mode; and enter the sleep mode.

9. The tag of claim 8, wherein the movement detection signal is a signal over a predetermined voltage threshold.

10. The tag of claim 8, wherein the motion sensor is a shock sensor, the shock sensor configured to use power in the millivolt or milliamperes range, and responsive to movements of the apparatus.

11. The tag of claim 8, wherein the microcontroller is further configured to obtain information usable to generate an estimate of a position by performing functions to:

receive radio frequency signals transmitted by a device in a network of devices, wherein the device transmits a device identifier;

measure a received signal strength indicator of the received radio frequency signals;

associate the received signal strength indicator with the device identifier included in the respective received radio frequency signal; and transmit the received signal strength indicator and the associated device identifier, as a data packet, to a computing device for determination of a position of the tag.

12. The tag of claim 8, wherein the microcontroller is further configured to obtain information usable to generate an estimate of a position by performing functions to:

receive radio frequency signals transmitted by a number of devices in a network of devices, wherein the device transmits a device identifier;

measure a received signal strength indicator for each of the number of received radio frequency signals;

select the device identifier corresponding to a highest received signal strength indicator of the number of received radio frequency signals; and transmit the selected device identifier in a data packet to a computing device for determination of a position of the tag.

13. A method, comprising:

in response to a movement detection signal received from a motion sensor indicating a movement by a tag, exiting, by a microcontroller of the tag, a sleep mode, wherein the sleep mode is a low power consumption mode;

upon exiting the sleep mode, entering, by the microcontroller, an awake mode, wherein the awake mode is a higher power consumption mode than the sleep mode;

in the awake mode, setting a movement status flag bit indicating a movement of the tag;

storing a time based on setting of the movement status flag;

returning to the sleep mode;

in response to receipt of a subsequent movement detection signal, entering the awake mode;

storing a subsequent time based on receipt of the subsequent movement detection signal;

determining whether the time between the setting of the movement status flag and the subsequent time related to receipt of the subsequent movement detection signal was set less than a time threshold;

in response to a determination the time between setting of the movement status flag and the subsequent time related to receipt of the subsequent movement detection signal was less than the time threshold, receiving while the tag is in the awake mode at least one radio frequency signal from a respective one or more nodes in a network, wherein:

each of the one or more nodes in the network transmits a radio frequency signal that includes an identifier of the respective node in a network transmitting the radio frequency signal;

measuring a received signal strength indicator of each of the at least one radio frequency signal transmitted by each respective node;

generating a report with the node identifier and the received signal strength indicator of the respective node;

transmitting the report to a computing device for determination of a position of the tag with respect to the node in the network;

exiting the awake mode; and reentering the sleep mode.

14. The method of claim 13, further comprising:

receiving the transmitted report by the computing device; and determining by the computing device a position of the tag within a site service area, the site service are including the network.

15. The method of claim 13, wherein the one or more nodes in the network are lighting devices equipped with radio frequency transceivers for transmitting the radio frequency signals to the tag and between lighting devices in the network, and the computing device is configured to:

determine the position of the tag based on a map of the lighting devices within the site service area.

16. A method, comprising:

in response to a movement detection signal received from a motion sensor indicating a movement by a tag, exiting, by a microcontroller of the tag, a sleep mode, wherein the sleep mode is a low power consumption mode;

upon exiting the sleep mode, entering, by the microcontroller, an awake mode, wherein the awake mode is a higher power consumption mode than the sleep mode;

in the awake mode, setting a movement status flag bit indicating a movement of the tag;

storing a time based on setting of the movement status flag;

returning to the sleep mode;

in response to receipt of a subsequent movement detection signal, entering the awake mode;

storing a subsequent time based on receipt of the subsequent movement detection signal;

determining whether the time between the setting of the movement status flag and the subsequent time related to receipt of the subsequent movement detection signal was set less than a time threshold;

in response to a determination the time between setting of the movement status flag and the subsequent time related to receipt of the subsequent movement detection signal was less than the time threshold, receiving while the tag is in the awake mode at least one radio frequency signal from a respective one or more nodes in a network, wherein:
  each of the one or more nodes in the network transmits a radio frequency signal that includes an identifier of the respective node in a network transmitting the radio frequency signal;
measuring a received signal strength indicator of each of the at least one radio frequency signal transmitted by each respective node;
generating a report with the node identifier and without the received signal strength indicator of the respective node;
transmitting the report to a computing device for determination of a position of the tag with respect to the node in the network;
exiting the awake mode; and
reentering the sleep mode.

17. The method of claim 16, further comprising:
receiving the transmitted report by the computing device; and
determining by the computing device a position of the tag within a site service area, the site service are including the network.

18. The method of claim 16, wherein the one or more nodes in the network are lighting devices equipped with radio frequency transceivers for transmitting the radio frequency signals to the tag and between lighting devices in the network, and the computing device is configured to:
  determine the position of the tag based on a map of the lighting devices within the site service area.

19. A tag comprising:
a radio frequency transceiver;
a power supply; and
a processing device configured, upon execution of instructions maintained in firmware to:
  in response to expiration of a time period or an occurrence of event, exit a sleep mode, wherein the sleep mode is a low power consumption mode;
  upon exiting the sleep mode, entering an awake mode;
  receive radio frequency signals transmitted by one or more lighting devices in a network of lighting devices, wherein each of the respective one or more lighting devices transmitting the radio frequency signals includes a device identifier of the lighting device that transmitted the signal;
  measure a received signal strength indicator of the radio frequency signals;
  associate the received signal strength indicator of the radio frequency signals with the device identifier included in the signal;
  transmit only the associated device identifier of the one or more lighting devices in the network as a data packet to a computing device for determination of a position of the tag;
  upon transmission of the data packet exit the awake mode; and
entering enter the sleep mode.

* * * * *

UNITED STATES PATENT AND TRADEMARK OFFICE
CERTIFICATE OF CORRECTION

| | | |
|---|---|---|
| PATENT NO. | : 10,346,649 B2 | Page 1 of 1 |
| APPLICATION NO. | : 15/865801 | |
| DATED | : July 9, 2019 | |
| INVENTOR(S) | : Yenpao Lu et al. | |

It is certified that error appears in the above-identified patent and that said Letters Patent is hereby corrected as shown below:

On the Title Page

Item (72) Correct Residence State of Fourth Inventor, Sajin GEORGE:
Sajin George, Sommerville, MA (US);

Signed and Sealed this
Fifteenth Day of October, 2019

Andrei Iancu
*Director of the United States Patent and Trademark Office*